US009317778B2

(12) United States Patent
Cordova-Diba et al.

(10) Patent No.: US 9,317,778 B2
(45) Date of Patent: *Apr. 19, 2016

(54) INTERACTIVE CONTENT GENERATION

(71) Applicant: OIM SQUARED INC., Skaneateles, NY (US)

(72) Inventors: Bertin Rudolph Cordova-Diba, Del Mar, CA (US); Jose Adrian Munguia, Vista, CA (US); Tyson Simon, San Diego, CA (US); Eric Williams, Skaneateles, NY (US)

(73) Assignee: OIM SQUARED INC., Skaneateles, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/918,491

(22) Filed: Oct. 20, 2015

(65) Prior Publication Data

US 2016/0042251 A1    Feb. 11, 2016

Related U.S. Application Data

(63) Continuation of application No. 14/790,602, filed on Jul. 2, 2015, now Pat. No. 9,177,225.

(60) Provisional application No. 62/020,873, filed on Jul. 3, 2014.

(51) Int. Cl.
| | |
|---|---|
| *G06K 9/34* | (2006.01) |
| *G06K 9/62* | (2006.01) |
| *G06K 9/52* | (2006.01) |
| *G06F 17/30* | (2006.01) |
| *G06K 9/46* | (2006.01) |
| *G06T 7/00* | (2006.01) |
| *G06T 5/00* | (2006.01) |
| *G06T 11/60* | (2006.01) |

(52) U.S. Cl.
CPC ........ *G06K 9/6215* (2013.01); *G06F 17/30247* (2013.01); *G06K 9/4604* (2013.01); *G06K 9/52* (2013.01); *G06T 5/00* (2013.01); *G06T 7/0044* (2013.01); *G06T 7/0081* (2013.01); *G06T 7/0083* (2013.01); *G06T 11/60* (2013.01); *G06K 2009/4666* (2013.01)

(58) Field of Classification Search
None
See application file for complete search history.

(56) References Cited

U.S. PATENT DOCUMENTS

| | | | |
|---|---|---|---|
| 5,546,475 | A | 8/1996 | Bolle et al. |
| 5,576,950 | A | 11/1996 | Tonomura et al. |
| 5,579,471 | A | 11/1996 | Barber et al. |

(Continued)

FOREIGN PATENT DOCUMENTS

| | | | | |
|---|---|---|---|---|
| DE | GB 2501567 A | * | 10/2013 | ........ G06F 17/30041 |
| EP | 1128282 A2 | | 8/2001 | |
| GB | 2501567 A | | 10/2013 | |

*Primary Examiner* — Tsung-Yin Tsai
(74) *Attorney, Agent, or Firm* — Procopio, Cory, Hargreaves & Savitch LLP; Pattric Rawlins

(57) ABSTRACT

Generation of interactive content. In an embodiment, a representation of candidate object(s) in content of a digital media asset are received. For each of the candidate object(s), feature (s) of the candidate object are compared to corresponding feature(s) of a plurality of reference objects to identify reference object(s) that match the candidate object. For each of the matched candidate object(s), a hotspot package is generated. The hotspot package may comprise a visual overlay which comprises information associated with the reference object(s) matched to the respective candidate object.

30 Claims, 28 Drawing Sheets

(56) References Cited

U.S. PATENT DOCUMENTS

| | | | |
|---|---|---|---|
| 5,742,815 A | 4/1998 | Stern | |
| 5,751,286 A | 5/1998 | Barber et al. | |
| 5,809,471 A * | 9/1998 | Brodsky | G06F 17/30796 |
| | | | 348/460 |
| 5,893,095 A | 4/1999 | Jain et al. | |
| 5,915,250 A | 6/1999 | Jain et al. | |
| 5,926,116 A | 7/1999 | Kitano et al. | |
| 5,933,524 A | 8/1999 | Schuster et al. | |
| 6,055,536 A | 4/2000 | Shimakawa et al. | |
| 6,175,343 B1 * | 1/2001 | Mitchell | G02B 27/017 |
| | | | 345/7 |
| 6,181,817 B1 | 1/2001 | Zabih et al. | |
| 6,393,147 B2 | 5/2002 | Danneels et al. | |
| 6,901,163 B1 | 5/2005 | Pearce et al. | |
| 6,952,496 B2 | 10/2005 | Krumm | |
| 7,016,532 B2 | 3/2006 | Boncyk et al. | |
| 7,374,077 B2 | 5/2008 | Shimura | |
| 7,403,652 B2 | 7/2008 | Boncyk et al. | |
| 7,565,139 B2 | 7/2009 | Neven, Sr. et al. | |
| 7,657,100 B2 | 2/2010 | Gokturk et al. | |
| 7,680,324 B2 | 3/2010 | Boncyk et al. | |
| 7,751,805 B2 | 7/2010 | Neven et al. | |
| 7,764,808 B2 | 7/2010 | Zhu et al. | |
| 7,796,155 B1 * | 9/2010 | Neely, III | G06K 9/00771 |
| | | | 345/418 |
| 7,872,669 B2 | 1/2011 | Darrell et al. | |
| 7,899,252 B2 | 3/2011 | Boncyk et al. | |
| 7,962,128 B2 | 6/2011 | Neven et al. | |
| 8,004,576 B2 | 8/2011 | Sharma | |
| 8,103,097 B2 | 1/2012 | Finlayson | |
| 8,130,242 B2 | 3/2012 | Cohen | |
| 8,189,964 B2 | 5/2012 | Flynn et al. | |
| 8,296,280 B2 | 10/2012 | Mo | |
| 8,421,872 B2 | 4/2013 | Neven, Sr. | |
| 8,520,897 B2 | 8/2013 | Boncyk et al. | |
| 8,633,946 B2 | 1/2014 | Cohen | |
| 8,694,515 B2 | 4/2014 | Takata et al. | |
| 8,798,378 B1 | 8/2014 | Babenko et al. | |
| 8,817,045 B2 | 8/2014 | Cohen | |
| 8,849,259 B2 * | 9/2014 | Rhoads | G06F 17/30244 |
| | | | 382/162 |
| 8,892,588 B2 | 11/2014 | Bennett | |
| 2002/0001398 A1 | 1/2002 | Shimano et al. | |
| 2002/0089524 A1 | 7/2002 | Ikeda | |
| 2002/0102966 A1 | 8/2002 | Lev et al. | |
| 2002/0112249 A1 * | 8/2002 | Hendricks | H04H 20/10 |
| | | | 725/136 |
| 2003/0164819 A1 | 9/2003 | Waibel | |
| 2004/0037460 A1 | 2/2004 | Luo et al. | |
| 2005/0055281 A1 | 3/2005 | Williams | |
| 2005/0198067 A1 | 9/2005 | Liu | |
| 2005/0252966 A1 | 11/2005 | Kulas | |
| 2006/0012677 A1 | 1/2006 | Neven | |
| 2006/0026202 A1 | 2/2006 | Isberg et al. | |
| 2006/0077258 A1 | 4/2006 | Allen et al. | |
| 2006/0107216 A1 | 5/2006 | Cooper et al. | |
| 2006/0251338 A1 * | 11/2006 | Gokturk | G06F 17/30253 |
| | | | 382/305 |
| 2007/0009152 A1 | 1/2007 | Kanda | |
| 2007/0079322 A1 * | 4/2007 | Sloo | H04N 21/44008 |
| | | | 725/19 |
| 2007/0211964 A1 | 9/2007 | Agam | |
| 2007/0248244 A1 * | 10/2007 | Sato | G06F 17/30265 |
| | | | 382/103 |
| 2008/0136820 A1 | 6/2008 | Yang et al. | |
| 2009/0029080 A1 | 1/2009 | Visioli et al. | |
| 2009/0100048 A1 * | 4/2009 | Hull | G06F 17/30017 |
| 2009/0136141 A1 | 5/2009 | Badawy et al. | |
| 2009/0316986 A1 | 12/2009 | Hua et al. | |
| 2010/0074470 A1 | 3/2010 | Ren et al. | |
| 2010/0095326 A1 * | 4/2010 | Robertson, III | G11B 27/28 |
| | | | 725/40 |
| 2011/0129129 A1 * | 6/2011 | Avinash | A61B 5/04 |
| | | | 382/128 |
| 2011/0214082 A1 * | 9/2011 | Osterhout | G02B 27/017 |
| | | | 715/773 |
| 2011/0279478 A1 * | 11/2011 | Bitra | G06F 17/30241 |
| | | | 345/633 |
| 2013/0218858 A1 * | 8/2013 | Perelman | G06F 17/30268 |
| | | | 707/706 |
| 2013/0251337 A1 * | 9/2013 | Abecassis | H04N 9/8715 |
| | | | 386/239 |
| 2013/0251338 A1 * | 9/2013 | Abecassis | H04N 5/445 |
| | | | 386/241 |
| 2015/0010231 A1 | 1/2015 | Sharma | |

* cited by examiner

INTERACTIVE CONTENT GENERATION

CROSS-REFERENCE TO RELATED APPLICATION

The present application is a continuation of U.S. patent application Ser. No. 14/790,602, filed on Jul. 2, 2015, which claims priority to U.S. Provisional Patent App. No. 62/020,873, filed on Jul. 3, 2014, the entireties of both of which are hereby incorporated herein by reference.

BACKGROUND

1. Field of the Application

The present application generally relates to image processing and object recognition, and more specifically relates to locating and identifying objects from a plurality of images in a database.

2. Related Art

In the context of digital content (e.g., images, video, etc.), the consumer may view and interact with content through a dedicated network device (e.g., desktop computer, laptop computer, smart phone, tablet computer, personal digital assistant, and/or any other type of processing device). Conventionally, there is no suitable way to identify product information about objects present in such content in an automated, rapid, or scalable manner. Rather, product information is generally conveyed via a point-and-click approach tailored for a single object represented in a single image. For example, an image, representing the product, may be displayed with a hyperlink to the product information.

It would be advantageous if a network device, running an interactive application (e.g., a consumer application) or other content, could be provided (e.g., by a media analysis server) with product information about objects present in that content.

It would also be advantageous if unknown content could be discovered (e.g., by a media analysis server) when browsing a large database of content. This way, a list of object(s) that are visually similar to a known object, but previously unknown due to the large size of the content database, could be returned to a network device running an interactive application, via a content server.

It would also be advantageous if objects could be located (i.e., detected) from content, and corresponding visually similar objects could be identified (e.g., by a media analysis server) solely based on visual characteristics without the need to add any information in text form, such as keywords or labels, or other types of metadata stored in a database.

It would also be advantageous if objects could be located (i.e., detected) from content, and corresponding visually similar objects could be identified (e.g., by a media analysis server) and information about these objects could be returned (e.g., by the media analysis server) to a network device running an interactive application to allow visual interaction without modification or distortion of the objects, without the need for special markings on the objects, without requirement for special lighting conditions, and all without human intervention in the process (i.e., automatic).

It would also be advantageous if information about objects located (i.e., detected) and identified from content (e.g., by a media analysis server) could be returned (e.g., by the media analysis server) to a network device running an interactive application and presented without obscuring the desired digital content or perimeter frames, without annoying the user/consumer with pop-up windows, as commonly practiced by conventional solutions for capitalizing on advertising revenue from digital content.

It would also be advantageous if objects could be located (i.e., detected) from content, and corresponding visually similar objects could be identified (e.g., by a media analysis server) within a reasonable amount of time, suitable for interactive applications.

SUMMARY

Accordingly, the present application describes embodiments of methods and systems for overcoming the issues with conventional technology discussed above and/or achieving one or more of the advantages discussed above. This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

In an embodiment, a computer-implemented method is disclosed. The method comprises using at least one hardware processor to: receive a representation of one or more candidate objects in content of a digital media asset; for each of the one or more candidate objects, compare one or more features of the candidate object to one or more corresponding features of a plurality of reference objects to identify one or more reference objects that match the candidate object; and, for each of the one or more candidate objects that is matched to one or more reference objects, generate a hotspot package, wherein the hotspot package comprises a visual overlay, and wherein the visual overlay comprises information associated with the one or more reference objects matched to the candidate object.

In an embodiment, a system is disclosed. The system comprises: at least one hardware processor; and one or more software modules that are configured to, when executed by the at least on hardware processor, receive a representation of one or more candidate objects in content of a digital media asset, for each of the one or more candidate objects, compare one or more features of the candidate object to one or more corresponding features of a plurality of reference objects to identify one or more reference objects that match the candidate object, and, for each of the one or more candidate objects that is matched to one or more reference objects, generate a hotspot package, wherein the hotspot package comprises a visual overlay, and wherein the visual overlay comprises information associated with the one or more reference objects matched to the candidate object.

In an embodiment, a non-transitory computer-readable medium is disclosed. The medium has instructions stored thereon, wherein the instructions, when executed by a processor, cause the processor to: receive a representation of one or more candidate objects in content of a digital media asset; for each of the one or more candidate objects, compare one or more features of the candidate object to one or more corresponding features of a plurality of reference objects to identify one or more reference objects that match the candidate object; and, for each of the one or more candidate objects that is matched to one or more reference objects, generate a hotspot package, wherein the hotspot package comprises a visual overlay, and wherein the visual overlay comprises information associated with the one or more reference objects matched to the candidate object.

In an embodiment, a computer-implemented method for visual searching is disclosed. The method comprises using at least one hardware processor to: enroll a plurality of reference objects into a database by, for each of the plurality of reference objects, receiving a reference image of the reference object, deriving a plurality of reference features of the reference object based on visual attributes of the reference object in the reference image, generating a reference object model comprising the derived plurality of reference features, and storing the reference object model in the database; and retrieve one or more of the plurality of reference objects from the database in response to a visual query by receiving the visual query, wherein the visual query comprises a query image of a query object, deriving a plurality of query features of the query object based on visual attributes of the query object in the query image, for each reference object model in at least a subset of the plurality of reference object models enrolled in the database, for each of the derived plurality of query features, calculating a feature score representing a similarity between the query feature and a corresponding one of the plurality of reference features in the reference object model, and calculating a matching score based on each feature score, wherein the matching score represents an overall similarity between the query object and the reference object represented by the reference object model, generating a query response comprising data associated with each reference object model for which the matching score satisfies a predetermined criteria, and returning the query response in response to the visual query.

In an embodiment, a system for visual searching is disclosed. The system comprises: at least one hardware processor; and one or more software modules that are configured to, when executed by the at least one hardware processor, enroll a plurality of reference objects into a database by, for each of the plurality of reference objects, receiving a reference image of the reference object, deriving a plurality of reference features of the reference object based on visual attributes of the reference object in the reference image, generating a reference object model comprising the derived plurality of reference features, and storing the reference object model in the database, and retrieve one or more of the plurality of reference objects from the database in response to a visual query by receiving the visual query, wherein the visual query comprises a query image of a query object, deriving a plurality of query features of the query object based on visual attributes of the query object in the query image, for each reference object model in at least a subset of the plurality of reference object models enrolled in the database, for each of the derived plurality of query features, calculating a feature score representing a similarity between the query feature and a corresponding one of the plurality of reference features in the reference object model, and calculating a matching score based on each feature score, wherein the matching score represents an overall similarity between the query object and the reference object represented by the reference object model, generating a query response comprising data associated with each reference object model for which the matching score satisfies a predetermined criteria, and returning the query response in response to the visual query.

In an embodiment, a non-transitory computer-readable medium is disclosed. The medium has instructions stored thereon, wherein the instructions, when executed by a processor, cause the processor to: enroll a plurality of reference objects into a database by, for each of the plurality of reference objects, receiving a reference image of the reference object, deriving a plurality of reference features of the reference object based on visual attributes of the reference object in the reference image, generating a reference object model comprising the derived plurality of reference features, and storing the reference object model in the database; and retrieve one or more of the plurality of reference objects from the database in response to a visual query by receiving the visual query, wherein the visual query comprises a query image of a query object, deriving a plurality of query features of the query object based on visual attributes of the query object in the query image, for each reference object model in at least a subset of the plurality of reference object models enrolled in the database, for each of the derived plurality of query features, calculating a feature score representing a similarity between the query feature and a corresponding one of the plurality of reference features in the reference object model, and calculating a matching score based on each feature score, wherein the matching score represents an overall similarity between the query object and the reference object represented by the reference object model, generating a query response comprising data associated with each reference object model for which the matching score satisfies a predetermined criteria, and returning the query response in response to the visual query.

In an embodiment, a computer-implemented method for tagging an object in a digital media asset comprising one or more images is disclosed. The method comprises using at least one hardware processor to: receive a first query image, wherein the query image comprises at least a portion of a first image from the one or more images of the digital media asset, wherein the first query image comprises a visual representation of an object; normalize the first query image by removing image noise from the first query image, and converting the first query image to a photometric invariant color space; determine a boundary that surrounds the visual representation of the object within the normalized first query image by segmenting the normalized first query image into regions, merging similar neighboring regions until no similar neighboring regions remain, and determining a boundary around one or more remaining regions as the boundary that surrounds the visual representation of the object; derive one or more features from visual attributes within the boundary that surrounds the visual representation of the object within the normalized first query image; for each of a plurality of reference object models representing reference objects, compare the derived one or more features to one or more corresponding features of the reference object model to determine a similarity score for the reference object represented by the reference object model; identify one or more reference objects based on their respective similarity scores; retrieve information associated with the identified one or more reference objects; and link the visual representation of the object in the digital media asset with the retrieved information associated with the identified one or more reference objects.

In an embodiment, a system for tagging an object in a digital media asset comprising one or more images is disclosed. The system comprises: at least one hardware processor; and one or more software modules that are configured to, when executed by the at least one hardware processor, receive a first query image, wherein the query image comprises at least a portion of a first image from the one or more images of the digital media asset, wherein the first query image comprises a visual representation of an object, normalize the first query image by removing image noise from the first query image, and converting the first query image to a photometric invariant color space, determine a boundary that surrounds the visual representation of the object within the normalized first query image by segmenting the normalized first query image into regions, merging similar neighboring regions until no similar neighboring regions remain, and determining a boundary around one or more remaining regions as the boundary that surrounds the visual representation of the object, derive one or more features from visual attributes within the boundary that surrounds the visual representation of the object within the normalized first query image, for each of a plurality of reference object models representing reference objects, compare the derived one or more features to one or more corresponding features of the reference object model to determine a similarity score for the reference object represented by the reference object model, identify one or more reference objects based on their respective similarity scores, retrieve information associated with the identified one or more reference objects, and link the visual representation of the object in the digital media asset with the retrieved information associated with the identified one or more reference objects.

In an embodiment, a non-transitory computer-readable medium is disclosed. The medium has instructions stored thereon, wherein the instructions, when executed by a processor, cause the processor to: receive a first query image, wherein the query image comprises at least a portion of a first image from the one or more images of the digital media asset, wherein the first query image comprises a visual representation of an object; normalize the first query image by removing image noise from the first query image, and converting the first query image to a photometric invariant color space; determine a boundary that surrounds the visual representation of the object within the normalized first query image by segmenting the normalized first query image into regions, merging similar neighboring regions until no similar neighboring regions remain, and determining a boundary around one or more remaining regions as the boundary that surrounds the visual representation of the object; derive one or more features from visual attributes within the boundary that surrounds the visual representation of the object within the normalized first query image; for each of a plurality of reference object models representing reference objects, compare the derived one or more features to one or more corresponding features of the reference object model to determine a similarity score for the reference object represented by the reference object model; identify one or more reference objects based on their respective similarity scores; retrieve information associated with the identified one or more reference objects; and link the visual representation of the object in the digital media asset with the retrieved information associated with the identified one or more reference objects.

In an embodiment a system for extensible media analysis is disclosed. The system comprises: at least one hardware processor; at least one object-localization software module that, when executed by the at least one hardware processor, locates objects in a digital media asset; at least one feature-extraction software module that, when executed by the at least one hardware processor, derives one or more features from visual attributes of objects located in a digital media asset by the at least one object-localization software module; at least one feature-matching software module that, when executed by the at least one hardware processor, compares one or more features derived by the at least one feature-extraction software module to one or more reference features of reference objects; at least one data-fusion software module that, when executed by the at least one hardware processor, determines a similarity score between a reference object and an object located in a digital media asset by the at least one object-localization software module, based on a comparison by the at least one feature-matching software module; an object-localization interface for replacing or extending the at least one object-localization software module; a feature-extraction interface for replacing or extending the at least one feature-extraction software module; and a data-fusion interface for replacing or extending the at least one data-fusion software module.

In an embodiment, a non-transitory computer-readable medium is disclosed. The medium has stored thereon: at least one object-localization software module that, when executed by the at least one hardware processor, locates objects in a digital media asset; at least one feature-extraction software module that, when executed by the at least one hardware processor, derives one or more features from visual attributes of objects located in a digital media asset by the at least one object-localization software module; at least one feature-matching software module that, when executed by the at least one hardware processor, compares one or more features derived by the at least one feature-extraction software module to one or more reference features of reference objects; at least one data-fusion software module that, when executed by the at least one hardware processor, determines a similarity score between a reference object and an object located in a digital media asset by the at least one object-localization software module, based on a comparison by the at least one feature-matching software module; an object-localization interface for replacing or extending the at least one object-localization software module; a feature-extraction interface for replacing or extending the at least one feature-extraction software module; and a data-fusion interface for replacing or extending the at least one data-fusion software module.

In an embodiment, a computer-implemented method for generating interactive content is disclosed. The method comprises using at least one hardware processor to: detect one or more objects visually represented in displayable content of a digital media asset; and, for each of the one or more objects visually represented in the displayable content of the digital media asset, identify one or more reference objects that match the object, retrieve data associated with the identified one or more reference objects, generate a hotspot package, wherein the hotspot package comprises a visual overlay, and wherein the visual overlay comprises information based on the retrieved data, determine a display position for the hotspot package based on a position of the object visually represented in the displayable content of the digital media asset, and embed the hotspot package with the displayable content of the digital media asset to be rendered at the determined display position.

In an embodiment, a system for generating interactive content is disclosed. The system comprises: at least one hardware processor; and one or more software modules that are configured to, when executed by the at least one hardware processor, detect one or more objects visually represented in displayable content of a digital media asset, and, for each of the one or more objects visually represented in the displayable content of the digital media asset, identify one or more reference objects that match the object, retrieve data associated with the identified one or more reference objects, generate a hotspot package, wherein the hotspot package comprises a visual overlay, and wherein the visual overlay comprises information based on the retrieved data, determine a display position for the hotspot package based on a position of the object visually represented in the displayable content of the digital media asset, and embed the hotspot package with the displayable content of the digital media asset to be rendered at the determined display position.

In an embodiment, a non-transitory computer-readable medium is disclosed. The medium has instructions stored thereon, wherein the instructions, when executed by a processor, cause the processor to: detect one or more objects visually represented in displayable content of a digital media asset; and, for each of the one or more objects visually represented in the displayable content of the digital media asset, identify one or more reference objects that match the object, retrieve data associated with the identified one or more reference objects, generate a hotspot package, wherein the hotspot package comprises a visual overlay, and wherein the visual overlay comprises information based on the retrieved data, determine a display position for the hotspot package based on a position of the object visually represented in the displayable content of the digital media asset, and embed the hotspot package with the displayable content of the digital media asset to be rendered at the determined display position.

BRIEF DESCRIPTION OF THE DRAWINGS

The details of the present application, both as to its structure and operation, may be gleaned in part by study of the accompanying figures, in which like reference numerals refer to like parts, and in which.

DETAILED DESCRIPTION

Figure 1:
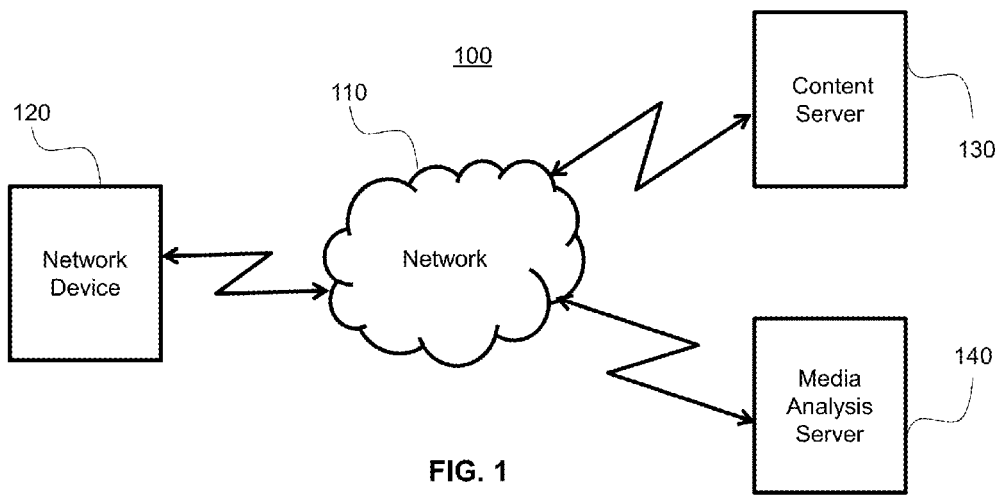
FIG. 1 is a high-level block diagram illustrating an example infrastructure in which one or more of the disclosed embodiments may operate, according to an embodiment.

After reading this description, it will become apparent to one skilled in the art how to implement the described techniques for intelligent tagging of digital media assets in various alternative embodiments and alternative applications. However, although various embodiments will be described herein, it is understood that these embodiments are presented by way of example and illustration only, and not limitation. As such, this detailed description of various embodiments should not be construed to limit the scope or breadth of the present application as set forth in the appended claims.

1. Overview

In an embodiment, objects located (i.e., detected) and identified in content of a digital media asset (e.g., in an image or the frame of a video) are made available to a user for direct interaction (e.g., through an interactive client application). Advantageously, embodiments described herein may not require special lighting and may work under normal lighting conditions. In addition, such embodiments may be robust to noise, perspective distortion, rotation, translation, scaling, shading, shadows, highlights, reflections, and/or other illumination variations, and/or partial occlusion of objects.

In an embodiment, a media analysis server is provided. As used herein, the term "media analysis server" should be understood to include any software and/or hardware capable of performing one or more of the functions, processes, or methods described herein. For instance, the media analysis server may be embodied entirely in software, may comprise one or more hardware processors executing software stored in volatile and/or non-volatile memory, or may be embodied entirely in hardware. The media analysis server may comprise means (e.g., software, hardware, or a combination of software and hardware) to locate and identify objects in content, such as images and video. The media analysis server may be connected via one or more networks (e.g., including the Internet, a wireless communications network, etc.) to a network device that is configured to execute software, including a client application such as an interactive video application.

In an embodiment, a digital media asset may be received by or stored on the network device. The digital media asset may have been captured at the network device (e.g., by a camera integrated in or communicatively coupled to the network device) or transferred to the network device, and/or stored in primary or secondary memory on the network device.

In an embodiment, a user of the network device may interact with objects (e.g., portions of an image or video) within the content of a digital media asset being viewed on a client application by, for example, selecting a portion of a video frame or a portion of an image (both of which may be collectively referred to herein as an "image") as an object of interest within the client application executing on the network device. It should be understood that this selection may be performed using any of a variety of well-known user operations, such as a touch operation on a touch-enabled network device (e.g., via a touch panel), an input operation using a pointing device (e.g., mouse), etc. In response to the user selection, the client application may generate a visual query (e.g., via a visual query generator module) to be used for locating objects in an input image and identifying objects corresponding or visually similar to the located objects in a database of enrolled object models.

In an embodiment, the media analysis server receives the visual query, generated by the client application executing on the network device, from the network device, via one or more networks. This visual query for object localization and identification may be provided to an object localization server, which may be internal to or separate from the media analysis server.

In an embodiment, the visual query undergoes a noise reduction process and is converted into a photometric invariant color space, through an image normalization process. This allows the system to be robust to shadows, shading, highlights, reflections, and other factors caused by changes in illumination.

In an embodiment, the media analysis server determines the type of digital media asset being processed (e.g., by checking if the digital media asset is a single image or a video), and selects one of at least two different processing methods based on the determined type of digital media asset.

In an embodiment, when the media analysis server determines that the input digital media asset is a single image, the normalized query image is further processed using an image segmentation. During image segmentation, the input query image is processed to extract perceptually homogeneous regions or segments that together compose the input query image. The goal is to represent each object in the query image by a single segment. To improve the quality of the segmentation result, small segments are removed using mathematical morphology techniques, and only segments large enough to correspond to objects in the input query image remain. Iteratively, each remaining segment in the segmented query image is then processed to determine the contours of that segment. Contours may be found by transforming each segment into a single-channel image (e.g., black-and-white image). Then, edges in the single-channel image for each segment are located using an edge detection operation (e.g., Canny edge detector). Contours of each segment can then be retrieved from the binary edge image resulting from the edge detection operation, and the points of the contours may be approximated by polygons. The contours of each segment correspond to the contours of the object in the query image corresponding to that segment. Further, structural characteristics of the contours are derived, and only those contours whose structural characteristics are within a predetermined range are retained as object candidates. The maximum convexity defect of each contour is obtained from the contour convex hulls. The moments, areas, and the mass center are derived, along with geometrical properties of the contour (e.g., relative area, compactness, solidity, aspect ratio, etc.), and a predetermined threshold is set for each contour's structural characteristics. In addition, the orientation of the detected object candidate for a given segment may be determined by first calculating the ellipse that best fits the points on the contour of the object, using an ellipse-fitting algorithm. The orientation of the object may then be determined by the orientation of the major axis of the fitting ellipse. The bounding rectangle of each segment is derived by calculating the minimal up-right bounding rectangle of the points on the contour of the object in the considered segment. The bounding rectangles of those segments that meet certain requirements related to the desired objects (e.g., maximum convexity defect, moments, areas, mass center, relative area, compactness, solidity, aspect ratio, etc.) are retained, and the portions of the image delimited by these bounding rectangles in the original query image are the object candidates.

When the media analysis server determines that the input digital media asset is a video, processing is accomplished on a frame-by-frame basis. Processing may be performed on each frame in the same or similar manner, as discussed above, with respect to an input image, except that now, scene change detection may be performed and a comparison of the content of a pair of frames (i.e., a current frame and a preceding frame) may be performed. When a new scene is encountered in the current frame of the video, the image segmentation process decomposes the normalized current frame of the video into perceptually homogeneous segments. For each of these segments, the object candidate generator module locates potential objects in the current frame of the video by analyzing the regions in the image segment for geometry, convexity defects, etc., as described for the previous case of a single image. For subsequent frames, when the content of the current frame is determined to be similar to the content of the preceding frame, these potential objects or object candidates are followed from one frame to subsequent frame(s) by an object tracking module until another scene change is encountered. The object candidates remain the same through these tracked frames, but their positions within these frames are updated by the object tracking module. At the current frame in which a scene change is detected, image segmentation is reiterated, generating a new set of object candidates. An illustration of this scheme is the detection of moving objects in a video (e.g., person wearing a white shirt and blue pants, and walking along a solid gray wall). In this case, despite motion, the content of a plurality of consecutive frames is the same (e.g., person wearing a white shirt and blue pants, and walking along a solid gray wall). Therefore, until a scene change is detected (e.g., same person, wearing same clothes, now walking along the background of a busy street), only the first frame will be subjected to the image segmentation and object candidate generation processes, whereas the subsequent frames will not. Rather, in the subsequent frames (i.e., until a scene change is detected), only the new positions of the objects will be updated, thereby improving efficiency.

In an embodiment, regardless of the type of the digital media asset, the output of the object localization server is a list of one or more object candidates.

In an embodiment, the object localization server provides the list of object candidate(s) to an object identification server. The object identification server may also be internal to or separate from the media analysis server.

In an embodiment, the object identification server comprises a geometric normalization module. The geometric normalization module receives, as input, a bounding rectangle enclosing each of the object candidates in the list of object candidates output from the object localization server described above, and normalizes the bounding rectangle to have the same width and height, and/or aspect ratio, as a pre-defined standard image size and/or aspect ratio (e.g., the same pre-defined standard image size and/or aspect ratio used when generating object models enrolled in a reference database). This normalization of size and/or aspect ratio ensures consistency of results, when comparing local feature descriptors from an input image with local feature descriptors from reference images modeled in a database, and avoids issues that may arise from variations in scale.

In an embodiment, the object identification server comprises a feature extraction module that derives features from each of the geometrically-normalized object candidates in the list of object candidates, and a feature matching module that uses the derived features to attempt to match each object candidate to one or more of a plurality of enrolled object models in a database. For example, the feature extraction module may derive features based on different attributes such as color, texture, shape, keypoints, etc. The feature matching module may then compare one or more—including, in some embodiments, each—of these derived features with the corresponding features of one or more—including, in some embodiments, all—of the enrolled object model in the database, and calculate a similarity score(s) representing a similarity of the object candidate with each of one or more enrolled object models in the database, relative to other similarity scores.

In an embodiment, the calculation of a similarity score for an object candidate and an enrolled object model in the database may comprise calculating similarity scores for each feature (e.g., color, texture, shape, keypoints, etc.). The feature-specific similarity scores may then be combined into a single matching score that represents the total degree of similarity of the input object candidate image to the enrolled object model found in the database.

It is expected that, given a certain level of confidence (e.g., a threshold of similarity scores), several images from the database may be a match to the input image. In such instances, it is practical to rank the matching object models (or the objects represented by the matching object models) by their degree of similarity (e.g., according to their similarity scores). In an embodiment, the results may be reduced to the N matching object models with the highest scores (e.g., ten matching object models with the highest scores). This result may be presented as a list of identified items and for each identified item, a list of visually similar items, and/or fed into a content interactivity synthesizer, which embeds hotspot packages relevant to located and identified objects inside the original content, making the content interactive and ready for consumption by the client application (e.g., interactive video application) running on the network device, via the content server.

In an embodiment, the list of object candidates is input to a content interactivity synthesizer. The content interactivity synthesizer embeds hotspot packages relevant to the listed object candidates inside the original content of the digital media asset. In this manner, the content of the digital media asset is made interactive and ready for consumption, for example, by an interactive application running on a network device (e.g., via a content server). Alternatively or additionally, the interactive content may be published on a brand's portal, on a social network, and/or the like (e.g., via the content server).

In an embodiment, the enrolled object models in the database comprise features, derived from objects in an image catalogue, using the same attributes (e.g., color, texture, shape, keypoints, etc.) as are used to derive features from object candidates. In such an embodiment, the feature extraction module can be used to extract features from the objects to be enrolled from the image catalogue, as well as to extract features from object candidates. The extracted features for each image in the catalog of images may be used as, or to generate, an enrolled object model for that image. The enrolled object model for each image in the catalog may then be stored in the database for comparison to the extracted features of input image by the matching module.

In embodiments in which the located and identified objects (i.e., represented by enrolled object models matching a given object candidate image) are purchasable products or other items, the media analysis server and/or client application may facilitate the purchase of the identified objects. For instance, a client application (e.g., interactive application) executing on a network device may generate a visual query (e.g., via visual query generator) from the content of the digital media asset (e.g., from at least a portion of an image or video frame). The visual query, which may comprise at least a portion of the digital media asset (e.g., a portion of an image or video frame containing an object of interest), may be transmitted by the client application from the network device to a media analysis server. The media analysis server may comprise or be interfaced with the object localization server which performs the two-stage process of object localization (e.g., detection) and object identification, using the feature extraction module, the feature matching module, and the database of enrolled object models, as described above. The media analysis server may return a list of one or more identified objects, representing enrolled object models from the database that were matched (e.g., to a given degree of confidence) to a given object (e.g., identified as the object) in the digital media asset, to the client application executing on the network device. The list of identified objects may also comprise transaction information associated with each identified object in the list. One or more modules at the client application and/or the media analysis server may then facilitate a selection of at least one of the one or more identified objects for purchase, and/or initiate a purchase of the selected object. For example, the client application may receive the list of identified objects, including the transaction information, and render the interactive content of the digital media asset with hotspot package(s) that comprise a user interface for purchasing or initiating a purchase of identified object(s) in the list.

In this manner, the user may indicate whether and how many of the items, represented in the list of identified objects, to purchase. The client application may then communicate with an e-commerce platform to complete the transaction. In an embodiment, the user registers with a commerce platform supporting the client application, to provide transaction information such as name, credit card number, shipping address, etc. This information, whether provided in advance or during the transaction, is used by the commerce platform to complete the transaction. Different options may be available during or as the transaction, such as allowing the user to request more information about the item(s) to be sent to the user's email address, having hardcopy information about the item(s) mailed to a mailing address, allowing the user to specify that the item(s) be delivered to another party, selecting the item(s) as a gift, obtaining information on related item(s), etc.

It should be understood that the input image, from which object are located and identified, may comprise only a portion of an image displayed at the network device (e.g., within the client application) and/or only a portion of an object within the image displayed at the network device. Image segmentation, scene change detection, object candidate generation, object tracking, feature extraction, matching, and data fusion may be performed in the same manner as discussed above, resulting in a ranked list of identified objects, and for each identified object, a list of visually similar items, that is returned to the network device running the client application, via the content server, thereby enhancing user interaction and usability. For example, the object localization server and the object identification server may also be used to identify a list of one or more objects represented in the database of enrolled object models that are similar to an identified object from a digital media asset, in the same or similar manner as described above. In addition, this list of visually similar objects may be ranked according to a similarity score in the same or similar manner as discussed above.

In an embodiment in which the objects correspond to products, one or more modules may be provided which enable a consumer to make an online purchase from the ranked list of visually similar objects. For example, a representation of a visually similar product may be selected (e.g., clicked if the list is implemented as a list of hyperlinks), from the list of visually similar objects, by the consumer to initiate a purchase of the product.

In an embodiment, a platform is provided for purchasing an item that corresponds to an object identified in a digital media asset or visually similar to an object identified in a digital media asset. The platform comprise a client application (e.g., interactive video application) executing on a network device, and which generates a visual query (e.g., comprising an image or a portion of an image containing at least a portion of an object of interest). The platform also comprises a media analysis server which performs object localization and feature extraction. Alternatively, object localization and feature extraction for each of the located objects may be performed by the client application, and the visual query may comprise a representation of the extracted features, rather than an input image. The platform further comprises a database comprising a plurality of enrolled object models. The media analysis server may comprise an object localization server to detect potential object(s) in the visual query, a feature matching module that matches the object candidates from object localization to enrolled object models in the database. In addition, the media analysis server may comprise a transaction module that initiates a transaction, and which may send transaction information to the client application executing on the network device.

The processes described herein for feature extraction (e.g., by the feature extraction module) allow the system (e.g., media analysis server, client application, or combination of media analysis server and client application) to be robust to variations in scale, to the presence of shadows, to shading, to reflections, to partial occlusions, and to geometrical viewpoint. In an embodiment, no special lighting conditions are required for capturing images and video. This provides means for a practical object identification method and object identification system that satisfies requirements for deployment in real-world situations.

As a non-limiting example of an application of an object identification service, a consumer may use a mobile network device (e.g., PDA, cell phone, tablet, etc.), to capture or otherwise generate an image or video of an object or group of objects, and use a client application to select one or several images or a video. A visual query is generated by the client application in response to the user's selection(s), and sent by the client application to the media analysis server via one or more networks. The media analysis server receives the visual query from the network device via the network(s). The selected image(s) represented by the visual query are analyzed by the object localization server to detect potential objects that are returned as candidate objects. These candidate objects are identified by matching features extracted from each candidate object image to the features represented by enrolled object models in a database. Product information relevant to the matched enrolled object model(s) is embedded in the original image or video in association with the user-selected image(s) so as to render the user-selected image(s) as interactive, and an interactive image or video is provided to the consumer via a content server. By selecting any of the interactive object(s) in the processed image or video, product information embedded for that object may be provided to the consumer. In addition, selecting interactive object(s) may also generate a query to the media analysis server for visually similar objects in a database, along with corresponding product information for the visually similar objects.

Continuing the example, the media analysis server returns a list of identified objects, and for each object, a list of items corresponding to the visually similar objects. A user may select any of the listed items, and, in response, a dedicated user interface may be overlaid on the corresponding video frame or image, with object information (e.g., product information if the object is a product) relevant to this item, including an image of the selected item.

Again continuing the example, the media analysis server may receive a query for object identification, during interaction with objects embedded in an interactive image or video, and, in response, perform object localization and identification and return a link to a list of identified objects. In addition, the media analysis server may return, for each identified object, a list of items corresponding to visually similar objects. The list of identified objects and/or visually similar objects may be provided as another overlay on the video frame or image. In an embodiment, all items in the list of identified objects and/or visually similar objects may be scrolled and/or selected for additional information.

As another non-limiting example of an application of an object identification service, a consumer may use a mobile network device (e.g., PDA, cell phone, tablet, etc.) to capture or otherwise generate an image or video of a person wearing a certain outfit. The consumer uses the client application to select the outfit in the image or the video. A visual query is generated by the client application in response to the user's selection(s), and sent by the client application to the media analysis server via one or more networks. The visual query may comprise an image containing the outfit (e.g., a portion of the image or video of the person wearing the outfit). The media analysis server receives the visual query from the network device via the network(s). The image containing the outfit represented by the visual query is analyzed by the object localization server of the media analysis server to detect the outfit, that that is output to the object identification server of the media analysis server as a candidate object. The candidate object, representing the outfit, is identified by the object identification server by matching features extracted from the image representing the outfit to the features represented by enrolled object models in a database. Product information relevant to the matched enrolled object model(s) (e.g., a description of the outfit, a price of the outfit, an image of the outfit, etc.) is embedded in the original image or video in association with the portion of the original image or video containing the outfit, so as to render the outfit as interactive within the original image or video, and an interactive image or video is provided to the consumer (e.g., via a content server). Throughout the process of interacting with the interactive image or video, one or more visual queries may be generated and sent to the media analysis server to obtain information related to the previously-identified outfit which has been rendered as interactive and/or a list of items that are visually similar (e.g., similar outfits) to object(s) identified in the interactive video or image. It should be understood that the visual queries for visually similar object(s) may be in addition to or part of the visual query generated in response to the user's selection(s) of the outfit discussed above. This information related to the outfit worn by the person, and the object (s) that are visually similar to the outfit worn by the person in the video or image, may then be presented to the consumer (e.g., via a content server). In this manner, the consumer may discover new, previously-unknown items based on the information related to the visually similar object(s), potentially resulting in the purchase of item(s) corresponding to the visually similar object(s), for example, through an e-commerce platform.

As another non-limiting example of an application of an object identification service, a consumer may use a mobile network device (e.g., PDA, cell phone, tablet, etc.) to capture or otherwise generate an image or video of an object. The consumer uses the client application to select a portion of the image or video. A visual query is generated by the client application in response to the user's selection(s), and sent by the client application to the media analysis service via one or more networks. The media analysis server receives that visual query from the network device via the network(s). The image represented by the visual query is analyzed by the object localization server to detect potential objects that are returned as object candidates. These object candidates are identified by matching extracted features from each object candidate image to the features represented by enrolled object models in a database. Alternatively or additionally, objects that are visually similar to the object candidates are identified. Information relevant to the identified objects and to these visually similar objects are embedded in the original image or video in association with the user-selected object(s) so as to render the user-selected object(s) as interactive, and the interactive image or video is provided to the consumer (e.g., via a content server). In this manner, while a consumer interacts with the image or video (e.g., by selecting an interactive object of interest), the results of a visual query for matching or visually similar objects in the database may be obtained and provided to a consumer. In a realistic example, the interaction by the consumer may comprise the consumer selecting a portion of the image or video representing a product, such as an item of clothing or clothing accessory (e.g., shirt, t-shirt, pants, dress, overcoat, jacket, sunglasses, watch, jewelry, etc.). In response, matching and/or similar products (e.g., shirts, t-shirts, pants, dresses, overcoats, jackets, sunglasses, watches, jewelry, etc.) will be identified (e.g., by the media analysis server using the search process described herein), and information related to these matching and/or similar products may be provided to the user in a ranked list.

In another realistic example, the interaction by the consumer may comprise the consumer selecting an entire image or video representing, for example, people wearing products, such as an item of clothing or clothing accessory (e.g., shirt, t-shirt, pants, dress, overcoat, jacket, sunglasses, watch, jewelry, etc.). In response, objects within the content will be located by the localization server (e.g., shirt, t-shirt, pants, dress, overcoat, jacket, sunglasses, watch, jewelry, etc.), and identified (e.g., by the media analysis server using the identification process described herein), followed by identification of similar products (e.g., shirts, t-shirts, pants, dresses, overcoats, jackets, sunglasses, watches, jewelry, etc.). Information related to identified objects and to similar products may then be provided to the user in a ranked list.

Accordingly, the present application discloses technology that enables a user to identify items in content, such as a video or image, in the context of interactive applications. In embodiments described herein, object identification capabilities or results are embedded in the original content (e.g., original video or image).

2. Modules

In an embodiment, one or more modules (e.g., software modules, hardware modules, and/or a combination of software and hardware modules)—for example, of a media analysis server, a network device, or distributed across a media analysis server and network device—process digital media asset(s) (e.g., image(s) or video(s)) to locate and identify objects within each digital media asset. Each digital media asset may have a single frame (e.g., a digital image) or a plurality of frames (e.g., a digital video). The module(s) may further associate each of the identified objects with a set of commerce-related information (e.g., related information about the identified object). For example, in instances in which the identified objects represent products, the related information may include product information (e.g., descriptions, prices, images, sizes, etc.), links to websites where the product can be purchased, and the like.

In an embodiment, the module(s) generate a hotspot package that includes commerce-related information, as well as a small graphical overlay that is superimposed on the original digital media asset (e.g., on a frame of a video, when the frame is presented on a display). One or more hotspot packages can be associated with each of one or more commercial objects (e.g., consumer products) appearing in a single image or video frame. For instance, a small graphical overlay may be provided on or in close proximity to each commercial object in the single image or video frame. Thus, it should be understood that a plurality of graphical overlays, representing one or more hotspot packages, may be provided on a single image or video frame for each of a plurality of commercial objects in the single image or video frame.

In the same manner, for a digital media asset comprising multiple frames (e.g., a video or animation), one or more hotspot packages can be associated with one or more commercial objects appearing in each frame (e.g., using the small graphical overlay). During playback of the multi-frame digital media asset, the small graphical overlay of the hotspot package may appear to persist in association with the commercial object over time (e.g., over a plurality of video frames). In an embodiment, selection of a small graphical overlay from a hotspot package by a user results in the client application presenting, on the display of the network device, the commerce-related information from the hotspot package in place of or in addition to the small graphical overlay.

In an embodiment, the interactive multi-frame digital media asset (e.g., interactive video) that is returned to the interactive client application comprises all hotspots, which prompt the graphical overlays of the corresponding hotspot packages in real time when the interactive multi-frame digital media asset is played back. The interactive multi-frame digital media asset can comprise a singular hotspot, or a plurality of hotspots, depending on the digital content being utilized and/or the number of detected objects. According to an embodiment, the interactive multi-frame digital media asset can be edited to add additional hotspots for additional identified objects, remove hotspots, and/or change the placement of hotspots, for example, using a dedicated editing tool. The location of hotspots and/or hotspot packages across frames may be recorded using object-tracking techniques after appropriate selection of the targeted hotspots and/or hotspot packages. An object in the database that is associated with the hotspot and/or hotspot package may be changed (e.g., using the editing tool), along with a corresponding product description. The editing tool may enable particular overlays for a hotspot and/or hotspot package to be turned on or off in a given frame depending on the presence or absence of a desired object within the frame. In addition, the editing tool may enable modifications on hotspots and/or hotspot packages to be undertaken concurrently in the same digital media asset by multiple users.

FIG. 1 depicts a high-level block diagram of a network-based infrastructure 100 in which one or more of the disclosed embodiments may operate, according to an embodiment. One or more wired and/or wireless networks 110 communicatively connect one or more wired or wireless network devices 120 to one or more media analysis servers 140. Network device 120 generates a visual query from an input image, and sends the visual query to media analysis server 140. Media analysis server 140 receives the visual query from network device 120. Features are extracted or derived from visual attributes pertinent to the input image at one or both of the network device 120 and media analysis server 140. These features are then used by media analysis server 140 to locate and identify objects in images and generate interactive content from the original content. The interactive content may be made available to network device 120 by a content server 130.

Figure 2:
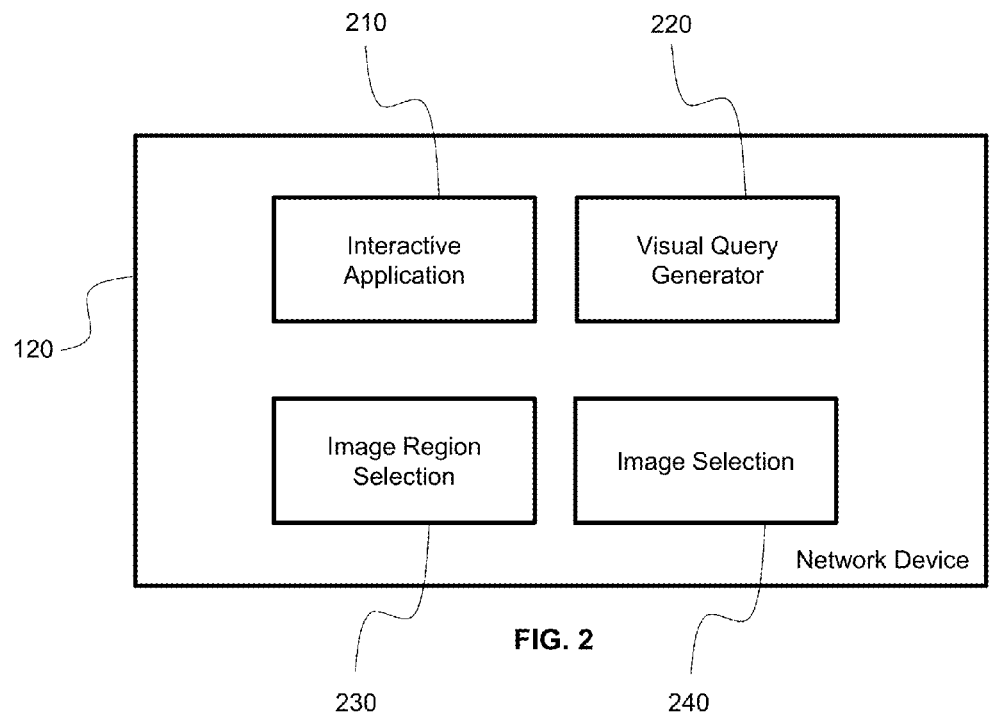
FIG. 2 is a block diagram illustrating an example network device, according to an embodiment.

FIG. 2 depicts a block diagram of wired or wireless network device 120, according to an embodiment. Network device 120 comprises a client application that comprises an interactive module or application 210 (e.g., an interactive video player and/or interactive image browser), a visual query generator module, an image region selection module 230, and/or an image selection module 240. However, it should be understood that the client application executing on network device 120 may comprise fewer or more modules and/or a different combination modules. For example, the client application may be a plug-in or other module that comprises visual query generator module 220, image region selection module 230, and/or image selection module 240, and interfaces with a separate interactive application 210.

In an embodiment, visual query generator 220 generates visual queries using image region selection module 230 and/or image selection module 240. Image region selection module 230 provides for selection of a portion or region of an image (e.g., a portion of a video frame) in a digital media asset, whereas image selection module 240 provides for selection of an entire image (e.g., an entire video frame).

Figure 3:
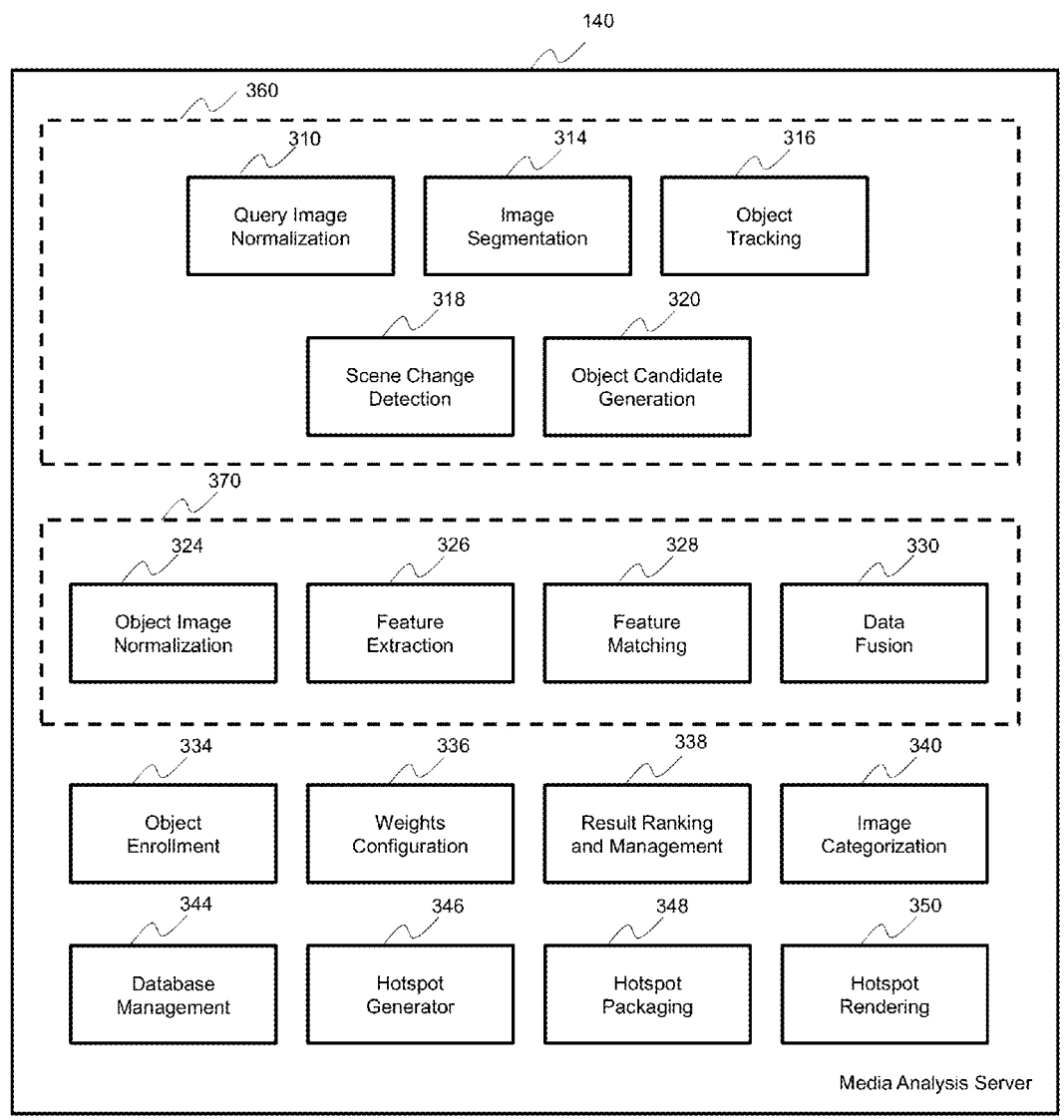
FIG. 3 is a block diagram illustrating an example media analysis server, according to an embodiment.

FIG. 3 depicts a block diagram of media analysis server 140, according to an embodiment. Media analysis server 140 may comprise a query image normalization module 310, image segmentation module 314, object tracking module 316, scene change detection module 318, object candidate generation module 320, object image normalization module 324, feature extraction module 326, feature matching module 328, data fusion module 330, object enrollment module 334, weights configuration module 336, result ranking and management module 338, image categorization module 340, database management module 344, hotspot generator module 346, hotspot packaging module 348, and hotspot rendering module 350—the functions of each of which will be described in more detail below. Query image normalization module 310, image segmentation module 314, object tracking module 316, scene change detection module 318, and/or object candidate generation module 320 may together form at least a portion of an object localization server 360, which may be internal to media analysis server 140. Object image normalization module 324, feature extraction module 326, feature matching module 328, and/or data fusion module 330 may together form at least a portion of an object identification server 370, which may be internal to media analysis server 140. It should be understood that media analysis server 140 may comprise fewer or more modules and/or a different combination of modules than those illustrated in FIG. 3. For example, in an alternative embodiment, object localization server 360, and object identification server 370 may be separate from and interfaced with media analysis server 140.

3. Content Interactivity

Figure 4A:
FIG. 4A illustrates an example raw video frame before processing, according to an embodiment.

FIG. 4A depicts an example raw video frame 400 (e.g., before processing), according to an embodiment. In the illustrated embodiment, video frame 400 comprises a view area 405 where images and/or video are displayed, a control area 410 where video playback control buttons and information (e.g., play/stop, slider, volume, total playback time, current playback time, etc.) and display control buttons (settings, minimize, maximize, etc.) are located, and a toggle tab 415A that shows or hides another display (i.e., hotspot package) with information related to objects in the image or video displayed in view area 405. Video frame 400 may be a user interface provided by the client application, executing on network device 120 that communicates with media analysis server 140. Alternatively, the client application may simply be a plug-in (e.g., to a separate playback application) or other module that generates toggle tab 415A.

Figure 4B:
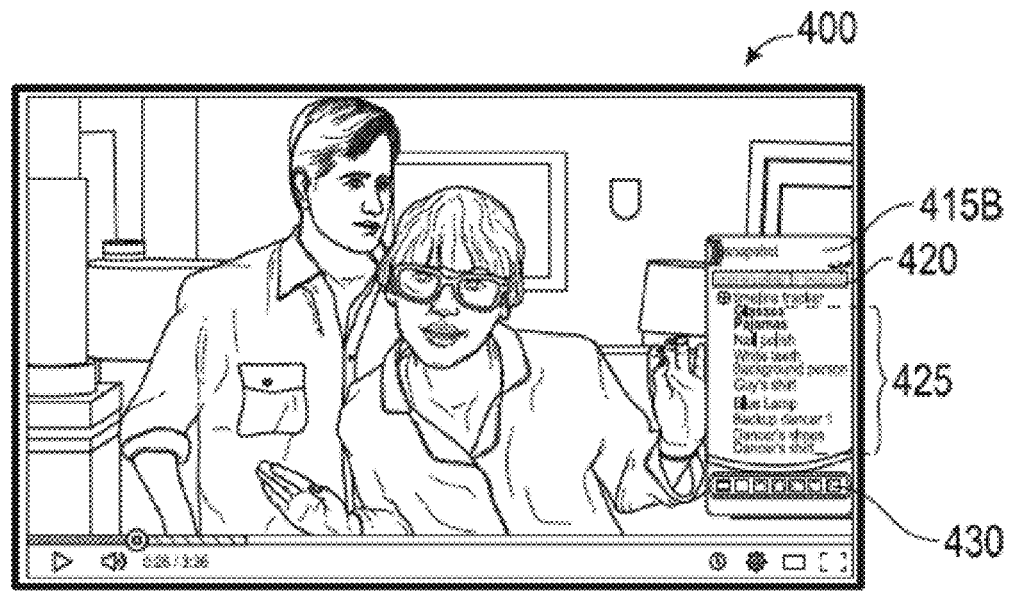
FIG. 4B illustrates an example processed video frame having a hotspot package, according to an embodiment.

FIG. 4B depicts an example processed video frame 400, having a hotspot package 415B, according to an embodiment. In the illustrated embodiment, hotspot package 415B is presented on a display as an overlay to video frame 400. In an embodiment, hotspot package 415B comprises a search box 420 to query for any hotspot embedded in video frame 400, a snapshot 425 of all hotspots embedded in video frame 400, and a hotspot gallery 430 that enables browsing of all hotspots embedded in video frame 400 through their respective thumbnail images.

Figure 4C:
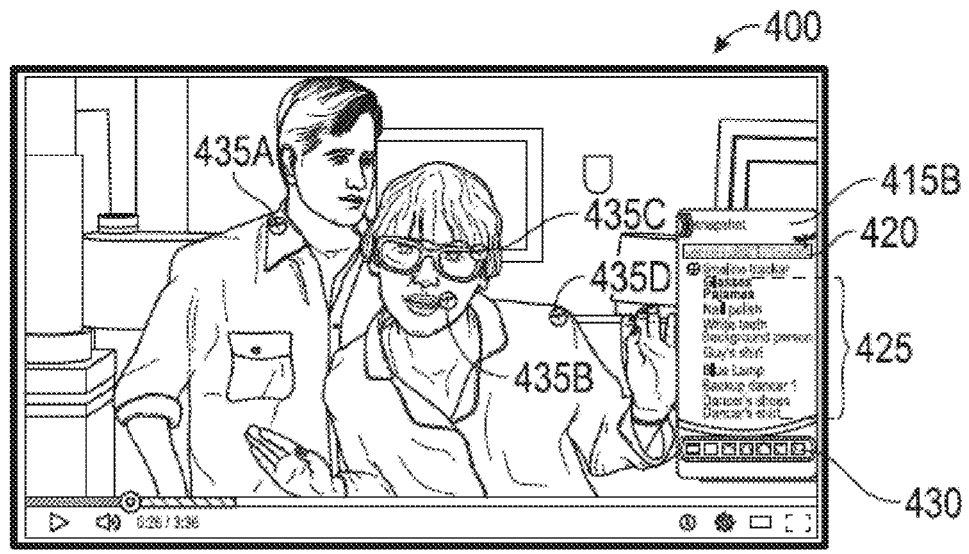
FIG. 4C illustrates an example processed video frame having four hotspots and one hotspot package, according to an embodiment.

FIG. 4C depicts an example processed video frame 400, having a hotspot package 415B, according to an embodiment. In the illustrated embodiment, video frame 400 is overlaid with a hotspot package 415B that includes a search box 420 to query any hotspot embedded in video frame 400, a snapshot 425 of a plurality of hotspots 435 that are associated with video frame 400, and a hotspot gallery 430 that enables browsing of all hotspots embedded in video frame 400 through their respective thumbnail images. Specifically, the hotspots associated with video frame 400 include shirt 435A, face 435B, glasses 435C, and pajamas 435D. Each hotspot 435A-435D is presented on a display as an overlay to video frame 400. In the illustrated embodiment, the hotspots 435A-435D are each visually represented as an unobtrusive circular object displayed on top of (or in close proximity to) its associated object in video frame 400. Thus, since there are a plurality of identified objects in video frame 400, there are a plurality of hotspots 435A-435D (i.e., each visually represented as an overlaid circular object), each of which is associated with a different one of the plurality of identified objects (i.e., shirt, face, glasses, and pajamas).

Figure 4D:
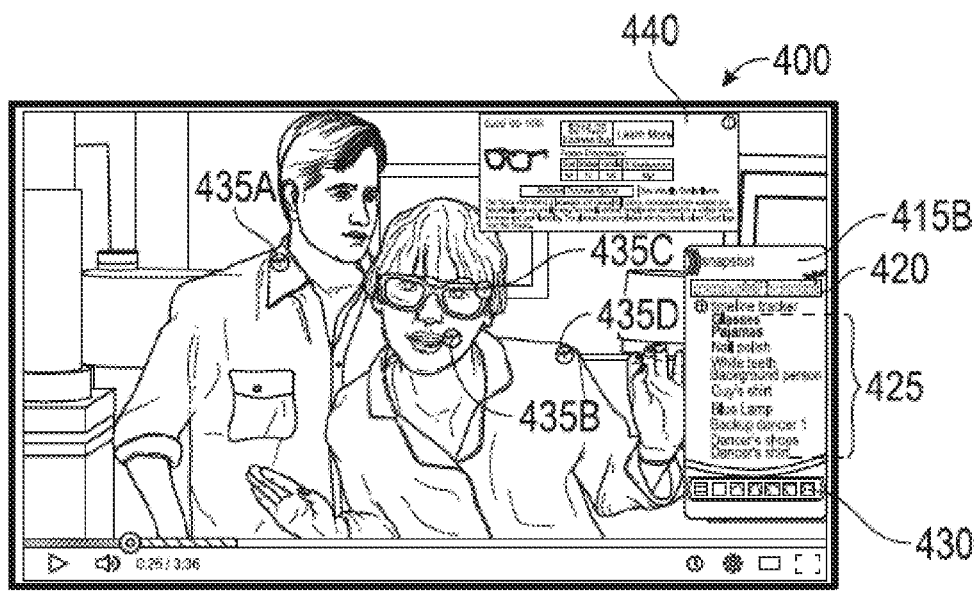
FIG. 4D illustrates an example processed video frame having four hotspots and two hotspot packages, according to an embodiment.

FIG. 4D depicts an example processed video frame, having four hotspots and two hotspot packages, according to an embodiment. In the illustrated embodiment, video frame 400 is overlaid with a first hotspot package 415B that includes a search box 420 to query any hotspot embedded in video frame 400, a snapshot 425 of a plurality of hotspots 435 that are associated with video frame 400, and a hotspot gallery 430 that enables browsing of all hotspots embedded in video frame 400 through their respective thumbnail images. Specifically, the hotspots associated with video frame 400 include shirt 435A, face 435B, glasses 435C, and pajamas 435D. There is a second hotspot package 440 associated with hotspot 435C for glasses.

Figure 4E:
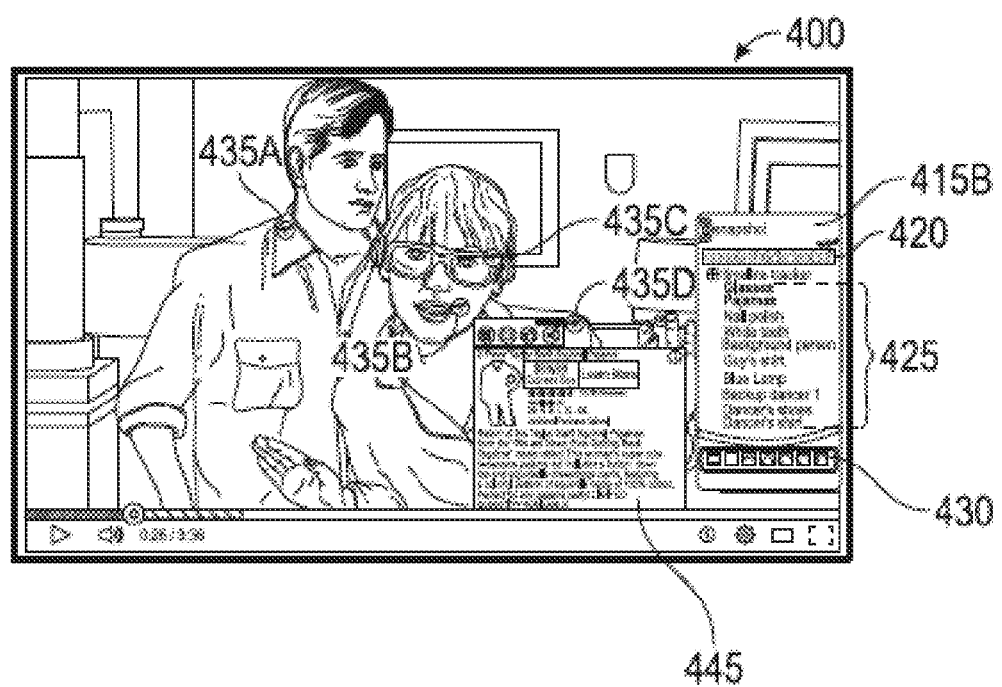
FIG. 4E illustrates an example processed video frame having four hotspots and two hotspot packages, according to an embodiment.

FIG. 4E depicts an example processed video frame, having four hotspots and two hotspot packages, according to an embodiment. In the illustrated embodiment, video frame 400 is overlaid with a hotspot package 415B that includes a search box 420 to query any hotspot embedded in video frame 400, a snapshot 425 of a plurality of hotspots 435 that are associated with video frame 400, and a hotspot gallery 430 that enables browsing of all hotspots embedded in video frame 400 through their respective thumbnail images. Specifically, the hotspots associated with video frame 400 include shirt 435A, face 435B, glasses 435C, and pajamas 435D. There is a hotspot package 445 associated with hotspot 435C for pajamas.

Figure 4F:
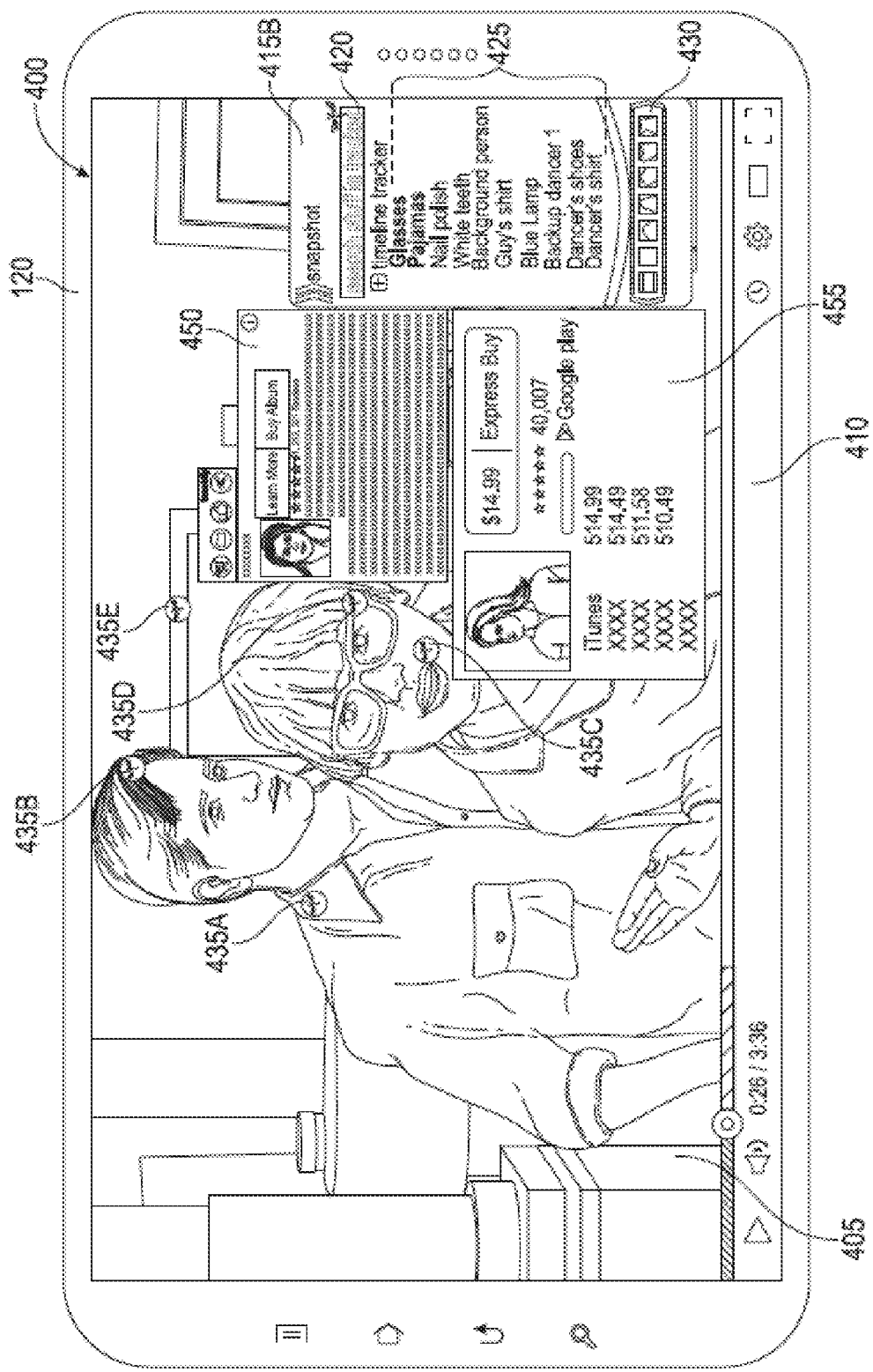
FIG. 4F illustrates an example processed video frame having five hotspots and three hotspot packages on a mobile network device, according to an embodiment.

FIG. 4F depicts an example processed video frame, having five hotspots and three hotspot packages, on the display of a mobile network device, according to an embodiment. In the illustrated embodiment, video frame 400 is rendered on a wireless mobile device 120 and overlaid with a hotspot package 415B that includes a search box 420 to query any hotspot embedded in video frame 400, a snapshot 425 of a plurality of hotspots 435 that are associated with video frame 400, and a hotspot gallery 430 that enables browsing of all hotspots embedded in video frame 400 through their respective thumbnail images. Specifically, the hotspots associated with video frame 400 include shirt 435A, face 435B, face 435C, glasses 435D, and picture frame 435E. There is a hotspot package 450 associated with the hotspot 435E for the picture frame, and another hotspot package 455 associated with the hotspot 435C for the face.

In an embodiment, the processing of the digital media asset to generate an interactive digital media asset with embedded hotspots is performed prior to playback of the digital media asset. The processed digital media asset can be stored in its processed form (i.e., including the various hotspots packages that are associated, for example, with the various frames of the digital media asset). One advantageous application of this embodiment is for regular television content and pre-recorded video streaming (e.g., YouTube® and Netflix®).

In an alternative embodiment, the processing of the digital media asset to generate an interactive digital media asset with embedded hotspots is performed in real time during presentation of the digital media asset on a display device (e.g., network device 120). In such an embodiment, individual frames of the digital media asset (or simply the image if the digital media asset is an image) are analyzed (e.g., by media analysis server 140), during spooling or buffering of the content, to identify objects (e.g., commercial objects, such as products).

In an embodiment, hotspot packages for objects are pre-generated and stored and available for use (e.g., for embedding within digital media assets). In such an embodiment, a digital media asset (e.g., the frames of a video) is analyzed (e.g., by media analysis server 140) to identify an object in the digital media asset. The identified objects are associated with related information (e.g., a product identifier and a location), and that information may be combined with a pre-stored hotspot package for rendering as an overlay on the digital media asset (e.g., on the frame of a video) during playback of that portion (e.g., frame) of the digital media asset on the display. One advantageous application of this embodiment is for interactive television content and live video streaming.

In an embodiment, users may interact directly with one or more inputs of the visual overlay of a rendered hotspot package for a social e-commerce video experience. For instance, the user may receive social media updates, and upload e-commerce object brands. The user may also share e-commerce objects to social media assets, "like" e-commerce object to social media sites (e.g., Facebook™, Google+™, Twitter™, Yelp™, etc.), learn more by linking to an e-commerce object website, etc. In an embodiment, the hotspot package is a live rendering of all information presented to a user to ensure consistency with all current information available on the presented e-commerce object.

4. Object Localization and Identification

Figure 5:
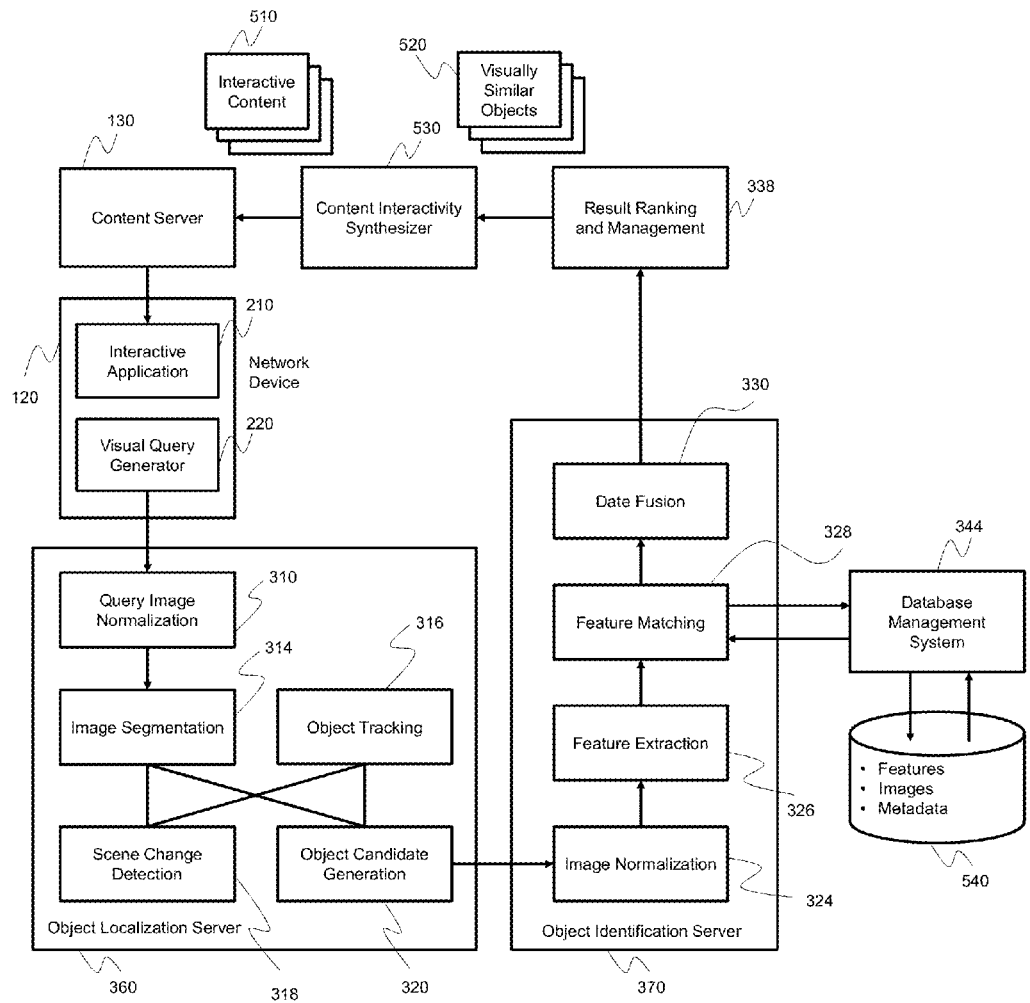
FIG. 5 is a block diagram illustrating an example of the modules that implement one or more of the disclosed embodiments, according to an embodiment.

FIG. 5 depicts the interaction of various modules of network device 120, content server 130, and media analysis server 140, according to an embodiment. However, the illustrated configuration is non-limiting, and it should be understood that, in alternative embodiments, the depicted modules may be distributed among network device 120, content server 130, media analysis server 140, and/or another component in a different manner than illustrated.

In the illustrated embodiment, network device 120 runs interactive application 210 (e.g., interactive video player and/or interactive image browser) which plays back a digital media asset and provides a user interface, during playback, for directly interacting with objects identified in the digital media asset. In an embodiment, a visual query may be generated by query generator 220 by at least two different methods.

According to a first method, a portion of an image of interest is selected (e.g., by a user via a visual query input) through image region selection module 230. For example, a user may freely select a region or a portion of interest of an image via image region selection module 230. In response, visual query generator module 220 may refer to image region selection module 230 and generate a visual query based on the selected region of interest.

According to a second method, an image of interest is selected (e.g., by a user) via image selection module 240. For example, a user selection of an entire image of interest through interactive application 210 may result in a call to visual query generator module 220 to refer to image selection module 240 and generate a visual query based on the entire image of interest.

In embodiments in which object localization server 360 and object identification server 370 are physically separated from network device 120 (e.g., in embodiments in which object localization server 360 and object identification server 370 are executed by another device, such as a device comprising media analysis server 140), the query image (e.g., comprising a region or entire image of interest) is transmitted, in a visual query, from the client application (e.g., comprising interactive module or application 210) to object localization server 360 using conventional digital wired network and/or wireless network means.

Object localization server 360 receives the visual query, generated by query generator module 220, and uses the visual query to locate (i.e., detect) objects in the query image to be used by object identification server 370 to identify objects which match or are visually similar to object(s) detected in the query image.

Figure 11:
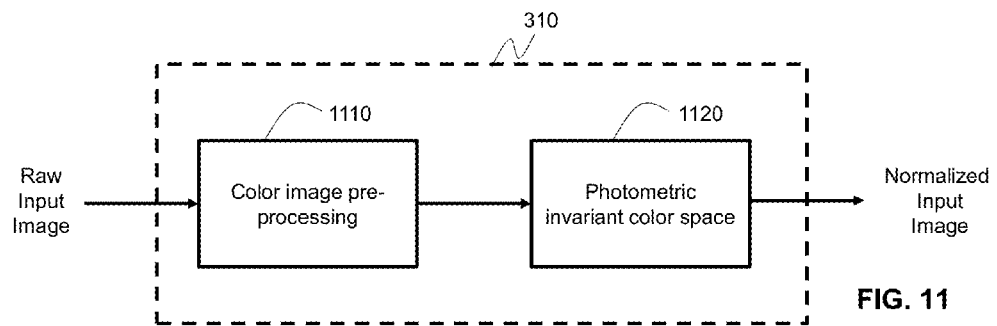
FIG. 11 is a block diagram illustrating an example image normalization process, according to an embodiment.

Query image normalization module 310 conditions query images prior to image segmentation. This process is illustrated in FIG. 11, according to an embodiment. For example, query image normalization module 310 may comprise color image pre-processing module 1110 and photometric invariant color space module 1120. Color image pre-processing module 1110 pre-processes the query image to remove image noise. In addition, to facilitate the subsequent stages of the object recognition process, color image pre-processing module 1110 may perform additional pre-processing steps, for example, to enhance brightness and/or contrast. During this pre-processing, the query image may also be normalized to a predefined size and/or aspect ratio.

In an embodiment, photometric invariant color space module 1120 converts the query image (e.g., the pre-processed query image output from color image pre-processing module 1110) to a photometric invariant color space. This allows the object recognition process to be robust to shadows, shading, highlights, reflections, and other factors caused by differences in illumination. Transformation of images into photometric invariant color spaces will be examine in greater details elsewhere herein (e.g., when discussing pre-processing to enroll images of objects into a database).

In an embodiment, the normalized query images output by image normalization module 310 are further processed by four additional modules: image segmentation module 314, object tracking module 316, scene change detection module 318, and object candidate generation module 320. Image segmentation module 314 decomposes the visual query image into perceptually homogeneous segment(s). Each of the segment(s) corresponds to one or more potential objects in the query image.

If the input digital media asset is an image, object tracking module 316 and scene change detection module 318 are bypassed, such that the segment(s) output by image segmentation module 314 may be input to object candidate generator module 320 without use of object tracking module 316 or scene change detection module 318.

In an embodiment, the scene change detection module 318 analyzes each frame and detects whether or not a scene change occurs between consecutive frames such that the content of the frames is different. The purpose of change scene detection module 318 is to limit processing by image segmentation module 314 to just those video frames whose content is different than the content in the preceding frame. For example, there is a scene change when a video frame depicting a car driving in a forest is followed by a video frame depicting the same car driving in city traffic. On the other hand, there would be no scene change when a video frame depicting a car driving in a forest is followed by a video frame depicting the same car driving in the same forest. Thus, motion of an object within the same background may not may not be detected as a scene change, whereas motion of an object from one background to a different background may be detected as a scene change.

When there is no scene change detected by scene change detection module 318, the same objects identified in the previous frame are reconsidered in the current frame. However, the position of these objects may be different due to motion. Object tracking module 316 tracks the identified objects from one frame to the next, until a scene change is detected by scene change detection module 318.

This combination of scene change detection by scene change detection module 318 and the tracking of moving objects by object tracking module 316 results in efficient processing of video content for object localization.

Object candidate generator module 320 detects potential objects in the visual query image by processing the segmented regions output by image segmentation module 314. At this stage, contours in each segment are found by transforming the segment (e.g., represented as an image region) into a single channel image (e.g., black-and-white image), and by detecting the underlying edges using an edge detector (e.g., Canny edge detector). The contours of each segment are derived from the binary edge image resulting from applying the edge detector on each segment, and the points of the contours are approximated by polygons. The structural characteristics of contours are derived and used to retain only those contours whose structural characteristics that are within a predetermined range (e.g., maximum convexity defect, moments, areas, mass center, relative area, compactness, solidity, aspect ratio, etc.). A predetermined threshold or range may be set for each of these contour structural characteristics. The idea is to only retain object candidates with shapes cleared from unusual irregularities (e.g., severely disproportionate aspect ratio, unusually high convexity defect, etc.). The orientation of the detected object candidate for a given segment may be determined by first calculating the ellipse that best fits the points on the contour of the object, using an ellipse fitting algorithm. The orientation of the object may then be determined by the orientation of the major axis of the fitting ellipse. A bounding rectangle for each segment is derived by calculating the minimal up-right bounding rectangle of the points on the contour of the object in the considered segment. The bounding rectangles of those segments that meet certain requirements related to the desired objects (e.g., relative area, solidity, compactness, aspect ratio, and maximum convexity defect) are retained, and the portions of the query image delimited by these bounding rectangles are the object candidates.

In an embodiment, representations of object candidates are output from object localization server 360 and input to object identification server 370. The representations of object candidates may comprise images (e.g., areas of the query image delimited by the corresponding bounding rectangles produced by object candidate generation module 320) or may comprise a mathematical representation instead of images (e.g., a vector of features extracted from the cropped images produced by object candidate generation module 320).

Object identification server 370 receives the representations of the object candidates, generated by the object candidate generator module 320, and uses the representations of the object candidates to identify objects detected in the query image and/or objects which are visually similar to objects detected in the query image, by object localization server 360.

In an embodiment, image normalization module 324 performs a geometric normalization of each representation of an object candidate. Image normalization module 324 may receive, as input, the cropped segment(s) of the query image produced by object candidate generation module 320 and each representing at least one object candidate (e.g., each representing a single object candidate or a group of multiple object candidates). Image normalization module 324 may normalize each cropped image segment to have the same width and height, or aspect ratio, as a pre-defined standard image size and aspect ratio used when creating object models enrolled in reference database 540. This normalization of image size and aspect ratio ensures consistency of results, when comparing local feature descriptors from the query image with local feature descriptors represented in database 540, and avoids issues that may arise from variations in scale between different images. Image normalization module 324 may output the normalized image segments to feature extraction module 326.

In an embodiment, feature extraction module 326 receives the normalized image segments from image normalization module 324 as input images, and, for each input image, extracts visual characteristics or attributes inherent to the input image as features. Attributes that may be used for this purpose include, but are not limited to, color, texture, shape, and/or small regions around keypoints. Feature extraction module 326 may comprise separate feature extractors, each tailored to a specific attribute (e.g., a feature extractor for color, a feature extractor for texture, a feature extractor for shape features, and a feature extractor for keypoint features). Feature extraction module 326 may output the extracted features to feature matching module 328.

In an embodiment, feature matching module 328 comprises sub-systems for matching features generated by each feature extractor within feature extraction module 326 (e.g., color, texture, shape features, and/or keypoints). Feature matching module 328 compares each extracted feature from feature extraction module 326 with reference features stored in database 540, via database management module 344, and generates a matching score for each comparison. A normalized matching score may be generated for each individual extracted feature (e.g., color feature matching score, texture feature matching score, shape feature matching score, and/or keypoint feature matching score). Feature matching module 328 may output the normalized matching scores to data fusion module 330.

In an embodiment, data fusion module 330 combines the individual matching scores for all of the extracted features of a given input image into a single matching score for the input image with respect to one or more enrolled objects in database 540. This combination of feature matching scores minimizes the likelihood of a false match. The combination of feature matching scores may be performed using a variety of strategies or algorithms. As one example, the combined matching score may be generated by a linear combination of a weighted sum of individual feature matching scores. As an alternative example, the combined matching score may be generated by a straight or weighted average of individual feature matching scores.

In an embodiment, data fusion module 325 outputs a list of matching objects enrolled in database 540. Each matching object in the list may be associated with a degree of confidence (e.g., the combined matching score). It should be understood that the list may consist of only those enrolled objects from database 540 that were matched to a certain degree of confidence (e.g., having a combined matching score greater than a threshold), may consist of only a predetermined number of enrolled objects having the highest combined matching scores, and/or may be limited or restricted in some other suitable manner. It should also be understood that the list of matching objects may represent the matching objects in any manner (e.g., as data structures, unique object identifiers, etc.) suitable for manipulation of the matching objects and/or access to object-specific information by one or more subsequent modules. Data fusion module 325 may output the list of matching objects to result ranking and management module 338.

In an embodiment, result ranking and management module 338 receives the list of matching objects from data fusion module 325, and sorts the list of matching objects by level of similarity or confidence level (e.g., in order of their respective combined matching scores, from highest to lowest, or vice versa). Accordingly, result ranking and management module 338 may output an ordered list 520 of visually similar objects. Result ranking and management module 338 may also insert, add, or otherwise associate information related to each matching object (e.g., metadata including images, descriptions, links, etc.) with its respective matching object in list 520. For example, result ranking and management module 338 may retrieve such information using a unique object identifier associated with each matching object in the list. It should be understood that each object enrolled in database 540 may comprise a unique object identifier, and that related information may be linked to each enrolled object via its unique object identifier.

Result ranking and management module 338 may send list 520 of matching objects and related information to content interactivity synthesizer 530. Content interactivity synthesizer 530 receives list 520 and produces interactive content 510 that is sent to interactive application 210, for rendering on network device 120 (e.g., directly to network device 120 or indirectly via content server 130). Interactive content 510 may result in enhanced user interaction and experience over conventional content, and/or the initiation and fulfillment of a commercial transaction.

Figure 6:
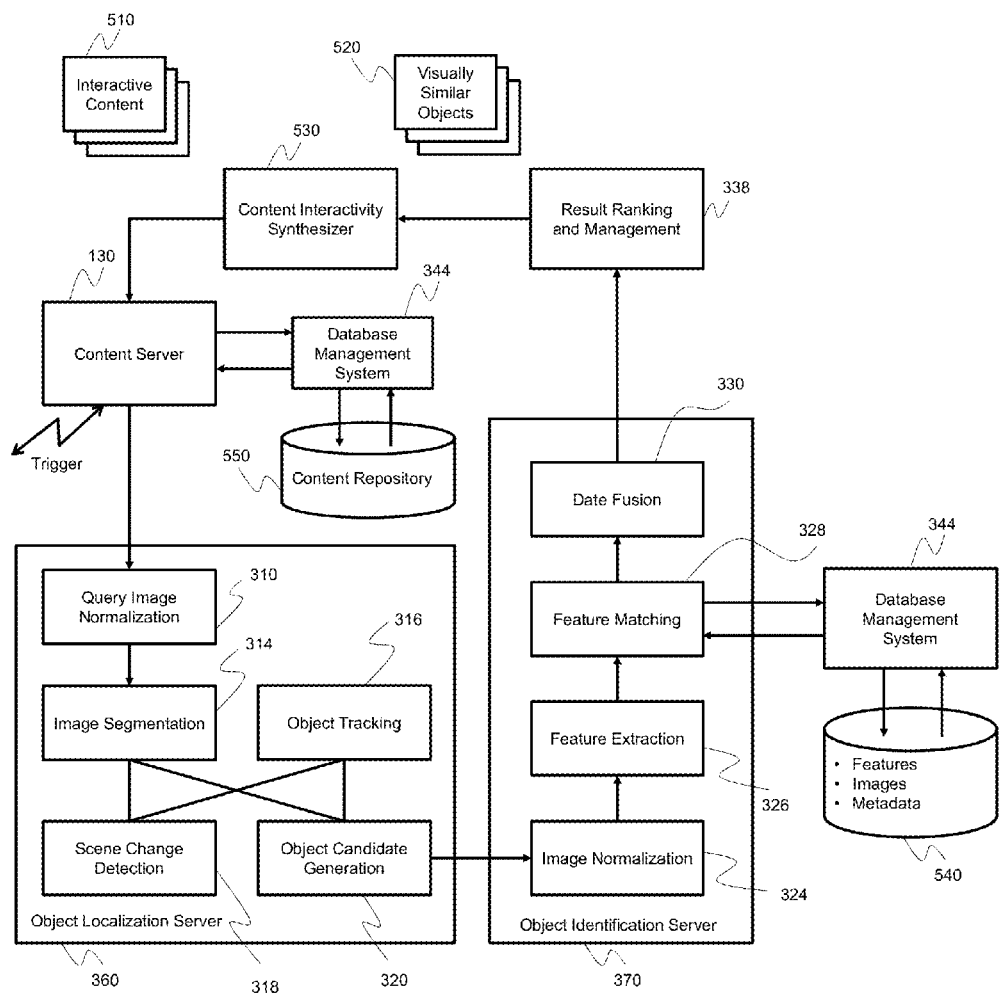
FIG. 6 is a block diagram illustrating an example of the modules that implement one or more of the disclosed embodiments supporting batch processing of content, according to an embodiment.

FIG. 6 depicts the interaction of various modules of content server 130, and media analysis server 140, according to an embodiment. However, the illustrated configuration is non-limiting, and it should be understood that, in alternative embodiments, the depicted modules may be distributed among content server 130, media analysis server 140, and/or another component in a different manner than illustrated.

In the illustrated embodiment of FIG. 6, there is no network device as in the embodiment depicted in FIG. 5. Instead of being triggered by a client application on network device 120, the processing of digital media assets, according to the embodiment of FIG. 6, is triggered when a digital media asset (e.g., image or video) is uploaded to content server 130. This embodiment may be beneficial when digital media assets are continuously uploaded onto content server 130 in a very large quantity. Those digital media assets are stored in a content repository 550 via database management module 344. In an embodiment, content server 130 schedules the detection and identification of objects in the digital media assets, stored in content repository 550, by object localization server 360 and object identification server 370. The underlying process of object location and identification may be the same as or similar to the process described above with respect to FIG. 5. The only difference may be that the interactive content generated by content interactivity synthesizer 530 is output to content server 130 (i.e., instead of network device 120), which stores the interactive content from content interactivity synthesizer 530 in content repository 550 via database management system module 344. The interactive content may be subsequently published to a digital network by content server 130 (e.g., for downloading or other access by devices, such as network device 120).

Figure 7:
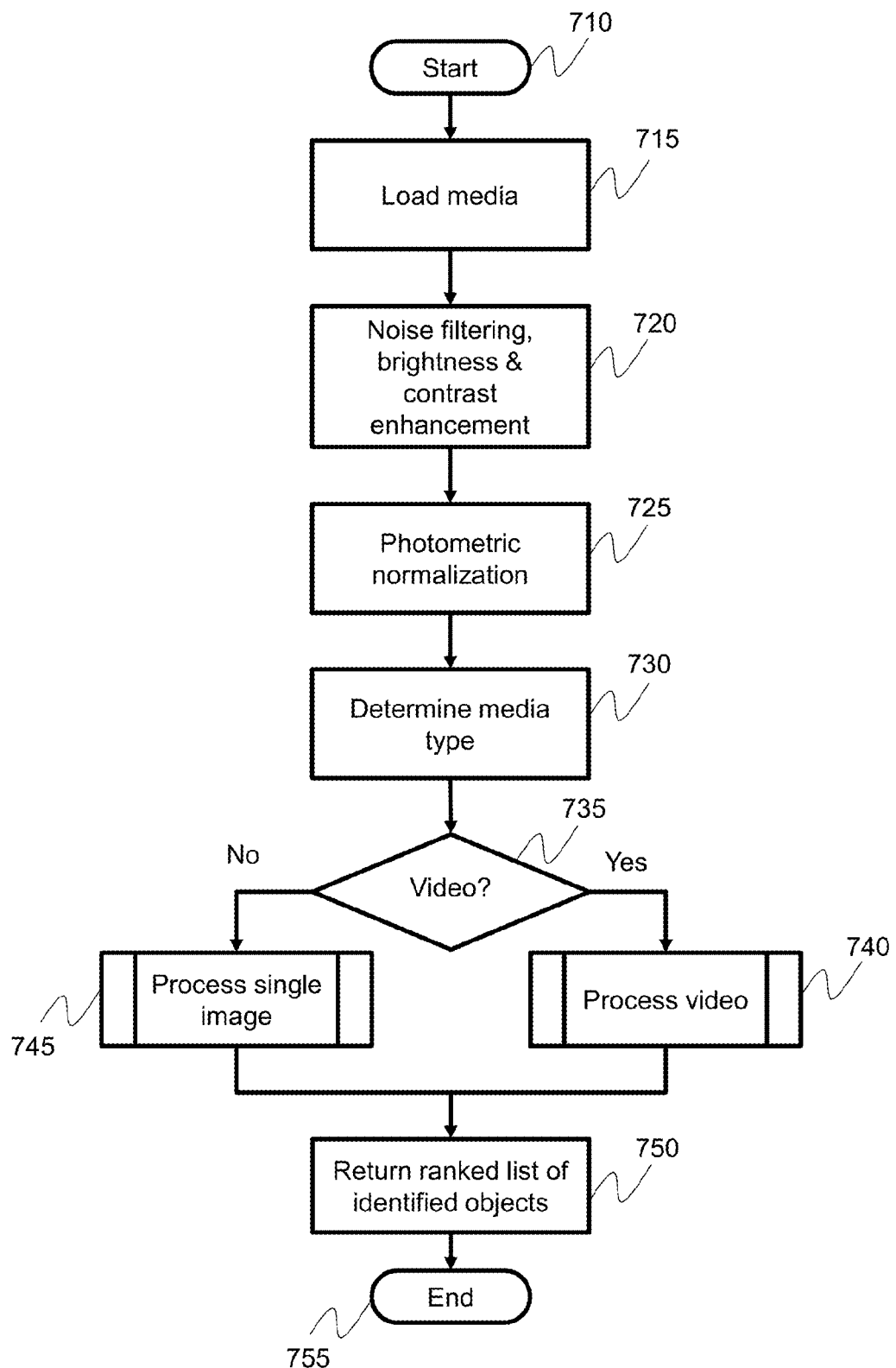
FIG. 7 is a flowchart illustrating an example tagging process for digital media assets, according to an embodiment.

FIG. 7 depicts a flowchart illustrating an example tagging process for digital media assets, according to an embodiment. The tagging process is initiated in step 710. In step 715, the input digital media asset is loaded into the system (e.g., comprising one or more modules). In step 720, pre-processing is performed (e.g., by color image pre-processing module 1110) to reduce image noise through filtering (e.g., vector median filtering) contrast enhancement to widen the dynamic range of a query image (e.g., image or video frame), resulting in a query image with higher brightness and contrast. In step 725, photometric normalization is performed (e.g., by photometric invariant color space module 1120) on the query image to enhance robustness of object localization algorithms to shadows, shading, highlights, and illumination intensity. In step 730, the type of digital media asset input in step 715 and being processed is determined. If the input digital media asset is determined to be a video, then a process for tagging video, described in more detail elsewhere herein, is called in step 740. On the other hand, if the input digital media asset is determined to be an image, then a process for tagging images, described in more detail elsewhere herein, is called in step 745. After the process for tagging a video is performed in step 740 or the process for tagging an image is performed in step 745, a ranked list of identified objects is returned in step 750. The tagging process ends in step 755.

Figure 8:
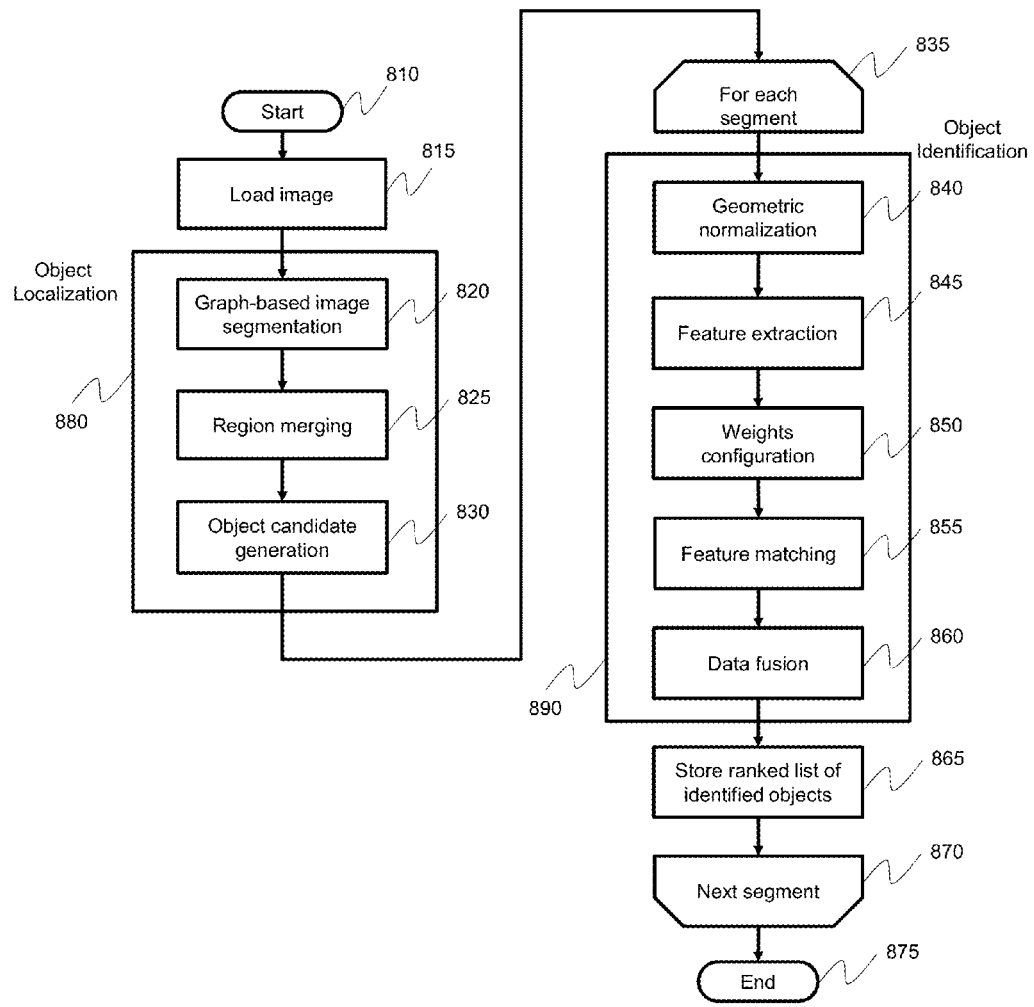
FIG. 8 is a flowchart illustrating an example tagging process for a single image, according to an embodiment.

As previously stated, when the input digital media asset is determined to be an image in step 735, a process for tagging images is performed in step 745. FIG. 8 depicts a flowchart for this process of tagging images in step 745, according to an embodiment. The process is initiated in step 810. In step 815, the normalized query image, resulting from steps 720 and 725 in the process depicted in FIG. 7, is loaded into the system. In step 820, this normalized query image is segmented (e.g., by image segmentation module 314) into perceptually homogeneous segments by a graph-based segmentation algorithm (e.g., graph-cut). The goal of this segmentation is to group regions similar in appearance, where similarity is based on color difference, while taking into account color variation within a region.

The segmentation algorithm performed in step 820 is a two-stage algorithm and may be summarized as follows, according to an embodiment. In the first stage, a graph is constructed over the entire normalized query image by representing each pixel in the query image as a node, with the nodes connected by edges based on 8-neighborhood. Initial edge weights are calculated based on a normalized color difference from each pixel. The internal color variation of each region, defined by the edges, in the query image is calculated as the maximum edge weight of its Minimum Spanning Tree. Meanwhile, the difference between two regions is defined as the minimum weight edge connecting the two regions. Regions are merged by traversing the edges in a sorted order by increasing weight, and verifying if the difference between two regions is small (e.g., as determined based on a threshold) relative to the internal difference within at least one of the regions under consideration. In this case, the regions are merged into a composite region, and the internal color variation of that composite region is updated. The degree of this difference is controlled by a threshold function. In practice, this threshold is set to be a function of desired segmentation granularity: a large threshold leads to larger segments. Image segmentation is set to provide an over-segmentation of the query image to ensure features from all relevant objects are represented in the segmentation result. To improve the performance of this segmentation procedure at run time, the graph derived from the input image is constructed in an efficient way. Every pixel is projected into a feature space (e.g., x, y, c1, c2, c3). The weight between pixels may then be determined using L1 or L2 (Euclidean) distance in the constructed feature space. Instead of choosing edges of each node from the entire image, edges are only chosen for the top K (e.g., top 10) nearest neighbors in the feature space. The nearest neighbors for each pixels may be found using the approximate nearest neighbor algorithm. In the second stage, for each of the regions obtained in the first stage of graph-based segmentation module 820, a robust feature descriptor in the form of LOcal Feature descripTor (LOFT), described in greater detail elsewhere herein, is used to represent each region. In this second stage, another graph is formed using each of the previously segmented regions as a node, and each region is connected to its adjacent regions by an edge with a weight based on the difference between their LOFT descriptors. The distance between two LOFT descriptors could be used as the edge weight. Examples of distances between descriptors could be the Chi-square, the correlation, or the Bhattacharrya distances.

In step 825, a region merging algorithm, based on the similarity of regions of the segmented query image, is used (e.g., by image segmentation module 314 or object candidate generation module 320) to aggregate small regions into larger regions corresponding to objects in the input query image. The similarity of any two given regions may be judged by a measure of similarity of the LOFT descriptors for those regions.

In step 830, potential objects are detected (e.g., by object candidate generation module 320) in the query image by analyzing the regions within each segment (e.g., produced by image segmentation module 314) to calculate contour characteristics (e.g., maximum convexity defect, moments, areas, mass center, relative area, compactness, solidity, aspect ratio, etc.) and use these characteristics to determine if the current segmented region meets the requirements of a potential object of interest. The ideal object is defined in term of contour characteristics and only segmented regions whose contour characteristics (e.g., maximum convexity defect, moments, areas, mass center, relative area, compactness, solidity, aspect ratio, etc.) are within a predetermined range are selected for further processing. The pixels that make each segmented region are connected to each other to form the region. That connection could be defined in terms of a so-called 4-neighborhood (each pixel connected to its top, bottom, left, and right neighboring pixels), or in terms of a so-called 8-neighborhood (each pixel connected to its top, bottom, left, right, north-east, north-west, south-east, and south-west neighboring pixels). The region of a segmented region is thus made of a plurality of such pixels with their neighboring pixels. These basic components of a region are called "connected components." The orientation of the detected object candidate for a given segment may be determined by first calculating the ellipse that best fits the sequence of individual points on the contour of the object, using an ellipse-fitting algorithm. The orientation of the object may then be determined by the orientation of the major axis of the fitting ellipse. A bounding rectangle (or bounding box of another shape) is generated around the connected components of each segment, providing localization information for the detected object candidate. The bounding rectangles around sets of segments are used to create cropped images from the query image. Each cropped image represents at least one detected object candidate. Graph-based image segmentation step 820, region merging step 825, and object candidate generation step 830 may together form at least a portion of an object localization step 880.

Step 835 begins an iteration of steps (represented collectively as object identification step 890), which is performed for each object candidate generated in step 830, in order to identify an object corresponding to each object candidate. As discussed above, each object candidate may be represented by a cropped image segment from the query image.

The details of each of these iterations are as follows, according to an embodiment. In step 840, a geometric normalization process is performed (e.g., by image normalization module 324) to normalize the object candidate (e.g., represented as a cropped image segment) to have the same width and height, or aspect ratio, as a pre-defined standard image size and/or aspect ratio that is used when enrolling object models in the reference database.

In step 845, features are extracted (e.g., by feature extraction module 326) from the normalized image produced in step 840. The features are derived from visual characteristics or attributes inherent to the object candidate under consideration, such as color, texture, shape, and/or small regions around keypoints.

In step 850, weight values corresponding to each feature, extracted from the object candidate in step 845, are calculated (e.g., by feature matching module 328). The weight value for a given feature represents the relative contribution of the factor to the calculation of similarity (e.g., the combined matching score calculated in step 860) between an object candidate and a reference object. In addition, in step 855, the features, extracted from the object candidate in step 845, are matched (e.g., by feature matching module 328) against reference features stored in a database (e.g., stored as enrolled object models in database 540). The result of this matching process in step 855 is a list of reference objects (e.g., associated with, corresponding to, representing, comprising, or consisting of, enrolled object models from database 540). Each object in the list of reference objects is associated with confidence score(s), representing a relative degree of visual similarity to the object candidate, and the weight value(s) calculated in step 850. For each object in the list of reference objects, confidence scores and weight values may be provided for each feature type extracted in step 845. For instance, if color, texture, shape, and keypoints features are extracted in step 845, for each reference object in the list of reference objects that were matched to a given object candidate, step 855 may produce a color confidence score representing a relative visual similarity in color between the object candidate and the reference object, a texture confidence score representing a relative visual similarity in texture between the object candidate and the reference object, a shape confidence score representing a relative visual similarity in shape between the object candidate and the reference object, and a keypoints confidence score representing a visual similarity in keypoints between the object candidate and the reference object, and step 850 may provide a color weight value, a texture weight value, a shape weight value, and a keypoints weight value.

In step 860, for each reference object in the list of reference objects produced by step 855, a combined matching score is calculated (e.g., by data fusion module 330) based on the confidence scores and weight values associated with that reference object. In addition, the reference objects in the list of reference objects produced by step 855 are ranked in order of their respective combined matching scores. In an embodiment, a higher combined matching score represents a higher degree of similarity, and therefore, the list of reference objects are ranked in increasing order of their respective combined matching scores. However, it should be understood that, in an alternative embodiment, the combined matching scores may be calculated such that a lower combined matching score represents a higher degree of similarity, in which case the list of reference objects could be ranked in decreasing order of combined matching score. In step 865, the ordered list of reference objects is stored (e.g., in a memory accessible to object identification server 370).

It should be understood that the ordered list of reference objects may be stored in association with the object candidate to which they were matched. This list of reference objects may comprise objects that are identified as the object candidate (e.g., based on a combined matching score above a first threshold) and/or are identified as visually similar to the object candidate (e.g., based on a combined matching score above a second threshold, which may be lower than the first threshold). In addition, it should be understood that there may be object candidates which cannot be matched to any reference objects (e.g., derived from the enrolled object models in database 540) to an acceptable level of confidence. Thus, while some object candidates may be identified as a reference object and/or matched to visually similar reference objects, other object candidates may remain unidentified and/or unmatched to any visually similar reference objects. Accordingly, the output at the end 875 of the tagging process may be a set of representations of object candidates, with each representation of an object candidate associated with representations of the reference objects which were identified as the object candidate and/or were identified as visually similar to the object candidate. Object candidates which were not identified as a reference object and which were not determined to be visually similar to any reference objects (e.g., for which the combined matching score for all reference objects fell below a similarity threshold) may be discarded or simply represented in the set without any associations to reference objects.

In step 870, the next object candidate in a list of object candidates generated by step 830, if any, is selected, and processed by steps 840, 845, 850, 855, 860, 865, in the same manner as discussed above. In other words, the loop formed by steps 835-870 is performed iteratively on each of the object candidates generated in step 830. The illustrated embodiment of image tagging ends in FIG. 8 ends in step 875. Geometric normalization step 840, feature extraction step 845, weights configuration step 850, feature matching step 855, and data fusion step 860, may together form at least a portion of an object identification step 890.

Figure 9:
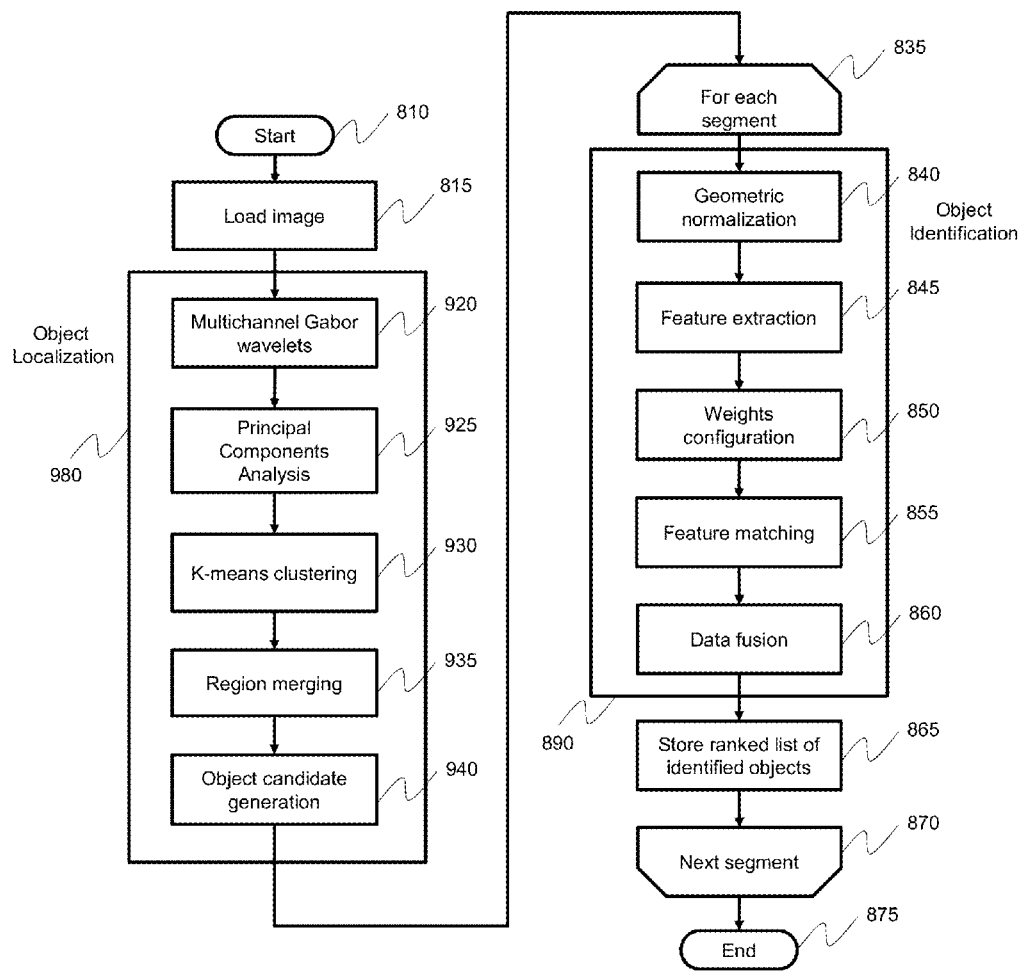
FIG. 9 is a flowchart illustrating another example tagging process for a single image, according to an embodiment.

FIG. 9 depicts a flowchart of an alternative process for tagging images, according to an embodiment. In an embodiment, the only difference between the processes of FIGS. 8 and 9 is that the object localization steps 880 in FIG. 8 are replaced with the object localization steps 980 in FIG. 9. All other steps may be performed in an identical manner as discussed above with respect to FIG. 8, and therefore, will not be described in detail with respect to FIG. 9.

In step 920, the normalized query image (e.g., normalized according to the process discussed with respect to FIG. 7) loaded in step 815 is received. A multi-channel two-dimensional Gabor filter bank is constructed. In this filter bank, two-dimensional Gabor functions are convolved with the normalized photometric invariant color space version of the query image, by rotating and scaling the basis Gabor function, resulting in a multi-resolution decomposition of the input query image in the spatial and spatial-frequency domains. The highest magnitude of these Gabor filter outputs over each channel may be used to represent a filter response. A feature vector is constructed based on the Gabor filter output. However, in order to reduce the variability of Gabor filter responses within regions of the query image with homogeneous visual characteristics, the Gabor filter bank may be followed by filtering with a Gaussian function. To capture all important visual characteristics of the input image, a large number of scales and orientations may be required, resulting in a high-dimension feature space.

Filtering images using this multi-channel Gabor filter bank may be implemented using parallel processing techniques on multi-core Central Processing Units (CPUs), Graphics Processing Units (GPUs), or other dedicated hardware platforms.

In step 925, a principal component analysis is performed on the Gabor filter output of step 920, to reduce the dimensionality of the feature space constructed from the responses of the multi-channel Gabor filter.

In step 930, a k-means clustering is performed on the reduced feature space, output by step 925. A known problem with the application of the k-means algorithm is the appropriate selection of the number of classes, K, to allow the system to find all objects in most practical situations. As applied here, the number of classes, K, is set to a large value. This k-means clustering procedure results in a segmentation of the query image.

In step 935, statistically similar regions in the segmented query image may be further merged using a merging algorithm. To evaluate two regions for merging, the mean vectors and the covariance matrices of both regions are calculated from their feature vectors. Adjacent regions are merged, in step 935, if their similarity measure (e.g., Mahalanobis distance) is smaller than a predetermined threshold. Finally, to improve the quality of image segmentation, small segmented regions are removed using mathematical morphology techniques.

In step 940, potential objects are detected (e.g., by object candidate generation module 320) by analyzing the regions within each segment in the segmented query image for contour structural characteristics (e.g., convexity defects, moments, relative area, compactness, solidity, aspect ratio, etc.). Only those potential objects, whose contours have structural characteristics within a predetermined range, are retained. Thus, shapes that have, for example, a severely disproportionate aspect ratio or a high convexity defect are discarded, and only those shapes that have an appearance commonly expected of commercial objects or merchandise are retained. The orientation of the detected object candidate for a given segment may be determined by first calculating the ellipse that best fits the points on the contour of the object, using an ellipse-fitting algorithm. The orientation of the object may then be determined by the orientation of the major axis of the fitting ellipse. A bounding rectangle is generated around the region of each segment, providing localization information for the detected object candidate. The areas of the input image delimited by the bounding rectangles are returned by the object candidate generation module 320 as object candidates. Multi-channel Gabor wavelets-based segmentation step 920, principal component analysis step 925, k-means clustering step 930, region merging step 935, and object candidate generation step 940 may together form at least a portion of an object localization step 980.

Figure 10:
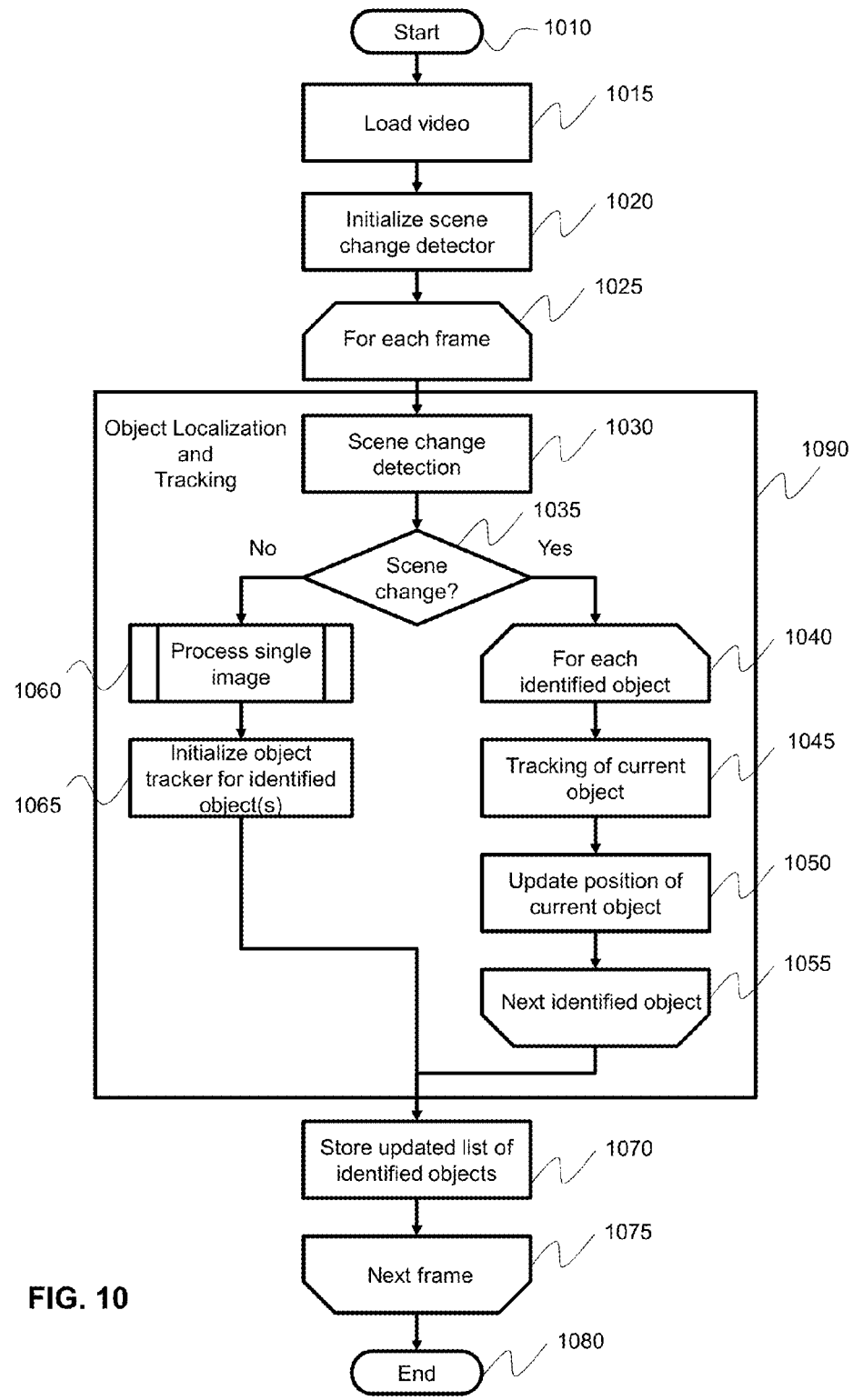
FIG. 10 is a flowchart illustrating an example tagging process for a video, according to an embodiment.

FIG. 10 depicts a flowchart for a process of tagging videos in step 740 of FIG. 7, according to an embodiment. This tagging process is initiated in step 1010. In step 1015, the video is loaded into the system for processing. In step 1020, scene change detection is initialized (e.g., by scene change detection module 318) with the current frame of the video loaded in step 1015. Step 1025 then begins a loop, comprising steps 1025-1075, to iteratively process each frame of the video.

In step 1030, scene change detection (e.g., by scene change detection module 318) is performed on the current frame to determine whether the scene in the current frame represents a change over a scene in a previous frame, if any. In an embodiment, scene change detection module 1030 works as follows. During the initialization stage of the scene change detector in step 1020, a normalized histogram of the initial frame is calculated (e.g., two dimensional hue-saturation histogram) and stored in memory. For the next frame, considered the current frame, a normalized histogram of that frame is computed in a similar manner as during the initialization phase of step 1020 (e.g., two dimensional hue-saturation histogram). Next, the histogram of this current frame is compared to that of the previous frame stored in memory, by calculating the distance between the two histograms. Methods for this comparison include, without limitation, Chi-square, correlation, and Bhattacharrya distances. The computed distance between the two histograms is normalized, resulting in a normalized score. It is determined (e.g., by scene change detection module 318) that a scene change has occurred in the current frame if the normalized score is above a predetermined threshold. Conversely, it is determined (e.g., by scene change detection module 318) that there is no scene change if the normalized score is below the predetermined threshold. In other words, peaks in the calculated histogram that are above a predetermined threshold correspond to scene changes. It should be understood that, if the normalized score is equal to the predetermined threshold, it may be determined that a scene change has or has not occurred, depending on the particular implementation.

In step 1035, it is determined (e.g., by scene change detection module 318) whether or not a scene change has been detected in step 1030. It should be understood that, if the current frame is the first frame of the video (i.e., there is no prior frame), it may be determined in step 1035 that a scene change has been detected.

If it is determined in step 1035 that no scene change has been detected, the previously described processes for tagging an image (e.g., the tagging processes described with respect to FIGS. 7-9) may be carried out in step 1060, followed by an initialization of an object tracker (e.g., object tracking module 316) in step 1065. The object tracker (e.g., object tracking module 316) tracks each detected object candidate (e.g., generated in step 830 of FIG. 8 or step 940 of FIG. 9, for example, by object candidate generation module 320) across subsequent frames (i.e., subsequent iterations of steps 1025-1070) until a scene change is detected in step 1030.

If it is determined in step 1035 that a scene change has been detected, each object identified or matched in step 1060 of a prior iteration (i.e., for a prior frame at the start of a scene change) may be analyzed iteratively using the loop defined by steps 1040, 1045, 1050, and 1055.

In step 1045, tracking is performed (e.g., by object tracking module 316) to follow the change in position (i.e., motion), from the preceding frame to the current frame, of the current object being processed by loop 1040-1055. For tracking the current object, algorithms, such as Mean-shift, may be used. Mean-shift is an algorithm for finding local extrema in the density distribution of data. The underlying process is as follows: (1) After a search window has been selected, the weighted center of mass of this window is calculated; (2) The window is centered at the computed center of mass; and (3) Steps (1) and (2) are repeated until the window stops moving. The algorithm converges to a local peak of the distribution under the window. In the context of object tracking, it is this peak-finding procedure that is at the core of Mean-shift tracking.

In an embodiment, the Mean-shift algorithm is adapted for tracking multiple objects. In such an embodiment, the feature distribution used to represent each moving object is selected during the initialization phase in step 1065 for a frame in which a scene change was detected. A Mean-Shift rectangular window is then started over the feature distribution generated by each object in that frame. To calculate the feature distribution of the moving object in subsequent frame(s) in step 1045, the Mean-Shift algorithm will determine the mode of this feature distribution, which is expected to be centered over the moving object. Other embodiments of object tracking in step 1045 may adopt other tracking methods, such as the Kanade-Lucas-Tomasi (KLT) tracker, the CONDENSATION algorithm, or the sequential Monte Carlo (SMC) algorithms, which have the ability to model non-linear/non-Gaussian cases. An advantage of stochastic tracking approaches, such as the SMC algorithms, is that they achieve robustness by being able to escape local minima, since their search directions are mostly random.

In step 1050, the position of the current object being tracked is updated using object location information (e.g., generated or determined by object tracking module 316). In step 1055, the next object being tracked is selected and processed through the loop defined by steps 1040-1055. Thus, this loop processes each object identified or matched in step 1060 of a prior iteration for a prior frame. Once all such objects have been processed, the loop is closed in step 1055.

In step 1070, the set of identified or matched objects (e.g., with associated representations of identified or visually similar reference objects) is output or stored. In step 1075, the loop for processing frames of the video is closed, and the video tagging process is terminated in step 1080. The steps 1030-1055 may together form at least a portion an object localization and tracking step 1090.

In an embodiment, portions of the processes and algorithms described for tagging a digital media asset (e.g., an image or a video) are subjected to parallel processing using multi-core Central Processing Units (CPUs), multiple Graphical Processing Units (GPUs), and/or distributed machines on a computer cluster with an implementation of Map-Reduce. For example, the loop for processing each object candidate in the object identification step 890 in FIGS. 8 and 9 for tagging an image may be subjected to such parallel processing. In addition, for tagging video, the loop processing for each video frame in step 1090 in FIG. 10, and the loop processing for each identified object defined by steps 1040-1055 in FIG. 10, may also be subjected to such parallel processing.

5. Object Enrollment

To enable object matching and identification by feature matching module 328, reference objects are enrolled in (i.e., inserted into) database 540. In an embodiment, database 540 stores digital media assets related to objects (e.g., images of the object, video of the object, etc.), along with associated metadata. Database 540 may be created using database management system module 344, which interfaces directly with database 540. In addition, representations of the objects (e.g., object models representing the visual attributes of objects, such as color, texture, shape, and/or keypoints) are also stored in database 540 for comparison with features extracted by feature extraction module 326 from query images (e.g., after normalization by image normalization module 310). It should be understood that database 540 may comprise multiple databases, and that the representations of objects, the digital media assets related to objects, and/or the associated metadata may all be stored separately from each other (e.g., across two or more tables, in rows linked by a unique object identifier).

The process of generating the stored representations of objects is referred to herein as "enrollment." Embodiments of normalization and feature extraction will now be described in detail. While these embodiments are described primarily with respect to enrollment, it should be understood that these embodiments of normalization and feature extraction may also be performed in an identical or similar manner during the object localization and identification processes described elsewhere herein, for example, with respect to media analysis server 140. For example, the disclosed embodiments of normalization may be performed by portions of object localization server 360 (e.g., by query image normalization module 310) and/or object identification server 370 (e.g., by image normalization module 324). In addition, the disclosed embodiments of feature extraction may be performed by portions of object identification server 370 (e.g., by feature extraction module 326).

5.1. Normalization

Figure 12:
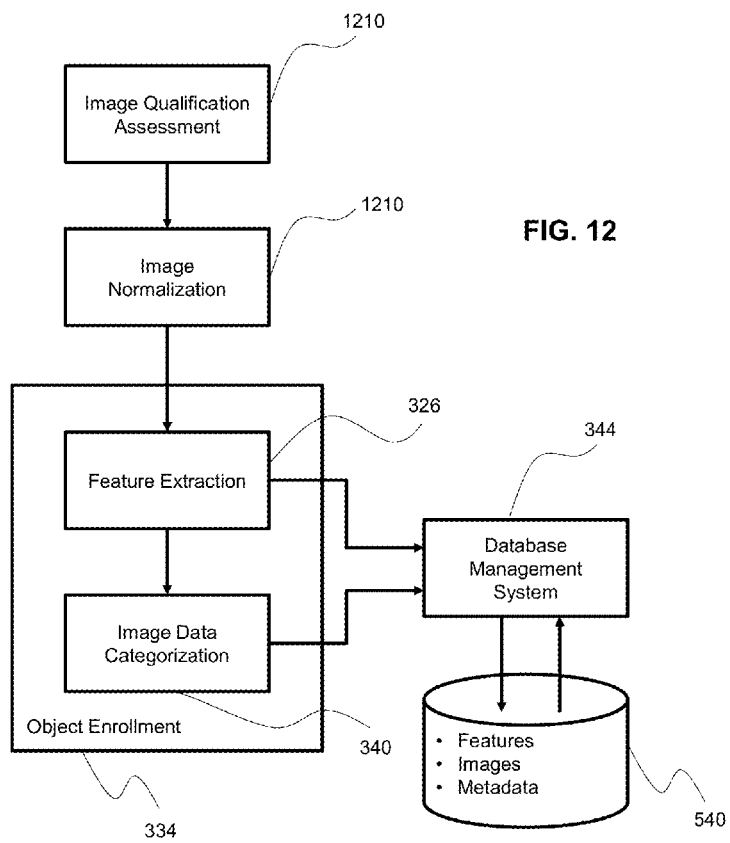
FIG. 12 is a block diagram illustrating an example of modules that implement enrollment of an object into a database, according to an embodiment.

FIG. 12 illustrates an enrollment process, according to an embodiment. Initially, image qualification assessment may be performed to verify that candidate images meet a set of requirements in order to be enrolled in database 540. Image qualification assessment may be performed as an off-line or on-line process, and may be performed with human intervention or without human intervention by image qualification assessment module 1210. In an embodiment, image qualification assessment is a manual task undertaken, with the assistance of image qualification assessment module 1210, on a given set of candidate images and involves verifying that certain qualification criteria are met. Qualification criteria may include, for example, requirements related to the level of noise, the degree of blur, the presence of visual artifacts, image resolution, etc.

Images that meet the qualification requirements undergo embodiment normalization process implemented by image normalization module 310. It should be understood that this normalization process may be identical or similar to the normalization process that is performed by normalization module 310 on query images, and illustrated in FIG. 11. The normalization process may comprise a noise reduction stage, followed by a linear mapping of pixels through changes of gain and offset, yielding brightness and contrast enhancement of the input image, using color image pre-processing module 1110. This linear transformation widens the dynamic range of all the color channels of the input image. Another aspect of the normalization process is to normalize each input image to have the same width and height, and/or aspect ratio, using a pre-defined standard image size and/or aspect ratio. This normalization of size and/or aspect ratio ensures consistency of results, when using local feature descriptors in images, and avoid issues that may arise from variations in scale. This normalization of size and aspect ratio may also be performed by color image pre-processing module 1110.

It is typical for object recognition systems to represent color measurements using, for example, the CIE $L^* a^* b^*$ system. This color system is very appealing considering it is device independent and corresponds with human perception, an important property when retrieving image that are perceptually similar. However, it is well known that the CIE $L^* a^* b^*$ and the RGB color systems are dependent on the imaging conditions, such as variations due to camera pose and orientation, changes in illumination due to light sources having different power spectral distributions, and variations in object pose causing changes in shadows, shading, and highlights. Moreover, scene changes may also be caused by changes in camera viewpoint, and by the presence of clutter in the background and by occlusions. In most cases, to recognize an object, a few details may be enough if and only if recognition is invariant to color changes and to shape changes. In this regard, it is desirable that any successful object recognition system exhibits a great degree of color and shape invariance. Accordingly, the normalization process may also comprise conversion of the input image to a photometric invariant color space by module 1120 in FIG. 11.

In an embodiment, photometric invariant color space module 1120 may implement color invariance using the normalized red-green-blue (RGB) color space, the simplest color space that provides some invariance to shadows, shading, and illumination intensity. The RGB color space is derived from the RGB color components as shown below. However, normalized colors may become unstable and meaningless when the intensity is small.

$$r = \frac{R}{R+G+B}$$
$$g = \frac{G}{R+G+B}$$
$$b = \frac{B}{R+G+B}$$

In an alternative embodiment, photometric invariant color space module 1120 may utilize a color invariant photometric space, such as c1c2c3. The c1c2c3 color space is derived from the RGB color components as shown below. The c1c2c3 color space also provides a degree of photometric invariance to shadows, shading, and illumination intensity.

$$c1 = \tan^{-1}\left(\frac{R}{\max(G,B)}\right)$$
$$c2 = \tan^{-1}\left(\frac{G}{\max(R,B)}\right)$$
$$c3 = \tan^{-1}\left(\frac{B}{\max(R,G)}\right)$$

In an alternative embodiment, photometric invariant color space module 1120 may utilize a color invariant photometric space, such as L1L2L3. The L1L2L3 color space is derived from the RGB color space as shown below. The L1L2L3 color space provides photometric invariance to shadows, shading, highlights, and illumination intensity.

$$L1 = \frac{(R-G)^2}{(R-G)^2 + (R-B)^2 + (G-B)^2}$$
$$L2 = \frac{(R-B)^2}{(R-G)^2 + (R-B)^2 + (G-B)^2}$$
$$L3 = \frac{(G-B)^2}{(R-G)^2 + (R-B)^2 + (G-B)^2}$$

In an embodiment, object enrollment module 334 comprises two modules: image categorization module 340, and feature extraction module 326. Image categorization module 340 clusters the database to speed up search and matching. For instance, image categorization module 340 may cluster enrolled object models in database 540 according to certain criteria, such that, during object identification (e.g., by object identification server 370) for an object meeting a set of criteria, only those cluster(s), in database 540, corresponding to that set of criteria need to be searched. Information related to these database clusters may be stored in database 540, through database management system module 344.

5.2 Feature Extraction

In an embodiment, the feature extraction process for enrolling objects is the same or similar to the feature extraction process performed on object candidates by object identification server 370, as discussed above with respect to FIGS. 5 and 6.

Figure 13:
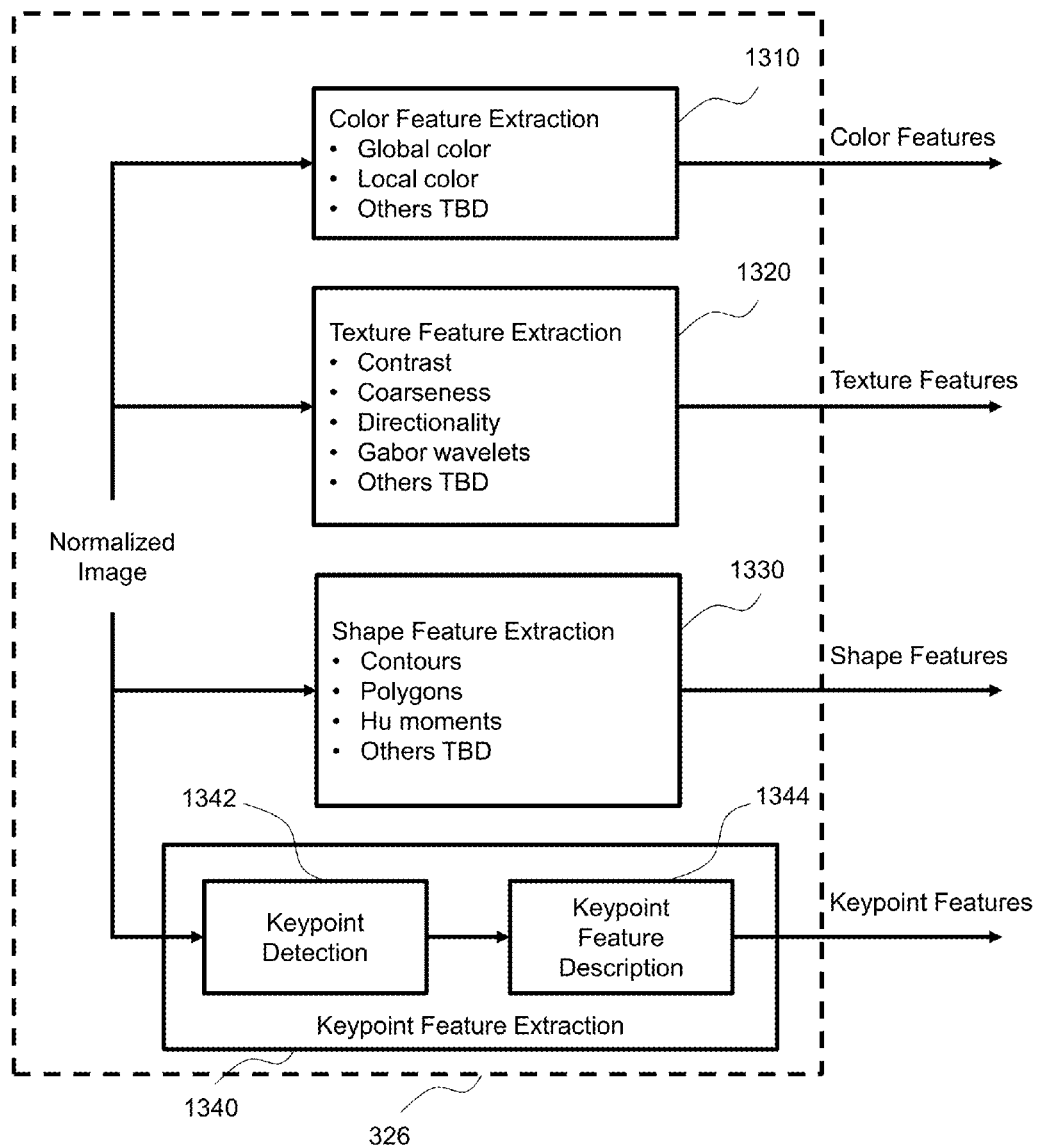
FIG. 13 is a block diagram illustrating an example of a feature extraction module, according to an embodiment.

FIG. 13 depicts components of feature extraction module 326, according to an embodiment. In the illustrated embodiment, feature extraction module 326 comprises a color feature extraction module 1310, a texture feature extraction module 1320, a shape feature extraction module 1330, and a keypoint feature extraction module 1340. It should be understood that feature extraction module 326 may comprise fewer, more, or different components.

Color feature extraction module 1310 extracts color cues based on global color, local color, and/or other color features that may be added to extend system capabilities, and outputs color features. Texture feature extraction module 1320 extracts texture features based on contrast, coarseness, directionality, Gabor wavelets, and/or others attributes that may be added to extend system capabilities, and outputs texture features. Shapes feature extraction module 1330 performs shape processing based on contours, polygons, Hu moments, and/or additional shape attributes that may be added to extend system capabilities, and outputs shape features. In addition, keypoint feature extraction module 1340 outputs keypoint features. In the event that feature extraction is being performed on an input query image, the color features outputted by color feature extraction module 1310, the texture features outputted by texture feature extraction module 1320, the shape features outputted by shape feature extraction module 1330, and the keypoint features outputted by keypoint features extraction module 1340 are compared by feature matching module 328 to features of object models enrolled in database 540. On the other hand, in the event that feature extraction is being performed for object enrollment, all of these features may be stored in database 540 as an enrolled object model or utilized to generate an enrolled object model that is stored in database 540.

In an embodiment, color feature extraction module 1310 comprises components for extracting a global color feature and a local color feature for a given input image. Thus, the color features output by color feature extraction module 1310 may comprise a global color feature and/or local color feature. It should be understood that, regardless of which color feature extraction method(s) are used, the results may be output as the color features from color feature extraction module 1310. It should also be understood that one or a plurality of the color feature extraction method(s) described herein may be implemented, in any combination, by color feature extraction module 1310.

Global color features are extracted over the entire image. One example of a global color feature is the average red (R), green (G), and blue (B) components for the entire image. Another example of a global color feature is the color histogram of the imager. In this case, a hue histogram may be used for color feature extraction:

$$H = \tan^{-1}\left(\frac{\sqrt{3}(G-B)}{(R-G)+(R-B)}\right)$$

This histogram may be normalized by performing L1 or L2 normalization. The hue histogram is appealing because of its robustness to variations in shadows, shading, highlights, illumination intensity, and geometrical viewpoint (affine transformations) and partial occlusions. Another example of a global color feature uses the dominant primary colors of an input image. These dominant colors may be obtained using a statistical region-merging procedure. Region merging is based on the idea that color variations within homogeneous regions should be smaller than between distinct regions. Considering a 4-neighborhood and given color images, one way of measuring region similarity is to calculate the local gradient between pixels and then determine the maximum variation of the local gradients for each color channel. A statistical measure of similarity is used to merge adjacent pixels into regions, and then adjacent regions into larger regions. The final result of this merging procedure is an image with color regions representing the dominant colors of the input image. A histogram built from the dominant colors of each of these segmented regions of the input image could then be calculated and used as the global color feature. In any case, the color features, output by color feature extraction module 1310, may comprise the results (e.g., hue histogram(s)) of any one or more of these examples for determining a global color feature.

Local color features are localized to a specific part or portion of the input image. As one example, local color features may be extracted by dividing the image into sub-regions, and then applying the same calculation as that used for the global color feature in each sub-region. In this case, the image may be divided uniformly into sub-regions, and a single color histogram (e.g., a hue histogram, as calculated above), may be calculated for each sub-region. Accordingly, the color features, output by color feature extraction module 1310, may comprise the result (e.g., hue histogram(s) for one or more sub-regions) of this example for determining a local color feature, in addition to or as an alternative to the global color feature(s).

In an embodiment, texture feature extraction module 1320 extracts texture as a feature to characterize the visual specificities of an input image. The extracted texture features may be derived from those attributes which have been found to correspond to human perception: contrast, coarseness, and directionality. Such texture features model repetitive patterns on the surface of an object. Examples include checked, striped, or polka-dotted patterns on, for example, clothing, ties, or bags. These texture features are suitable for local and global description of visual texture characteristics. Local texture feature extraction may be implemented using the same strategy described above for local color features, i.e., dividing the image into sub-regions and performing texture feature extraction on one or more of the sub-regions. It should be understood that, regardless of which texture feature extraction method(s) are used, the results may be output as the texture features from texture feature extraction module 1320. It should also be understood that one or a plurality of the texture feature extraction method(s) described herein may be implemented, in any combination, by texture feature extraction module 1320.

In an embodiment, texture feature extraction module 1320 uses a tree-structured wavelet transform for texture feature extraction. In such an embodiment, a textured input image (e.g., the normalized image outputted by image normalization module 324) is decomposed with a two-dimensional two-scale wavelet transform into four sub-images. Then, the energy of each decomposed sub-image is calculated. If the energy of a sub-image is significantly smaller than other sub-images, decomposition is stopped in the region of the sub-image. However, if the energy of a sub-image is significantly larger than other sub-images, the same decomposition procedure is applied to the sub-image.

In an embodiment, texture feature extraction module 1320 uses Gabor wavelets. For example, texture feature extraction module 1320 may construct a multi-channel filter bank by convolving the input image with a rotated and scaled Gabor elementary function. After post-processing by a Gaussian filter of a size larger than that used for the corresponding maximum-response Gabor filter by a predetermined factor, the average energy or the maximum magnitude of a Gabor filter over each channel can be used to build a feature vector. The texture features output by texture feature extraction module 1320 may comprise this feature vector.

In an embodiment, shape feature extraction module 1330 performs shape feature extraction based on contours, polygons, Hu moments, and/or other shape features that may be added to extend system capabilities. Accordingly, the shape features, output by shape feature extraction module 1330, represent visual characteristics that reflect the shape of an object in the input image. It should be understood that, regardless of which shape feature extraction method(s) are used, the results may be output as the shape features from shape feature extraction module 1330. It should also be understood that one or a plurality of the shape feature extraction method(s) described herein may be implemented, in any combination, by shape feature extraction module 1330.

In an embodiment, shape feature extraction module 1330 extracts contours, from the binary version of the input image, using an edge detection operation (e.g., Canny edge detection). Accordingly, the shape features, output by shape feature extraction module 1330, may comprise representations of the extracted contours or other features derived from the extracted contours.

In an embodiment, shape feature extraction module 1330 approximates contours of an object by polygons. Shape feature extraction module 1330 may attempt to reduce the number of points in the approximation of each extracted contour while retaining the contour's salient features. In this case, the shape features, output by shape feature extraction module 1330, may comprise the approximations for each extracted contour.

In an embodiment, shape feature extraction module 1330 may utilize Hu moments to characterize the shape of an object in the input image. The idea behind Hu moments is to combine different normalized central moments to create invariant functions that are invariant to scale, rotation, and reflection.

In an embodiment, shape feature extraction module 1330 uses coefficients of the Angular Radial Transform (ART) as a region-based shape feature, in which pixels on the contour and in the interior of the shape of the object are considered during the feature extraction process. The shape is decomposed in complex-valued two-dimensional basis functions, defined by the ART, and separable along the angular and radial directions. The ART shape feature is defined as a set of normalized magnitude-of-complex-ART coefficients and has been adopted by the International Organization for Standardization (ISO)/International Electro-technical Commission (IEC) as a shape descriptor in their multimedia description standard MPEG-7.

In an embodiment, keypoint feature extraction module 1340 extracts features around keypoints. The first step in this process involves the detection of keypoints in the input image by keypoint detection module 1342. For this purpose, corners or homogeneous blobs may be used as keypoints. Methods which may be implemented by keypoint detection module 1342 to detect keypoints in an input image include, without limitation, the Features from Accelerated Segment Test (FAST) detector, the Hessian detector, the Harris detector, the Harris Laplacian detector, and the Hessian-Laplace Detector. The FAST detector was introduced by E. Rosten et al. in "Machine Learning for High-speed Corner Detection," in Proceedings of the European Conference on Compute Vision, 2008, which is hereby incorporated herein by reference. The FAST detector compares pixels on a circle of 16 pixels around a candidate corner, resulting in a detector that is up to thirty times faster than a Harris detector.

Alternatively or additionally, keypoint detection module 1342 may implement localized keypoint feature extraction using Scale Invariant Feature Transform (SIFT). SIFT is a method to detect and match robust keypoints. The uniqueness of SIFT is that it results in distinctive features that can be successfully matched between images with very different illumination, rotation, viewpoint, and scale changes. Moreover, it boasts high repeatability and a high matching rate in very challenging conditions. In contrast to corners detected using FAST, SIFT results in features that are extracted around a small patch in the vicinity of detected keypoints.

In an embodiment, once keypoint(s) have been detected by keypoint detection module 1342, keypoint feature description module 1344 encodes the content of the detected keypoint(s) into a suitable descriptor (i.e., a feature to be included in the keypoint features, output by keypoint feature extraction module 1340) to be used during matching. One embodiment of keypoint feature description module 1344 uses SIFT as described by D. Lowe in, "Distinctive Image Features from Scale Invariant Keypoints," International Journal of Computer Vision, Vol. 60, No. 2, pp. 91-110, 2004, which is hereby incorporated herein by reference. A SIFT descriptor may be computed from the region around the keypoint(s) detected by keypoint detection module 1342. The SIFT descriptor distinctively represents color and texture information in the regions around the detected keypoint(s). In an embodiment, the SIFT descriptor is a vector that represents the local distribution of the image gradients around the detected keypoint(s). Orientation invariance may be achieved by rotating the gradient orientations relative to the keypoint orientation, i.e., by encoding the image information in a set of localized gradient orientation histograms. The SIFT descriptor may be constructed by stacking all of the orientation histogram entries, and provides a certain degree of invariance to variations in illumination.

In an embodiment, keypoint feature extraction module 1340 may implement the Maximally Stable External Regions (MSER) as reported by J. Matas et al. in "Robust Wide-Baseline Stereo from Maximally Stable Extremal Regions," in Proceedings of the British Machine Vision Conference, pp. 384-393, 2002, which is hereby incorporated herein by reference. This scale-invariant feature detector is several times faster than SIFT. It uses Haar wavelets to approximate difference of Gaussian (DoG) filters and integral images for convolution, which makes the image filtering process much more efficient.

In an embodiment, keypoint feature extraction module 1340 implements keypoint feature detectors and descriptors using Speeded-Up Robust Features (SURF) reported by H. Bay et al. in "SURF: Speeded-Up Robust Features," Computer Vision and Image Understanding, Vol. 110, No. 3, pp. 346-359, 2008, which is hereby incorporated herein by reference.

In an embodiment, for the purpose of efficiency, binary feature descriptors may be used as the output feature(s) of feature extraction module 326. Matching with these features involves comparisons using the Hamming distance (bitwise XOR followed by a bit count), (e.g., instead of Euclidean distance), and can be efficiently implemented using hardware support on modern computers. Invariance to changes in scale and rotation is supported when a local feature detector, supporting the comparisons, is coupled with binary descriptors.

In an embodiment, keypoint feature description module 1344 may implement BRIEF feature descriptors that have been reported by M. Calonder et al. in "BRIEF: Binary Robust Independent Elementary Features," in Proceedings of 11$^{th}$ European Conference on Computer Vision, pp. 778-792, 2010, which is hereby incorporated herein by reference.

In an embodiment, keypoint feature description module 1344 may implement Oriented FAST and Rotated Binary Robust Independent Elementary Features (ORB) feature descriptors that have been reported by E. Rublee et al. in "ORB: An Efficient Alternative to SIFT or SURF," in Proceedings of International Conference on Computer Vision, pp. 2564-2571, 2011, which is hereby incorporated herein by reference.

In an embodiment, keypoint feature description module 1344 may implement Binary Robust Invariant Scalable Keypoints (BRISK) feature descriptors that have been reported by S. Leutenegger et al. in "BRISK: Binary Robust Invariant Scalable Keypoints," in Proceedings of IEEE International Conference on Computer Vision, pp. 404-410, 2012, which is hereby incorporated herein by reference.

In an embodiment, keypoint feature description module 1344 may implement Fast Retina Keypoint (FREAK) feature descriptors that have been reported by A. Alexandre and al. in "FREAK: Fast Retina Keypoint," in Proceedings of IEEE International Conference on Computer Vision and Pattern Recognition, pp. 510-517, 2012, which is hereby incorporated herein by reference.

In an embodiment, keypoint feature description module 1340 generates keypoint features using the robust LOcal Feature descripTor (LOFT). First, keypoints are detected by keypoint detection module 1342 using any of the methods described above, individually or in any combination. Second, a rectangular block of size M×M is constructed in the neighborhood of each detected keypoint, and centered on the respective keypoint. Third, a histogram (e.g., hue histogram) is calculated for each region of the M×M sub-division, and normalized to obtain a unit histogram via $L_1$ or $L_2$ normalization. These histograms can then be combined into a local color feature that can be used for color matching. Accordingly, keypoint feature extraction module 1340 can be used as color feature extraction module 1310 to generate a local color feature.

In an additional or alternative LOFT-based embodiment, each M×M block centered on a keypoint is divided into a plurality of regions, and, for the plurality of regions in each M×M block, the average color is calculated, resulting in an additional or alternative color feature that can be used for color matching.

In an additional or alternative LOFT-based embodiment, each M×M block centered on a keypoint is divided into J bins and K orientations. A histogram (e.g., hue histogram) is calculated for each of a plurality of regions of the M×M block, and normalized with the magnitude of the variation of hue between adjacent angular slices, resulting in a circular local color feature that can be used for color matching.

These LOFT-based methods may be generalized to work for previously-described texture features (e.g., implemented by the texture feature extraction module 1320), by using the same techniques for generating local color descriptors to instead construct a local texture descriptor for texture matching.

These LOFT-based methods provide robustness with respect to curvature and bending by calculating the inherent histogram in a log-polar coordinate system. This makes the descriptor less sensitive to image shifts, caused by deformation, within the smaller inner bins than within the larger outer bins. This is based on the observation that, given a query shape and a set of target shapes in a database, with their corresponding matching points, deformation of the query shape results in points on the query shape shifting away from their matching counterparts. The log-polar histogram accommodates for this shift.

6. Feature Matching

Figure 14:
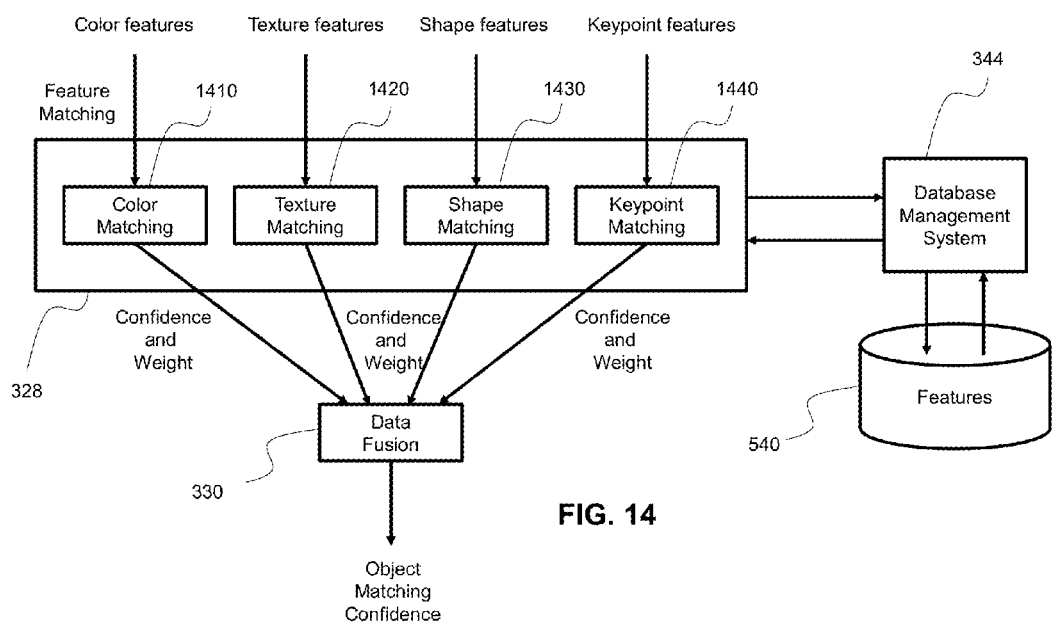
FIG. 14 is a block diagram illustrating example feature matching and data fusion modules, according to an embodiment.

FIG. 14 depicts feature matching module 328 and data fusion module 330, according to an embodiment. Feature matching module 328 comprises components for matching individual features extracted from image attributes, such as color feature matching module 1410, texture feature matching module 1420, shape feature matching module 1430, and/or keypoints feature matching module 1440. It should be understood that feature matching module 328 may comprise fewer, more, or different components, and that, in such cases, the components may be in one-to-one correspondence with components of feature extraction module 326.

In an embodiment, color feature matching module 1410 calculates the distance or similarity between two distributions: one distribution representing the color in a query image, and the second distribution representing color for object models enrolled in database 540.

In an embodiment, color feature matching module 1410 may achieve color matching using histogram intersection.

In an embodiment, color feature matching module 1410 may—given two distributions $H_1$ and $H_2$, respectively representing a distribution generated from the query image and the second distribution extracted from object models enrolled in database 540, with N being the number of bins in the underlying histograms—implement different similarity measures, such as Chi-square distance:

$$d_{chisqr}(H_1, H_2) = \sum_{i=1}^{N} \frac{(H_1[i] - H_2[i])^2}{H_1[i] + H_2[i]}$$

Other similarity measures that may be implemented for this purpose include the correlation distance metrics:

$$d_{cor}(H_1, H_2) = \frac{\sum_{i=1}^{N} H'_1[i] \cdot H'_2[i]}{\sqrt{\sum_{i=1}^{N} H'^2_1[i] \cdot H'^2_2[i]}}$$

where:

$$H'_k[i] = H_k[i] - \frac{1}{N}\sum_{j}^{N} H_k[j]$$

and the Bhattacharrya distance metrics:

$$d_{Bhat}(H_1, H_2) = \sqrt{1 - \sum_{i=1}^{N} \frac{\sqrt{H_1[i] \cdot H_2[i]}}{\sqrt{\sum_{i=1}^{N} H_1[i] \cdot \sum_{i=1}^{N} H_2[i]}}}$$

In an embodiment, color feature matching module 1410 may measure similarity using the Earth Mover's Distance (EMD). In simple terms, EMD is a measure of the amount of work it would take to change the shape of a first histogram into the shape of a second histogram. EMD allows two histogram to be matched, even if the shape of the histograms differ due to lighting variations that could cause other methods to fail.

In an embodiment, texture feature matching module 1420 matches texture features to corresponding reference texture features in database 540 via database management system module 344. When texture feature extraction module 1420 is implemented using the tree-structured wavelet transform, classification takes places in two phases: a learning phase and a classification phase.

During the learning phase, given m samples of the same texture, each sample is decomposed with the tree-structured wavelet transform, and the normalized energy at its leaves is calculated. An energy map is generated for each texture by averaging the energy maps over all samples. This procedure is repeated for all textures.

During the classification phase, an unknown texture is decomposed with the tree-structure wavelet transform, and the corresponding energy map is constructed. Then the first N leaf nodes in the energy map with the largest energy are selected as features and denoted $X=(x_1, \ldots, x_N)$. For a given texture in database 540, the energy values in the same channel are selected $m_i=(m_{i,1}, \ldots, m_{i,N})$. The distance between the feature to be matched and each references feature from database 540 is calculated, $D_i=d(X,m_i)$, and the unknown texture j is assigned to i if $D_i < D_j$ for all $j \neq i$. As a measure of similarity measure, the Mahalanobis distance may be used:

$$D_i = (x-\mu)^T \Sigma^{-1} (x-\mu)$$

where x is the feature vector, $\mu$ is the mean vector, and $\Sigma$ is the covariance matrix.

For embodiments in which texture feature extraction module 1420 is implemented using Gabor wavelets, a feature vector is constructed from the response of each spatial/spatial-frequency channel, followed by a Gaussian filter to eliminate variations in the feature vectors within regions exhibiting identical colored-texture properties. The principal component analysis (PCA) is applied to reduce the dimensionality of the feature space. Here, as well, similarity may be measured using the Mahalanobis distance.

An embodiment of shape feature matching module 1430 may implement a matching algorithm based on shape context. The goal is to match two shapes by finding the correspondence between point $p_i$ on the first shape and point $q_i$ on the second shape. For a point $p_i$ on the first shape, a coarse histogram $h_i$ of the relative coordinates of the remaining n−1 points is calculated. This histogram is the shape context of $p_i$. The procedure for matching shapes is as follows:

(1) A set of points on the edges of the query object and another set of the edges of a reference object in database 540 are randomly selected.

(2) The shape context of each selected point is calculated.

(3) Each point from the query object is matched to a point on the reference object in database 540. To minimize the cost of this matching, a transformation (e.g. affine, thin plate spline, etc.) that warps the edges of the reference object to the query object is established.

(4) The point on the query object that most closely corresponds to each warped point on the reference object is selected.

(5) The similarity between each pair of points on the query and reference objects is calculated as a weighted sum of the shape context distance, the image appearance distance, and the bending energy.

(6) The query object is identified by using a nearest neighbor classifier to match its shape distance to shape distances of reference objects in database 540.

Shape feature matching module 1430 may also be implemented using Hu moments to match two contours for similarity. An alternative embodiment of shape matching module 1430 may use Pairwise Geometrical Histogram (PGH) to match the contour extracted from the query object and the contour of a reference object in database 540 derived from reference images.

Figure 15:
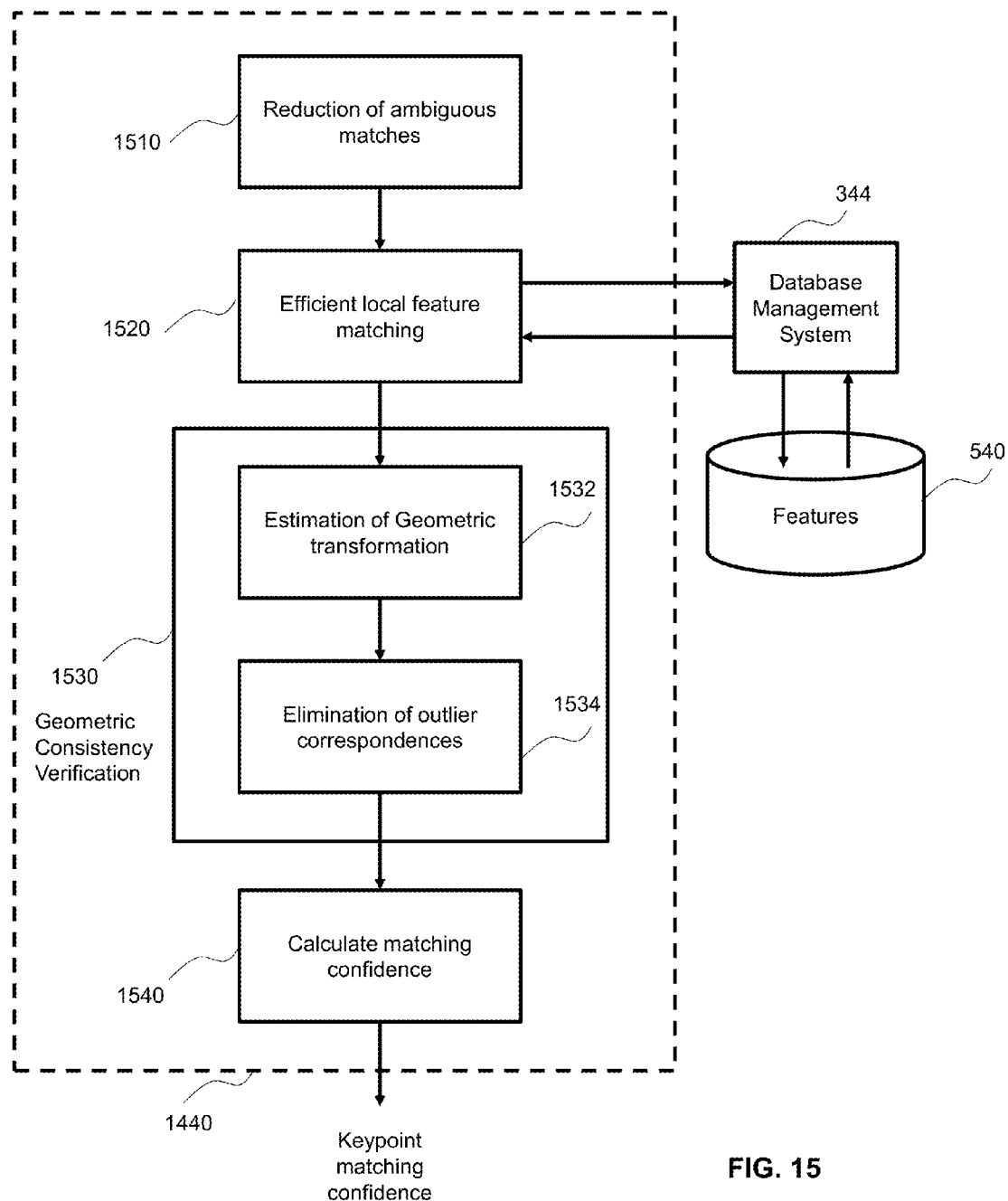
FIG. 15 is a block diagram illustrating an example feature matching module for local keypoints, according to an embodiment.

FIG. 15 depicts keypoint matching module 1440 for local keypoints, according to an embodiment. In an embodiment, reduction of ambiguous matched module 1510 processes keypoints to calculate two distances. The first distance is the distance from each given keypoint to its closest keypoint. The second distance is the distance from that same given keypoint to its second closest keypoint. If the ratio of the distance to the closest keypoint over the distance to the second closest keypoint is relatively high, it is an indication that the match may be ambiguous. Conversely, a ratio of the distance to the closest keypoint over the distance to the second closest keypoint that is low indicates a reliable match. A distance ratio threshold, for differentiating between a high and low ratio, is set to a predetermined value. This method eliminates most of the false matches, while discarding only a very small proportion of correct matches.

In an embodiment, efficient local feature matching module 1520 communicates with database management system module 344 to match local keypoint features to reference features in database 540 using Locality Sensitive Hashing (LSH) methods. LSH methods provide a significant increase in query time. Tree-based similarity search methods that employ approximate similarity search techniques may also be utilized by efficient local feature matching module 1520.

In an embodiment, efficient local feature matching module 1520 uses a-priori knowledge of where data (i.e., reference features) reside so that only a portion of database 540 that contains potentially matching features is searched during the matching process. Hash tables, data compartmentalization, data sorting, and database table indexing may be used as well by efficient feature matching module 1520. This process is related to the object categorization or clustering stage (e.g., performed by image categorization module 340) of the object enrollment process. For a given visual query, disqualified clusters are eliminated by checking the lower bound of distances in each cluster. Then, only the resulting clusters are considered during the feature matching process (e.g., performed by feature extraction module 326).

A parallel processing computing architecture may be employed to achieve fast searching of large databases. In this case, the complete database or a portion of the database may be searched by partitioning the database across multiple Central Processing Units (CPUs) and/or Graphics Processing Units (GPUs).

In an embodiment, a set of scalable methods are provided for matching reference features (e.g., of enrolled object models) in very large databases, including algorithms that work with binary features from binary feature descriptors. An embodiment of efficient feature matching module 1520 could be implemented using a priority search k-means tree. In such an embodiment, leaf nodes are created with points in the dataset of keypoints. The points in the dataset are then partitioned at each level into K distinct regions using a k-means clustering algorithm, where K is the number of clusters. Afterwards, the same method is recursively applied to the points in each region. The recursion is stopped when the number of points in a region is smaller than K.

Once the k-means tree has been constructed, in an initial traversal, it is searched from the root to the closest leaf, following the branch with the closest cluster center to the query point, and adding all unexplored branches and the path to a priority queue. The priority queue is sorted in increasing distance, starting from the query point and extending to the boundary of the branch being added to the queue. Following the above initial tree traversal, the algorithm reiterates, always starting from the top branch in the priority queue.

The priority search k-means trees are not suitable for matching binary features from binary visual descriptors such as BRIEF, ORB, BRISK or FREAK. Indeed, a priority search k-means tree requires the points to be in a vector space where their dimensions can be independently averaged. For matching binary features, the hierarchical clustering tree algorithm is very effective. In this algorithm, a decomposition of the search space is attained by recursively clustering the input data set using random data points as cluster centers for non-leaf nodes.

To scale indexing algorithms implementing efficient feature matching modules 1520 to very large databases, the data may be distributed to multiple machines in a computing cluster where the nearest neighbor search may be performed using all the machines in parallel. To distribute the nearest neighbor matching on the computer cluster, an implementation of Map-Reduce may be undertaken using the message passing interface specification (MPI).

In an embodiment, after the features from the query object have been matched to their counterparts in database 540 by efficient feature matching module 1520, geometric consistency verification module 1530 verifies that those matches occur in a geometrically consistent way. In other words, the locations and scales of corresponding features should be related through a common geometrical transformation. The motivation for this process is that the set of keypoints alone does not contain the spatial relation between the query object and the reference object. Therefore, a pair of objects that have the same set of keypoints, but in a different geometrical configuration, would have a high level of similarity. The sought spatial relation may be enforced by estimation of geometric transformation module 1532. For this purpose, the k most similar objects to a query object are tested for geometrical consistency by computing geometrical transformations in module 1532 using the coordinates of matching points. Transformations commonly used are affine transformations, homographies, and/or the essential matrix between the query object and the most similar reference objects.

In this context, outlier correspondences may be eliminated by elimination of outlier correspondences module 1534. This elimination may be performed by finding a consistent geometric transformation, as described above, together with a large set of inliers supporting this geometrical transformation. A common approach to perform this computation in a robust fashion is through the use of a Random Sample Consensus (RANSAC) method to eliminate outliers. According to RANSAC, the number of inliers to the transformation is counted. The reference object that achieves the largest number of inliers with the query object is then reported as the best match. The matching reference objects are sorted in descending order of the number of keypoints or regions which satisfy the geometrical transformation.

In an embodiment, calculate matching confidence module 1540 calculates the confidence of this keypoint matching scheme using the ratio of inliers and outliers.

The above described feature-matching methods (e.g., performed by feature matching module 328) are capable of identifying the query object from any background/foreground clutter in the background or foreground, and works without human intervention. Scalability is also available, providing the ability to identify objects in digital media assets using a very large database (e.g., millions) of reference objects, with a short response time. Moreover, these feature-matching methods offer robustness to affine transformations such as rotation, translation, scaling, robustness to non-affine transformation such as stretching and bending, and/or robustness to occlusions, shadows, shading, reflections, highlights, variations in illumination intensity, and image noise.

In an embodiment, objects enrolled in database 540 are associated with metadata. This metadata may comprise, without limitation, title, description, brand name, associated keywords, price, unique product identification number, product categories, and/or the like. Therefore, in embodiments, even in the context of visual search, metadata could be used to further narrow down the search for the query object from a list of visually similar objects. For example, following a search for a dress using visual features (e.g., color, texture, shape, etc.), keywords such as "red dress," "white polka dots," "sleeveless," "ruffles," and "belt," could provide additional filtering. In other words, search words can be derived from the features extracted from the query object, and used in a query of metadata associated with reference objects in database 540 that have been identified as visually similar to the query object. As a simple example, if a color feature output by color feature extraction module 1310 represents the color red, the keyword "red" can be used by feature matching module 328 to search the associated metadata of reference objects. Alternatively or additionally, keywords to be used to search metadata during matching may be input by a user.

The importance of a word in the metadata can be evaluated using the term frequency-inverse document frequency (TF-IDF) score. The TF measures the number of times a term appears in the metadata, whereas the IDF lowers the weight of terms that appear very frequently, and raises the weights of terms that appear rarely in the metadata. A TF-IDF score or weight is calculated as $w_{ij}=tf_{ij} \times idf_i$, i.e., the frequency of term i within metadata $d_j$ times the inverse of the frequency of the metadata that contain term i with respect to all the metadata considered. The weights have a tendency to filter out commonly occurring terms. A feature vector can be constructed using the TF-IDF score of all terms in the description. The similarity of two items—i.e., the search word and the metadata—could be estimated using the cosine of their TF-IDF vectors. A search for shoes could be carried out by using keywords such as "high heels," "black leather," "open toe," "straps," to only match shoes with a high degree of similarity to the sought item, based on the TF-IDF scores.

7. Multi-Feature Data Fusion

In an embodiment, feature matching module 328 produces, for each feature, a matching score to each matched reference object, and an estimated weight of that feature in the query object. Therefore, in the embodiment illustrated in FIG. 14, for each matched reference object, there is a set of score and weight results for color features, a set of score and weight results for texture features, a set of score and weight results for shape features, and a set of score and weight results for keypoint features. In each set, the score is a measure of the distance between the query object and a reference object, within a particular feature space. These scores may be normalized in the range [0, 1]. The weight, on the other hand, may be a measure of the importance of a given feature in the composition of the query object, and may also be normalized in the range [0, 1].

Data fusion module 330 may generate a final combined or fused score, for example, by a linear combination of weighted sum, as shown below:

$$d_f = \sum_{i=1}^{N} w_i \cdot d_i$$

where N is the number of visual characteristics. When color, texture, shape, and keypoint features are used, the value of N is four.

In an alternative embodiment, data fusion module 330 may calculate the final combined or fused score as follows:

$$d_f = \sqrt{\sum_{i=1}^{N} w_i \cdot d_i^2}$$

In either case, the final combined score, generated by data fusion module 330, is used to rank or order the matched reference objects by visual similarity. The object with the best score (e.g., the lowest scoring value) is ranked as the closest match.

In an embodiment, the weights could be intelligently derived from the query image. For example, for color images, normalized entropy could be used as a measure of color weight. In the case that color feature description are represented by a 64-level global hue histogram, the maximum possible entropy is 6 bits. Assuming an 8-bit dynamic range (256 levels in each color channel), the average color could be computed over the entire image, normalized by the dynamic range of the image (e.g., 256), and serve as a measure of color weight.

In a similar manner, texture weight could be estimated from the grayscale counterpart of the query image by converting it into a single-channel image. Assuming a 256-level global histogram of this grayscale image, the maximum possible entropy is 8 bits. Assuming an 8-bit dynamic range (256 gray levels), the grayscale entropy may be normalized by the maximum dynamic range, resulting in normalized entropy as a measure of texture weight.

8. Search for Visually Similar Objects

Figure 16:
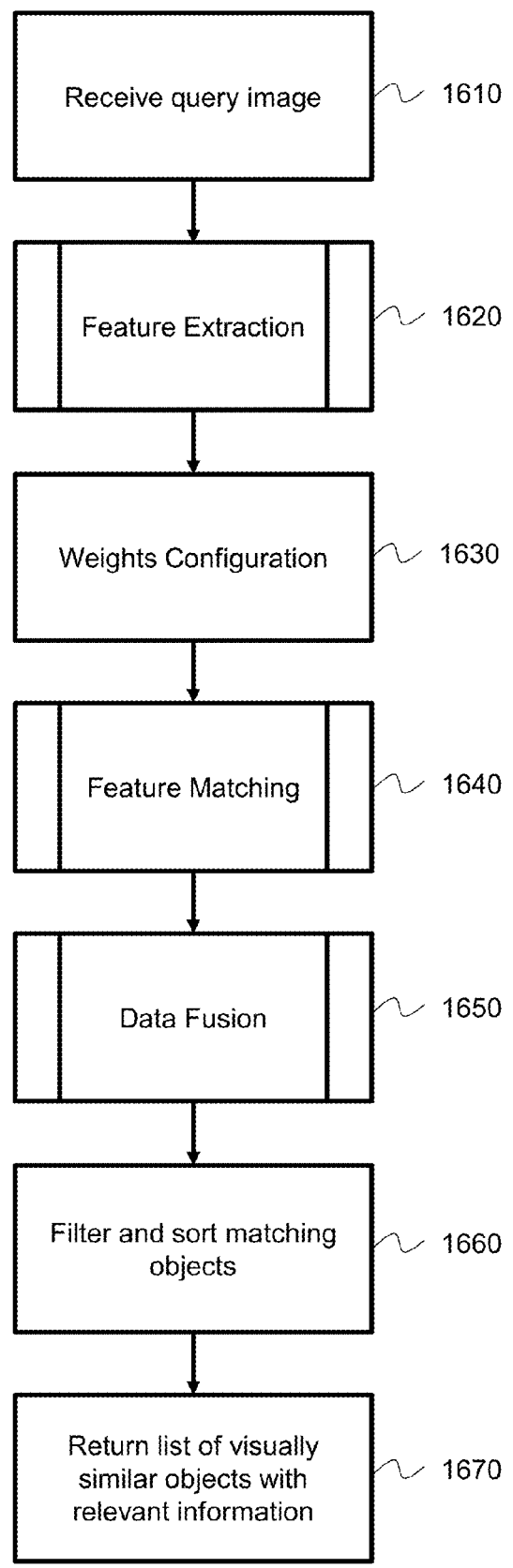
FIG. 16 is a high level flowchart illustrating an example search operation for visually similar objects, according to an embodiment.

FIG. 16 is a high level flowchart illustrating an example search operation for visually similar objects, according to an embodiment. Initially, a visual query is generated (e.g., by visual query generator 220) from an image selected on the network device, for example, by one of the two methods described herein or by another method. In the first method, the image is selected through a user interaction with an interactive application (e.g., interactive application 210) running on a network device (e.g., network device 120). For example, the user may select a previously-embedded product hotspot overlaid on a video, during playback in the interactive application, to initiate a query for visually similar objects. It should be understood that in this scenario, the object associated with the product hotspot may have been previously matched to a reference object in database 540 to generate the embedded hotspot in the first place. In the second method, the user may select at least a portion of an object of interest by creating a rectangular bounding box (e.g., via a point-and-click or touch operation) around the object of interest or portion of the object of interest. The portion of the image within the rectangular bounding box is used to create a visual query that triggers a search for reference objects (e.g., objects in database 540) that are visually similar to the selected object or selected portion of the object.

In step 1610, the query image, containing the selected object or the selected portion of an object, is received (e.g., by media analysis server 140 as a visual query).

In step 1620, features are extracted from the query image (e.g., by feature extraction module 326) using visual attributes of the image, such as color, texture, shape, and/or keypoints.

In step 1630, weights corresponding to each feature are calculated (e.g., by feature matching module 328).

In step 1640, the features extracted from the query image are matched (e.g., by feature matching module 328) against reference features stored in a database (e.g., database 540). The result of this matching process is a list of reference objects with corresponding confidence scores and weight values (e.g., for each feature).

In step 1650, a combined matching score is calculated (e.g., by data fusion module 330) for each reference object from its corresponding confidence scores and weight values.

In step 1660, the matching reference objects are ranked in increasing order of this combined matching score. In an embodiment, a low score indicates a smaller distance between the query object and the reference object, i.e., a higher similarity. However, it should be understood that, in an alternative embodiment, a high score may indicate a smaller distance, i.e., a higher similarity.

In step 1670, the ranked list of visually similar objects (e.g., list 520) with associated information is returned. The associated information about each visually similar object may include, without limitation, one or more of the following items: an identifier (e.g., object name, ID number, classification group, etc.), the position, the orientation, the size, the color, and/or the metadata associated with the object.

9. Content Interactivity Synthesizer

Figure 17:
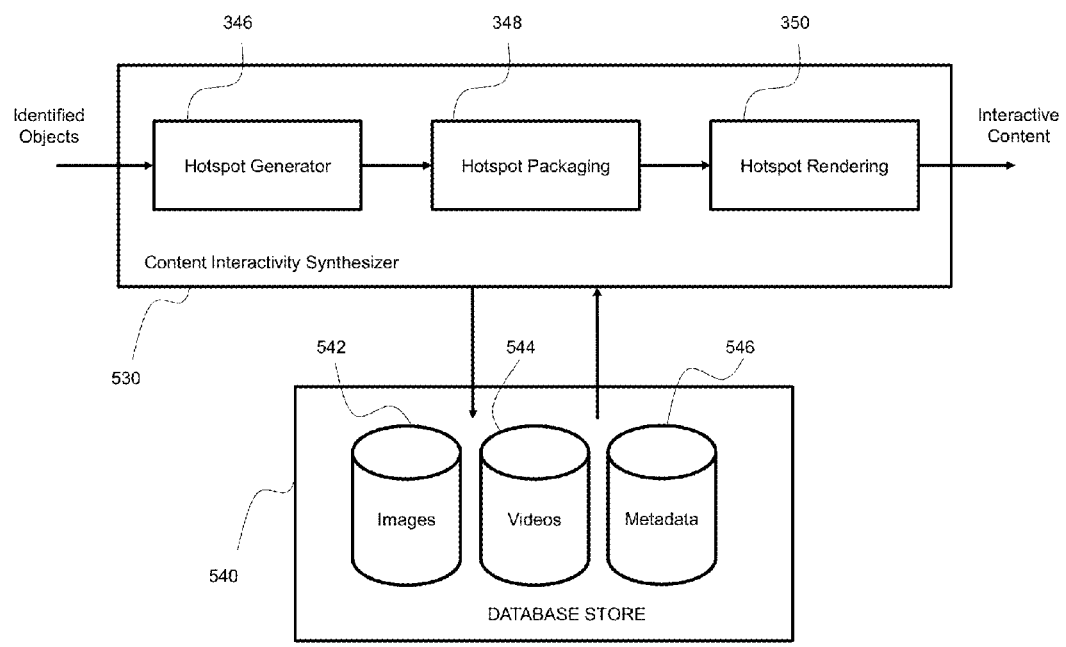
FIG. 17 is a block diagram illustrating an example content interactivity synthesizer, according to an embodiment.

FIG. 17 illustrates content interactivity synthesizer 530, according to an embodiment. Content interactivity synthesizer 530 receives, as input, information derived from identified object(s) (e.g., a query object matched to a reference object in database 540) and outputs interactive content. In the illustrated embodiment, content interactivity synthesizer 530 comprises a hotspot generator module 346, a hotspot packaging module 348, and a hotspot rendering module 350. However, it should be understood that content interactivity synthesizer 530 may comprise less, more, or different components.

In an embodiment, hotspot generator 346 creates one or more hotspots corresponding to the one or more previously-identified commercial objects. Where the content is a video, each hotspot may comprise a video frame identifier, a product object identifier, and/or a position within the identified video frame indicating where the hotspot should be rendered. Where the content is an image, each hotspot may comprise a product object identifier and/or a position within the image indicating where the hotspot should be rendered.

In an embodiment, hotspot packaging module 348 extracts a set of commerce-related information for each of the one or more identified commercial objects from database 540. The information may include, without limitation, links to images 542, video data 544, and/or metadata 546. This information may be packaged with the hotspot(s), generated by hotspot generator module 346, to create a hotspot package.

In an embodiment, hotspot rendering module 350 embeds the hotspot package(s), generated by hotspot packaging module 348 and each associated with a commercial object, as a visual overlay in the original content of the digital media asset comprising the identified objects.

The result is a digital media asset that has been configured to respond to user action. This user action may comprise clicking on the graphical overlay, rendered by hotspot rendering module 350 and indicating the presence of a hotspot. This user interaction may take place on network device 120 running interactive application 210 (e.g., via the content server 130).

10. E-Commerce Applications

In an example embodiment, a pricing database (e.g., within database 540) may be accessed to identify appropriate sources to receive price information in accordance with a product classification of an identified object at issue. In general, the product price sources may be various on-line merchants of the relevant types of products. Other sources may also be used, such as third-party systems which are specifically designed to provide price comparisons of various specific products. The price information may be rendered in a hotspot embedded within a video or image containing the identified object that has been classified as the product.

In another example embodiment, a consumer may be provided access (e.g., via a rendered hotspot embedded within a video or image) to various product reviews (e.g., within database 540) for an identified object representing a product. The reviews can be provided by prior users of the system (e.g., consumers of the product). As part of the review process, the user can rate or otherwise evaluate a purchase themselves and/or the quality of a product. For example such a rating system can be based on five stars, with five stars indicating an excellent product or purchasing experience. The user can rate not only the product but also the establishment or on-line site where the product was purchased. Additional reviews can be retrieved from external repositories or specific content providers. Various product reviews can be maintained within a review database (e.g., with database 540). The review database can comprise commercial or professional reviews and can also include comments or review submitted by users of the system.

Another aspect of embodiments may be to facilitate the purchase of various products corresponding to identified objects (e.g., within a video or image). Various techniques can be used to enable purchase of the products. In a simple embodiment, the user is provided with links (e.g., via a rendered hotspot embedded within a video or image) to one or more on-line merchants or suppliers of the product at issue. By following those links, the user can purchase the product using the merchant's on-line facilities. Often, several merchants may be available which supply the same product. In this case, multiple links may be provided in the embedded hotspot. Alternatively, the embedded hotspot may itself comprise a user interface for purchasing the product.

According to another embodiment, a consumer may make an on-line purchase of an item selected from results (e.g., list 520 displayed on network device 120) obtained through a visual search. The consumer may indicate whether and how many of the item type to purchase. Assuming the consumer is registered with the e-commerce site to provide transaction information such as name, credit card number, shipping address, etc., the e-commerce site completes the transaction. Transaction options may be available, such as allowing the consumer to request more information to be sent to the consumer's personal computer email address, having hardcopy information mailed to the consumer, allowing the consumer to specify that the item be delivered to another party, selecting the item as a gift, obtaining information on related items, etc.

11. Other Details of Different Embodiments

The connection and information exchange between the client application on network device 120 and media analysis server 140 may be accomplished via standard Internet and wireless network software protocols (e.g., HTTP, TCP, UDP, WAP, etc.) and networks. However, any suitable technique for exchanging information exchange may be used.

Likewise, the connection and information between content interactivity synthesizer 530 and network device 120, running the client application, may be accomplished via standard Internet and wired or wireless network software protocols and networks.

Various embodiments of the image identification calculations may also be implemented directly in custom hardware in forms such as Application Specific Integrated Circuits (ASICs), Field Programmable Gate Arrays (FPGAs), Programmable Logic Devices (PLDs), Digital Signal Processors (DSPs), Graphical Processing Units (GPUs), optical, chemical, biological, quantum or nano-engineered systems, components, and mechanisms.

Various embodiments may also be implemented in hardware, software, or a combination of both.

Furthermore, those of skill in the art will appreciate that the various illustrative logical blocks, modules, circuits, and methods steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the application. In addition, the grouping of functions within a module, block, circuit or step is for ease of description. Specific functions or steps can be moved from one module, block or circuit to another without departing from the application.

Moreover, the various illustrative logical blocks, modules, and methods described in connection with the embodiments disclosed herein can be implemented or performed with a general purpose processor, a Graphics Processing Unit (GPU), a digital signal processor (DSP), an Application Specific Integrated Circuit (ASIC), Field Programmable Gate Arrays (FPGAs) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP or a GPU and a microprocessor, a plurality of plurality of microprocessors, and one or more microprocessors in conjunction with a DSP core or GPU, or any other such configuration.

Additionally, the steps of a method or algorithm described in connection with the embodiments disclosed herein can be embodied directly in hardware, in software module(s) executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

12. Interactive Applications

Examples of search by visual similarity, in the context of image or video interactivity, is discussed next.

Figure 18A:
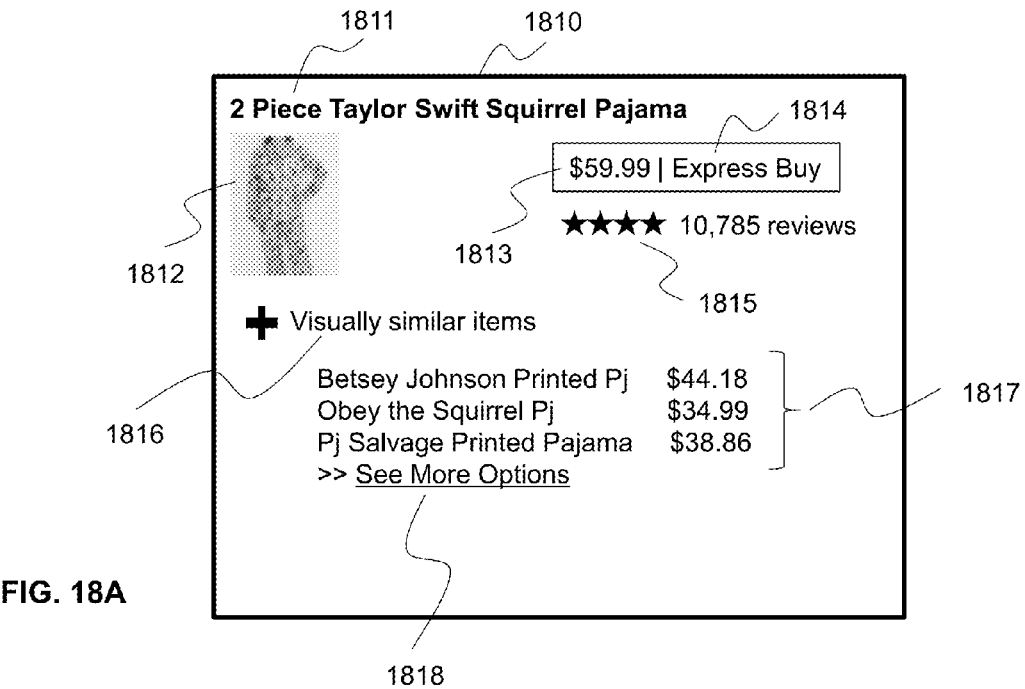
FIGS. 18A-18C illustrate various user interfaces related to interactivity with objects identified in digital media assets, according to embodiments.

FIG. 18A illustrates an example of a rendered hotspot comprising the result of a visual similarity search for pajamas, according to an embodiment. The hotspot comprises a graphical overlay 1810 that is rendered on the original digital media asset (e.g., image or video), for example, on or in the vicinity of an object corresponding to a product. In the illustrated embodiment, graphical overlay 1810 comprises the product name 1811, an image 1812 of the product, the product price 1813, a link 1814 to facilitate the purchase of the product, a product review 1815 (e.g., represented by the number of stars, indicating a level of product quality or rating purchasing experience, and the number of reviews), a link 1816 to expand or collapse a list of items 1817 that are visually similar to the product (e.g., by name and/or price), and a link 1818 that provides the option to browse through more visually similar items than those in list 1817. It should be understood that at least a portion of the information 1811-1818 may be derived from database 540 (e.g., from metadata associated with the object corresponding to the product). In an embodiment, selecting link 1816 displays or hides the list of visually similar items 1817.

Figure 18B:
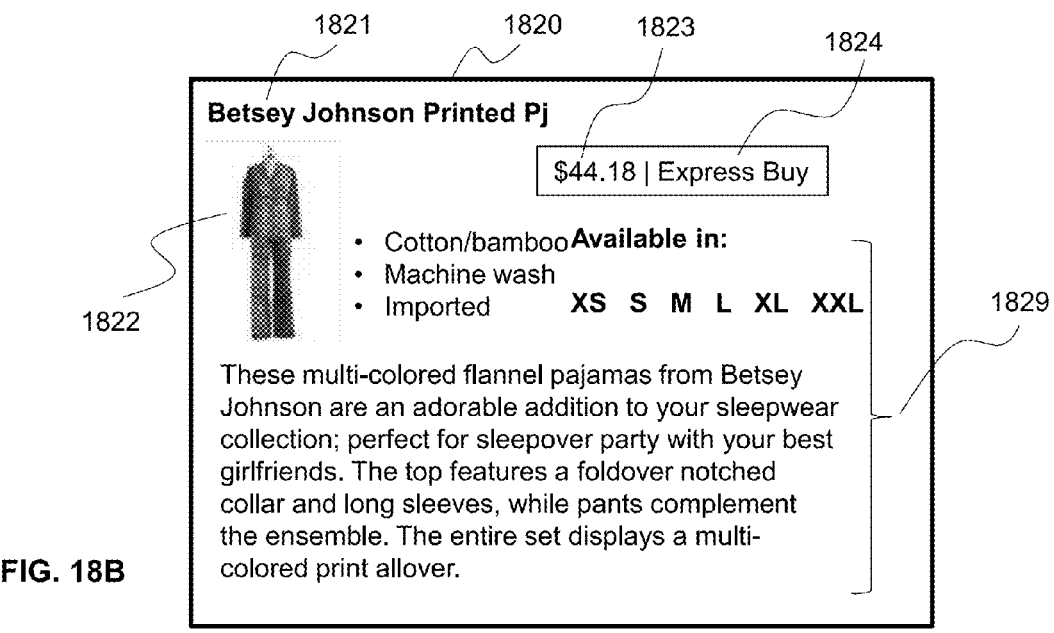

In an embodiment, selecting an item in the list of visually similar items 1817 in FIG. 18A may generate the screen shown in FIG. 18B. FIG. 18B illustrates an example user interface conveying a detailed description for one of the items selected from list 1817, according to an embodiment. In this case, the product "Betsy Johnson Printed Pj" has been selected from the list of items 1817 in FIG. 17A. The result is a new graphical overlay 1820 comprising product name 1821, an image of the selected product 1822, the product price 1823, a link 1824 to facilitate the purchase of the product, and a detailed product description 1829. Graphical overlay 1820 may be overlaid on the digital media asset on or in the vicinity of the visually similar object (e.g., in place of graphical overlay 1810).

Figure 18C:
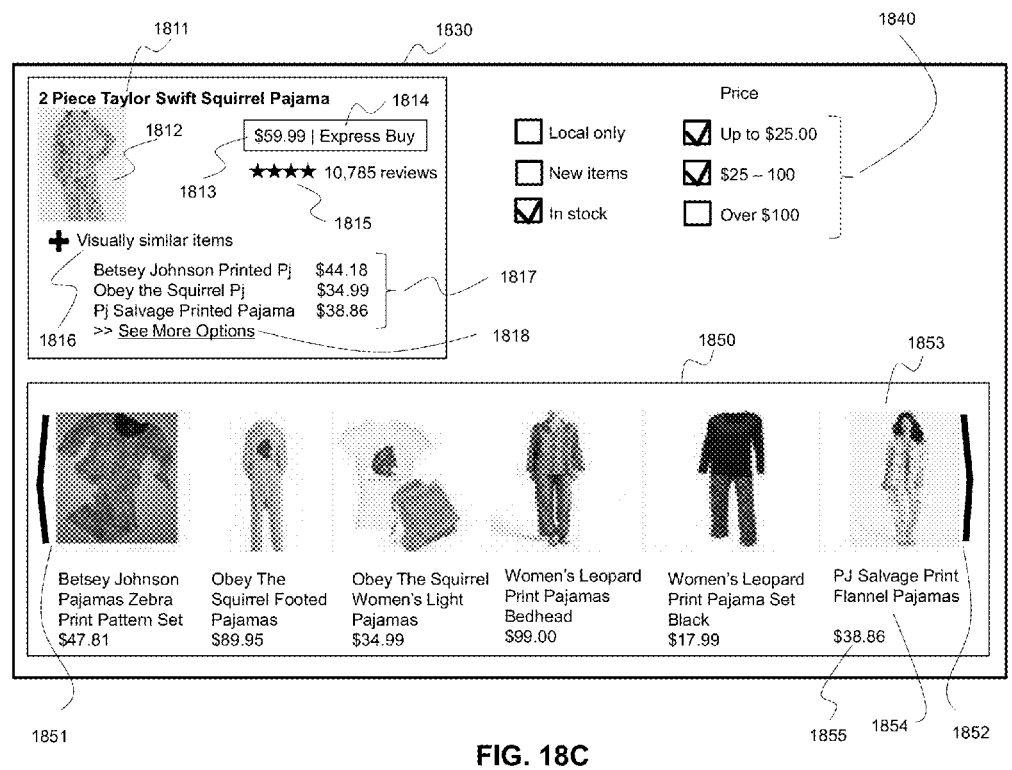

In an embodiment, selecting link 1818 in graphical overlay 1810 in FIG. 18A may generate the screen shown in FIG. 18C. FIG. 18C illustrates an example user interface 1830 conveying additional options available to a user, according to an embodiment. User interface 1830 may comprise a graphical overlay (e.g., in the vicinity of the object of interest in the image or video) on the digital media asset, may replace the digital media asset (e.g., within interactive application 210), or may be rendered separately from the digital media asset on the display (e.g., in a different tab of interactive application 210 or by a separate application initiated in response to selection of link 1818). In any case, user interface 1830 may comprise information related to the product in the digital media asset, such as the product name 1811, the product image 1812, the product price 1813, a link 1814 providing an option to purchase the product, a product review 1815 (e.g., comprising the number of stars indicating the level of product quality or rating purchasing experience and/or the number of reviews), a toggle button 1816 for expanding or collapsing a list 1817 of visually similar items (e.g., showing the name of each product on the list and its price), and a link 1818 that provides the option to browse through more items that are visually similar to the product. In addition, user interface 1830 may comprise options 1840 to filter visually similar items by one or more criteria, such as price range, location, availability, etc. User interface 1830 may also comprise a browsing area 1850, which enables browsing of items representing all of the objects (e.g., from database 540) that were matched to the object in the digital media asset (e.g., by feature matching module 328). The user may scroll through the list in browsing area 1850 using navigation buttons 1851 and 1852. Button 1851 is used to scroll the list left, and button 1852 is used to scroll the list right. However, it should be understood that other orientations (e.g., a vertical orientation in which one button scrolls up and another scrolls down) are possible. As illustrated, each item in the list in browsing area 1850 may comprise an image 1853 of the product corresponding to a different visually similar object, a short description 1854 of that product, and a price 1855 for that product.

Figure 19A:
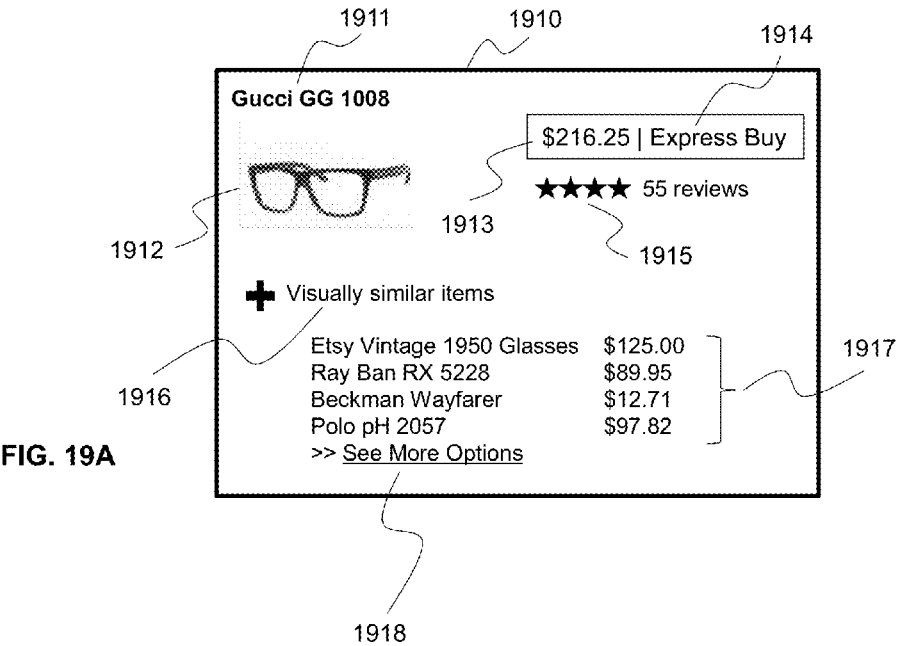
FIGS. 19A-19C illustrate various user interfaces related to interactivity with additional objects identified in digital media assets, according to embodiments.

FIG. 19A illustrates an example of a rendered hotspot comprising the result of a visual similarity search for glasses, according to an embodiment. The hotspot comprises a graphical overlay 1910 that is rendered on the original digital media asset (e.g., image or video). In the illustrated embodiment, graphical overlay 1910 comprises the product name 1911, an image 1912 of the product, the product price 1913, a link 1914 to facilitate the purchase of the product, a product review 1915 (e.g., represented by the number of stars, indicating a level of product quality or rating purchasing experience, and the number of reviews), a link 1916 to expand or collapse a list of items 1917 that are visually similar to the product (e.g., by name and/or price), and a link 1918 that provides the option to browse through more visually similar items than those in list 1917. It should be understood that at least a portion of the information 1911-1918 may be derived from database 540 (e.g., from metadata associated with the object corresponding to the product). In an embodiment, selecting link 1916 displays or hides the list of visually similar items 1917.

Figure 19B:
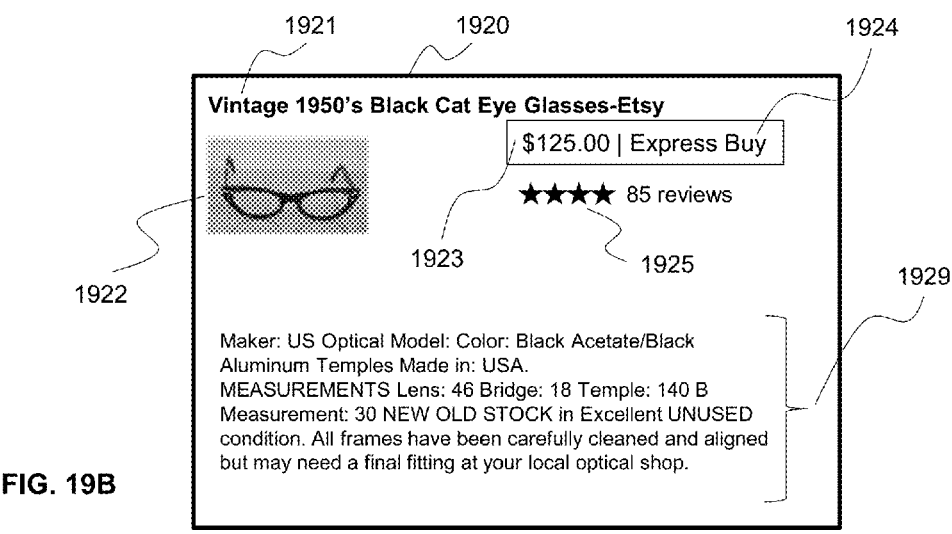

In an embodiment, selecting an item in the list of visually similar items 1917 in FIG. 19A may generate the screen shown in FIG. 19B. FIG. 19B illustrates an example user interface conveying a detailed description for one of the items selected from list 1917, according to an embodiment. In this case, the product "Etsy Vintage 1950's Black Cat Eye Glasses" has been selected from the list of items 1917 in FIG. 19A. The result is a new graphical overlay 1920 comprising product name 1921, an image of the selected product 1922, the product price 1923, a link 1924 to facilitate the purchase of the product, and a detailed product description 1929. Graphical overlay 1920 may be overlaid on the digital media asset on or in the vicinity of the visually similar object (e.g., in place of graphical overlay 1910).

Figure 19C:
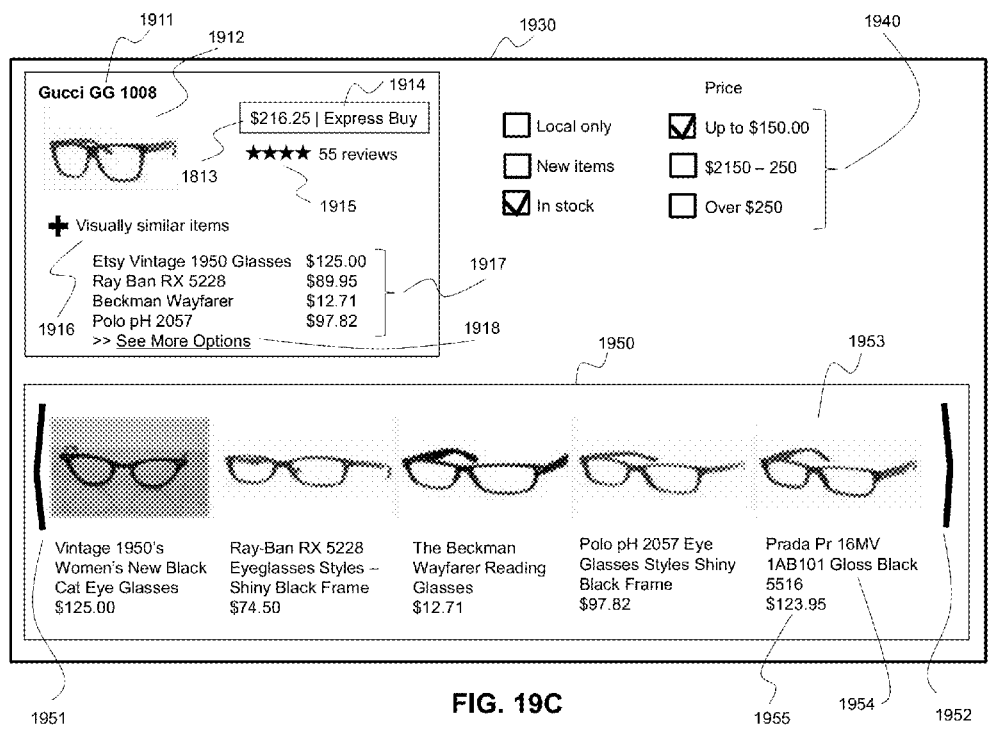

In an embodiment, selecting link 1918 in graphical overlay 1910 in FIG. 19A may generate the screen shown in FIG. 19C. FIG. 19C illustrates an example user interface 1930 conveying additional options available to a user, according to an embodiment. User interface 1930 may comprise a graphical overlay (e.g., in the vicinity of the object of interest in the image or video) on the digital media asset, may replace the digital media asset (e.g., within interactive application 210), or may be rendered separately from the digital media asset on the display (e.g., in a different tab of interactive application 210 or by a separate application initiated in response to selection of link 1918). In any case, user interface 1930 may comprise information related to the product in the digital media asset, such as the product name 1911, the product image 1912, the product price 1913, a link 1914 providing an option to purchase the product, a product review 1915 (e.g., comprising the number of stars indicating the level of product quality or rating purchasing experience and/or the number of reviews), a toggle button 1916 for expanding or collapsing a list 1917 of visually similar items (e.g., showing the name of each product on the list and its price), and a link 1918 that provides the option to browse through more items that are visually similar to the product. In addition, user interface 1930 may comprise options 1940 to filter visually similar items by one or more criteria, such as price range, location, availability, etc. User interface 1930 may also comprise a browsing area 1950, which enables browsing of items representing all of the objects (e.g., from database 540) that were matched to the object in the digital media asset (e.g., by feature matching module 328). The user may scroll through the list in browsing area 1950 using navigation buttons 1951 and 1952. Button 1951 is used to scroll the list left, and button 1952 is used to scroll the list right. However, it should be understood that other orientations (e.g., a vertical orientation in which one button scrolls up and another scrolls down) are possible. As illustrated, each item in the list in browsing area 1950 may comprise an image 1953 of the product corresponding to a different visually similar object, a short description 1954 of that product, and a price 1955 for that product.

13. Object Interactivity

An operation of content interactivity synthesizer 530 will now be described in more detail, according to an embodiment.

Figure 20:
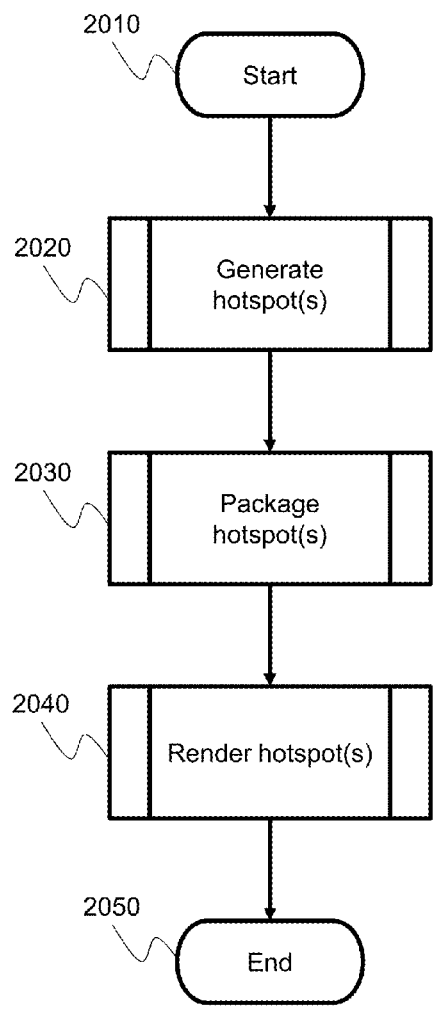
FIG. 20 is a flowchart illustrating a process for adding hotspot(s) to a digital media asset, according to an embodiment.

FIG. 20 depicts a process for adding hotspot(s) to a digital media asset, according to an embodiment. The process begins in step 2010 and ends in step 2050.

In step 2020, content interactivity synthesizer 530 generates one or more hotspots (e.g., via hotspot generator module 346 which may form a part of content interactivity synthesizer 530, which in turn may form a part of media analysis server 140). As discussed elsewhere herein, for a given digital media asset, content interactivity synthesizer 530 may generate a hotspot for each object detected in the digital media asset and matched to a list 520 of identified or visually similar object(s) that is received from result ranking and management module 338. For instance, result ranking and management module 338 may output a list 520 of identified or visually similar objects for each detected and matched object in the digital media asset. Thus, each list 520 represents the identified or visually similar objects that have been matched from database 540 for a single object detected in the digital media asset. It should be understood that each list 520 may represent all of the identified or visually similar objects that have been matched from database 540 at or above a predetermined confidence level (e.g., combined matching score), a predetermined number (e.g., the top 10) of the identified or visually similar objects that have been matched from database 540, etc. Content interactivity synthesizer 530 may receive the lists 520, and generate a hotspot for each list (i.e., for each object detected in the digital media asset).

In an embodiment, each hotspot for a digital media asset may comprise a position of the hotspot. For a digital media asset that is an image, this position represents the position within the image at which the hotspot is to be rendered. For a multi-frame digital media asset, this position represents the position, within a frame of the digital media asset, at which the hotspot is to be rendered.

In addition, each hotspot may further comprise an object or product identifier. The object identifier identifies an object (e.g., a product) that has been identified as the object corresponding to the hotspot. Specifically, as discussed above, an object may be detected within the digital media asset (e.g., by object localization server 360), and identified as one of the objects enrolled in database 540 (e.g., by object identification server 370). Accordingly, the object identifier may identify this object (e.g., from database 540), thereby associating the hotspot with a particular, enrolled object (e.g., from database 540). It should be understood that, when the object detected in the digital media asset is a product, the object identifier would identify this product (e.g., from database 540).

In addition, if the hotspot generated in step 2020 is for a multi-frame digital media asset (e.g., a video), the hotspot may further comprise a frame identifier that identifies the frame within the multi-frame digital media asset over which the hotspot is to be rendered.

In step 2030, content interactivity synthesizer 530 packages each of the one or more hotspots generated in step 2020 into a hotspot package (e.g., via hotspot packaging module 348). In an embodiment, each hotspot package comprises a graphical user interface comprising information about the identified object and/or visually similar objects. If the identified object is a product, the graphical user interface may comprise information about that product and/or information about related products. For example, if the identified object corresponding to the hotspot package is a shirt, the graphical user interface of the hotspot package may comprise information about the shirt and/or visually similar shirts, as well as inputs for facilitating the purchase of the shirt. Example of rendered hotspot packages are depicted in, and discussed with respect to, FIGS. 4A-4F.

In step 2040, content interactivity synthesizer 530 renders each hotspot and hotspot package generated in step 2030 with respect to the digital media asset (e.g., via hotspot rendering module 350). In an embodiment, rendering each hotspot comprises embedding a hotspot indicator as a visual overlay of the digital media asset, at or near the position identified in the hotspot and corresponding to the identified object associated with the hotspot. The visual overlay for the hotspot may comprise a small or unobtrusive circular mark. In an embodiment, rendering each hotspot package comprises embedding the hotspot package as a visual overlay of the digital media asset, to be displayed at or near the position identified in the hotspot and corresponding to the identified object associated with the hotspot package.

Thus, the digital media asset may comprise a visual overlay of a hotspot for each object identified or matched (e.g., by media analysis server 140). Each hotspot may be selectable, such that selecting a hotspot will result in the visibility or invisibility of a hotspot package corresponding to the hotspot. The hotspot may be capable of being toggled to render the hotspot package visible in response to one selection of the hotspot, and render the hotspot invisible in response to a consecutive selection of the hotspot. In this manner, a user of the digital media asset can open hotspot packages for objects for which he or she desires information (e.g., product information about the object or visually similar objects), and close hotspot packages for objects for which he or she does not desire information. An example of a digital media asset with one such hotspot package visible is depicted in FIGS. 4D and 4E, whereas an example of a digital media asset with two such hotspot packages visible is depicted in FIG. 4F.

In addition, a navigation hotspot may be generated and rendered in steps 2020-2040 to allow a user to navigate between all hotspot packages embedded in a digital media asset. An example of a navigation hotspot is illustrated as 415B in FIGS. 4B-4F. As illustrated, the navigation hotspot comprises a search box 420, a snapshot 425 of hotspots, and a hotspot gallery 430. A user may type keywords into search box 420 and the hotspot packages embedded in the image or frame being displayed may be searched to identify hotspot packages comprising or associated (e.g., within metadata) with the keywords. The search results may be displayed as snapshot 425. When no search is performed via search box 420, snapshot 425 may comprise all hotspot packages embedded in the image or frame being displayed. In addition, hotspot gallery 430 may comprise selectable thumbnails of the object associated with each hotspot. Hotspot gallery 430 may be scrollable when the number of thumbnails exceeds the number that can be displayed within the boundaries of navigation hotspot 415B. Selection of a particular thumbnail within hotspot gallery 430 may result in the hotspot package for the selected hotspot being toggled to visible or invisible, similar to selection of the hotspot (e.g., hotspots 435A-435B) directly. The navigation hotspot may be capable of being toggled from visible to invisible, and vice versa, using, for example, tab 415A illustrated in FIG. 4A. It should be understood that, in multi-frame digital media assets, this navigation hotspot may or may not be rendered in frames in which no objects were detected or identified, depending on the particular implementation.

Figure 21:
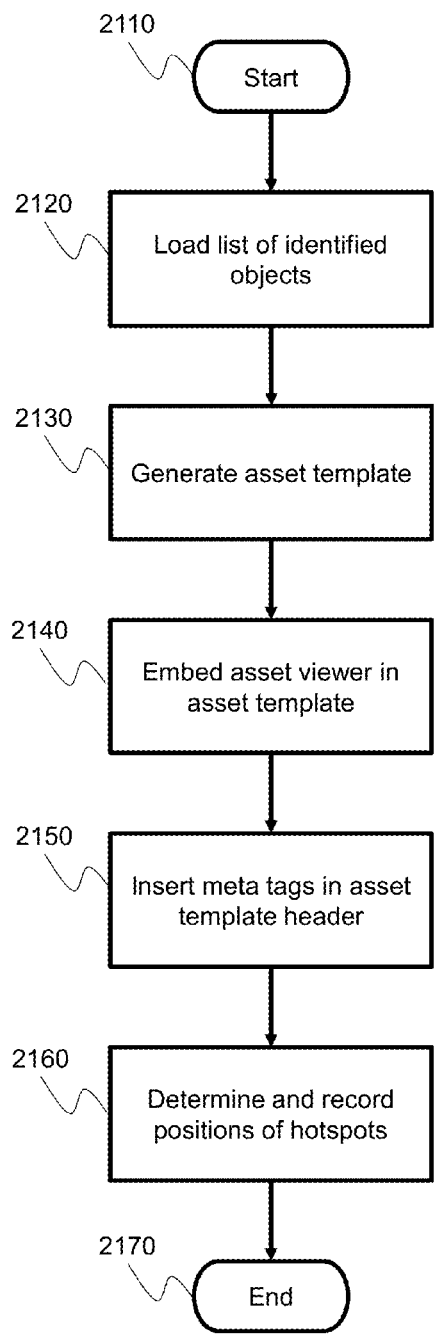
FIG. 21 is a flowchart illustrating a process for generating interactive content, according to an embodiment.

FIG. 21 depicts a flowchart for generating interactive content, according to an embodiment. This process may be performed, for example, by content interactivity synthesizer 530. The process starts in step 2110 and ends in step 2170.

In step 2120, a list (e.g., list 520) of identified objects from a given digital media asset (e.g., image or video) is loaded or otherwise received. For example, the list may be received from result ranking and management module 338. This list comprises data representations of each of the objects that were detected in the digital media asset (e.g., by object localization server 360) and identified as or matched to enrolled objects (e.g., by object identification server 370).

In step 2130, an asset template is generated from the original content of the digital media asset. This template may be generated in a markup language, such as Hypertext Markup Language (HTML), eXtensible Markup Language (XML), eXtensible Hypertext Markup Language (XHTML), etc. The template serves as a container for the original content of the digital media asset and the functionalities to be added for interacting with objects within the content of the digital media asset.

In step 2140, an asset viewer (e.g., image viewer, video player, etc.) is embedded in the asset template. The asset viewer is configured to render the visual overlays of the hotspot and hotspot package on the original content of the digital media asset. In an embodiment, the asset viewer is embedded in the asset template using a lightweight scripting language that allows a script to interact with the user or control the content of a browser (e.g., Javascript).

In step 2150, metatag(s) for the interactive content are generated and inserted into the header of the asset template generated in step 2130. In an embodiment, the metatag(s) comprise one or more keywords and/or a description of the content. The metatag(s) may be automatically generated and/or manually input, and may be available for content management (e.g., searching).

In step 2160, the position for each hotspot and/or hotspot package is calculated based on the positions of the identified objects from the list received in step 2120. In an embodiment, the list of identified objects received in step 2120 comprises the position of each of the identified objects in the original content and/or the bounding box enclosing each of the identified objects in the original content. The position of the hotspot and/or hotspot package corresponding to each of these identified objects is determined and recorded in the asset template based on its respective position and/or bounding box. For example, the position of each hotspot and/or hotspot package may be calculated as the center of mass of the bounding rectangle enclosing the identified object corresponding to the hotspot and/or hotspot package.

Figure 22:
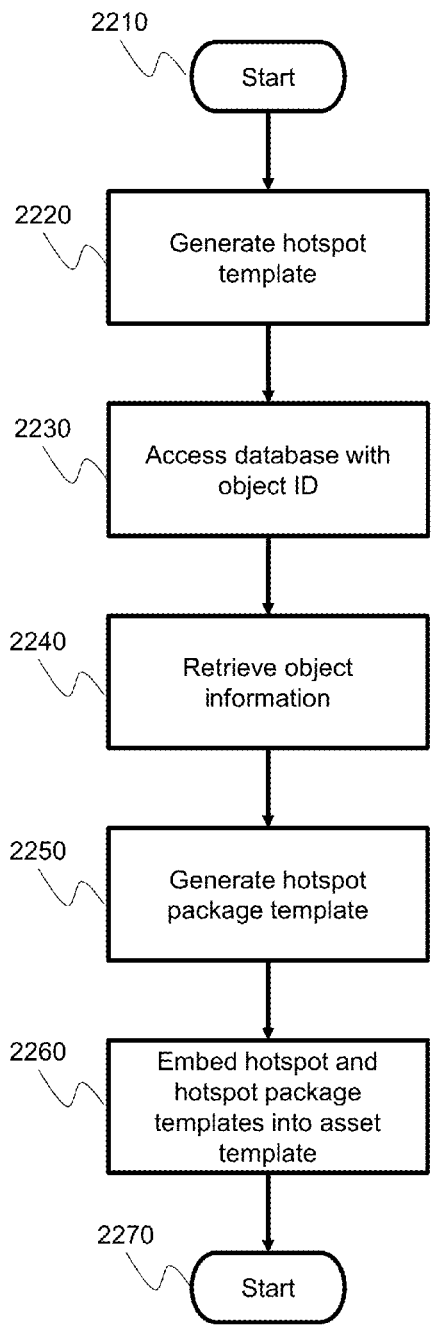
FIG. 22 is a flowchart illustrating a process for embedding interactive hotspots, according to an embodiment.

FIG. 22 depicts a flowchart for embedding interactive hotspots within the asset template generated in the process depicted in FIG. 21, according to an embodiment. This process may be performed, for example, by content interactivity synthesizer 530. The process starts in step 2210 and ends in step 2270.

In step 2220, a hotspot template is generated for the previously determined hotspots. The hotspot template may be generated based on hotspots generated (e.g., by hotspot generator module 346, implementing the process depicted in step 2020 of FIG. 20) from information in the list of identified objects and/or visually similar objects (e.g., list 520) received in step 2120 (e.g., from result ranking and management module 338). As with the asset template, each hotspot template may be generated in a markup language, such as HTML, XML, XHTML, etc. It should be understood that the hotspot template generated in step 2220 may comprise a single hotspot template for all of the hotspots, or separate hotspot templates for each individual hotspot. In either case, the hotspot template(s) may be stored in a content database (e.g., on content server 130) in association with the asset template generated in the process depicted in FIG. 21.

In step 2230, a database (e.g., database 540) of object information is accessed based on an object identifier of each identified or matched visually similar object in the list (e.g., list 520) received in step 2120 in FIG. 21. Specifically, the list of identified objects may comprise a unique object identifier for each identified or matched object.

In step 2240, for each object in the list (e.g., list 520), this object identifier may be used to retrieve object information, associated with the object identifier, from the database. In embodiments in which the identified or matched objects in the list are products, the retrieved object information for each object may comprise product information, such as product image(s), a product title, a product description, a product price, information to facilitate purchasing the product, and the like.

In step 2250, a hotspot package template is generated for the previously generated hotspot packages. The hotspot package template may be generated based on hotspot packages generated (e.g., by hotspot packaging module 348, implementing the process depicted in step 2030 of FIG. 20) from information in the list of identified objects and/or visually similar objects (e.g., list 520) received in step 2120 (e.g., from result ranking and management module 338). For instance, the hotspot packages may be generated from an aggregate set of information retrieved from a database (e.g., database 540) for a given identified object. As with the asset template and the hotspot template, each hotspot package template may be generated in a markup language, such as HTML, XML, XHTML, etc. It should be understood that the hotspot package template generated in step 2250 may comprise a single hotspot package template for all of the hotspot packages, or separate hotspot package templates for each individual hotspot package. In either case, the hotspot package template(s) may be stored in a content database (e.g., on content server 130) in association with the asset template generated in the process depicted in FIG. 21. In addition or alternatively, each hotspot package template may be linked to or otherwise associated with its corresponding hotspot.

In step 2260, the hotspot template(s) generated in step 2220 and the hotspot package template(s) generated in step 2250 are embedded into the asset template (e.g., as generated according to the process depicted in FIG. 21). Accordingly, all of the hotspot and hotspot package templates, generated for a given image or video frame, are embedded into the asset template. It should be understood that in embodiments in which the asset, hotspot, and hotspot package templates are implemented in a markup language (e.g., HTML, XML, XHTML, etc.), embedding the hotspot template(s) and hotspot package template(s) may comprise nesting the markup language representing the hotspot template(s) and hotspot package template(s) into the markup language representing the asset template. In such embodiment, the components of the hotspots (e.g., position, object identifier, and/or other attributes or parameters) and hotspot packages (e.g., image(s), title, description, price, and/or other attributes or parameters) may be embedded as attributes or tags in the markup language representing the respective hotspots and hotspot packages.

Figure 23:
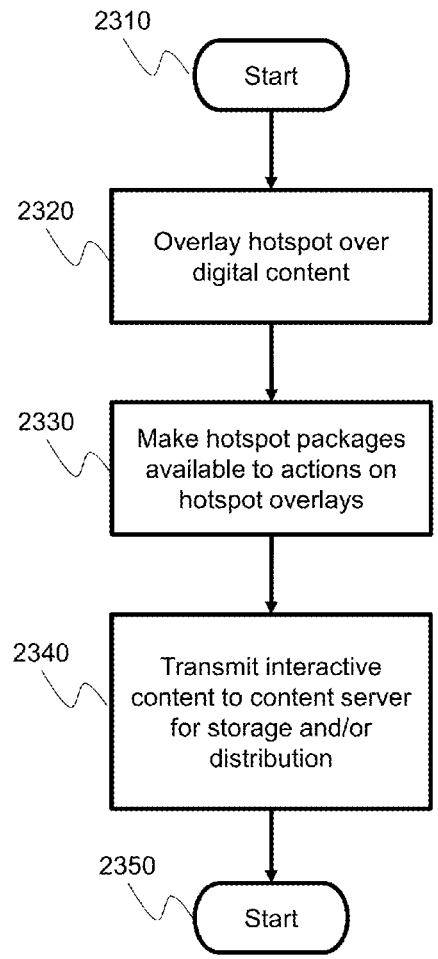
FIG. 23 is a flowchart illustrating a process for rendering hotspots and hotspot packages, according to an embodiment.

FIG. 23 depicts a flowchart for rendering hotspots and hotspot packages, according to an embodiment. This process may be performed, for example, by content interactivity synthesizer 530 (e.g., by hotspot rendering module 350) and correspond to step 2040 in FIG. 20. The process starts in step 2310 and ends in step 2350.

In step 2320, each hotspot (e.g., as generated in step 2020 in FIG. 20, and/or represented by a hotspot template generated in step 2220 in FIG. 22) is overlaid over the content of the digital media asset (e.g., image or video). As discussed above, the hotspot may comprise a position (e.g., x-y offsets or coordinates) within the digital asset corresponding to a position of the detected object to which it corresponds. Thus, the visual representation of the hotspot (e.g., a circular, square, triangular, or other-shaped visual overlay) may be overlaid at or near that position. In instances in which the digital media asset comprises multiple frames, the hotspot may comprise a frame identifier in addition to a position, and the visual representation of the hotspot may be overlaid at or near that position within the identified frame of the digital media asset.

In step 2330, each hotspot package is made available for responding to actions performed on the visual representation of its associated hotspot. This process may involve nesting additional scripts in the markup language, representing the hotspot package template(s), into the markup language, representing the asset template, to enable rendering of the hotspot package(s) once invoked by the rendered hotspot(s). For instance, a user operation (e.g., a touch or click) on the hotspot may toggle the visibility of the hotspot package as a visual overlay on the content of the digital media asset.

In step 2340, the interactive content, comprising the original content of the digital media asset, the overlaid hotspots, and the available hotspot packages, is transmitted to a content server (e.g., content server 130) for storage and/or distribution (e.g., to one or more network devices 120).

Figure 24:
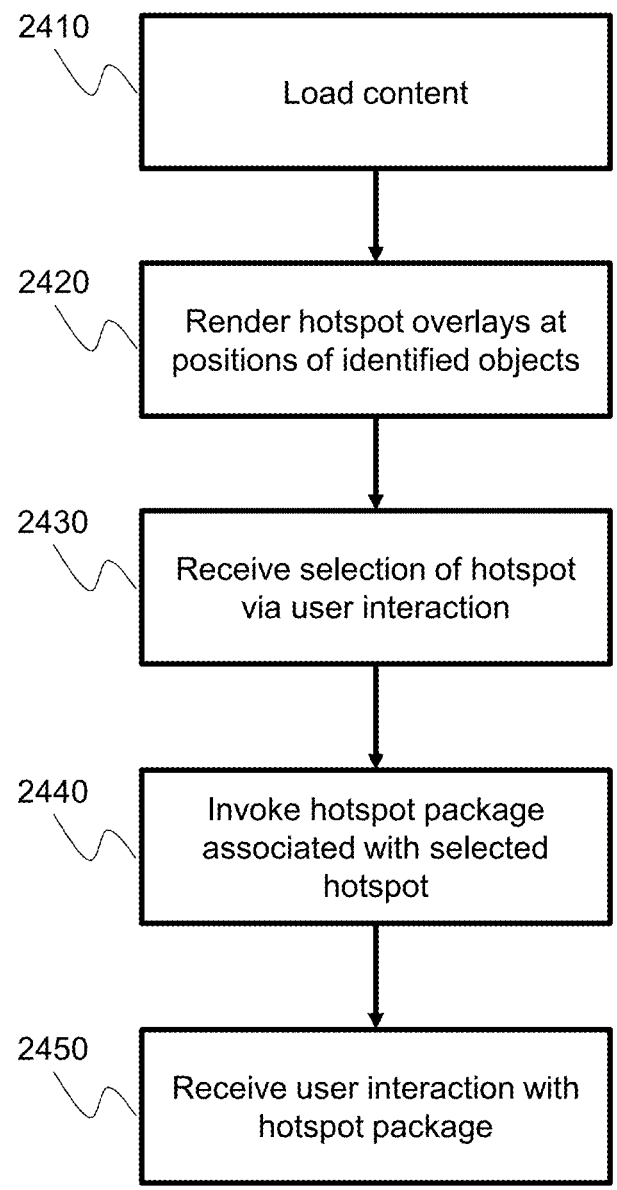
FIG. 24 is a flowchart illustrating a process for providing interactive content, according to an embodiment.

FIG. 24 depicts a flowchart for providing interactive content, according to an embodiment. This process may be performed, for example, by interactive application 210 (e.g., executing on network device 120).

In step 2410, the content of the digital media asset is loaded for viewing or playback. This content may comprise the asset template, with the embedded hotspot(s) and hotspot package (s), generated by the processes depicted in FIGS. 20-22. The original content of the digital media asset may be rendered on a display (e.g., of network device 120).

In step 2420, for each hotspot (e.g., for each hotspot template), a visual overlay (e.g., a circular object) is rendered on the displayed original content at the position indicated by the hotspot. For example, the hotspot may be rendered according to its respective hotspot template embedded within the asset template. If the digital media asset comprises a plurality of frames (e.g., a video), the hotspot is rendered on the displayed content at the position indicated by the hotspot within the particular frame indicated by the hotspot. It should be understood that the position of the hotspot on the display content may be at or in a vicinity of an identified or matched object, to which the hotspot corresponds, within the content. For example, the position of the hotspot may be determined or calculated based on the position of the corresponding object within the displayed content (e.g., at the position or at an offset from the position).

In step 2430, a selection of a visual overlay rendered for one of the hotspots is received. This selection may be performed by a user, for example, touching (e.g., if the display of network device 120 comprises a touch panel) or clicking (e.g., if network device 120 comprises a pointing input device) the position at which the visual overlay for the hotspot is rendered.

In step 2440, in response to the selection of the visual overlay for the hotspot, a hotspot package associated with the hotspot is invoked. Invocation of the hotspot package may comprise rendering a visual overlay of the hotspot package over the displayed content at a position indicated by the hotspot package or at or near the position of the associated hotspot. For example, the hotspot package may be rendered according to its respective hotspot package template embedded within the asset template. Again, it should be understood that the position of the hotspot package on the displayed content may be at or in a vicinity of an identified or matched object, to which the hotspot package corresponds, within the content, or at or in a vicinity of the associated hotspot. For example, the position of the hotspot package may be determined or calculated based on the position of the corresponding object within the displayed content (e.g., at the position or at an offset from the position) or based on the position of the associated hotspot (e.g., at the position or at an offset from the position).

In step 2450, user interaction(s) with the visual overlay of the hotspot package may be received. In an embodiment, the visual overlay of the hotspot package may be displayed as a frame, mini-webpage, or other user interface (e.g., generated in HTML), including one or more inputs (e.g., hyperlinks, buttons, checkboxes, radio buttons, text boxes, etc.), overlaid on the displayed content. The user interaction(s) may comprise one or more interactions with inputs within the user interface of the visual overlay, such as the selection of buttons, icons, and/or links (e.g., hyperlinks to additional information about the identified object or visually similar objects), scrolling, toggling, text entry, etc. The user interaction(s) may enable the user to access object (e.g., product) descriptions, prices, reviews, browse visually similar objects (e.g., products), initiate and/or consummate a purchase of the object (e.g., product), etc.

14. Applications to Media Asset Identification in Brand Portals

In an embodiment, an interactive video advertising platform—interfaced with, integral to, or comprising media analysis server 140 depicted in FIG. 6, according to an embodiment—is provided for an entity (e.g., a company which sells branded products) to register its entire collection of brand(s), or a portion of its brand collection, onto a portal site. Media analysis server 140 may then automatically detect and identify objects in pointed digital media assets based on personalized identification information provided by the entity.

Access to the dedicated interactive video advertising platform (e.g., server) may be granted through registration by a user, representing the entity, providing personalized identification information (e.g., e-mail address, URL of the brand corporate website, a list of URLs for online shops where the brand products are distributed to consumers, etc.). Uploading this information may invoke a query to database management system module 344 to retrieve products, and/or corporate-created and/or consumer-created digital media assets (e.g., images and video) that correspond to the brand. In an embodiment, this interactive content is readily available from a content repository (e.g., content repository 550) through content server 130.

It is possible that an entity would not have all of its commercial branded products available on the content repository. Thus, an option may be provided to the user, representing the entity, to upload more digital media assets (e.g., images and/or videos) that represent the branded product(s). The addition of digital media assets to the content repository may trigger a batch processing of digital media assets, as illustrated in FIG. 6, according to an embodiment. Through this process, commercial objects may be detected and identified in all uploaded digital media assets, resulting in the generation of interactive content (e.g., interactive content 510) from the supplied original content of the uploaded digital media assets. This generated interactive content may then be stored on the content repository (e.g., content repository 550) and accessible to content server 130 via database management system module 344.

In an embodiment, the interactive video advertising platform identifies the entity's or brand's social media accounts, followed by the publication of the generated and previously-retrieved digital media assets (e.g., image or videos representing the brands and/or products) to the identified social media accounts.

In an embodiment, this brand registration service is a paid service, and options may be provided for receiving payment from the registering entities (e.g., via credit cards, debit cards, checking accounts, etc.). Upon completion of the transaction for the brand registration service, an entity may launch a campaign, for example, by a click of a button at the last stage of the brand registration process on the interactive video advertising platform.

15. Extensible Object Recognition Architecture

In an embodiment, the modules of object identification server 370 are extensible to facilitate processing of digital media assets from specialized domains, such as geographical information systems (GIS), biometrics (e.g., biometric characteristics from DNA, ear, face, facial thermogram, hand thermogram, hand vein, fingerprint, gait, hand geometry, iris, palm print, retina, etc.), education, gaming, entertainment, medical imaging, defense, homeland security, and/or others. For example, media analysis server 140 may comprise modules for extending one or more of its basic components via a set of common interfaces. These common interfaces may include a feature extraction interface, a recognition interface, a data fusion interface, an object tracking interface, a scene change detection interface, a digital media interface, and an import/export interface.

Figure 25:
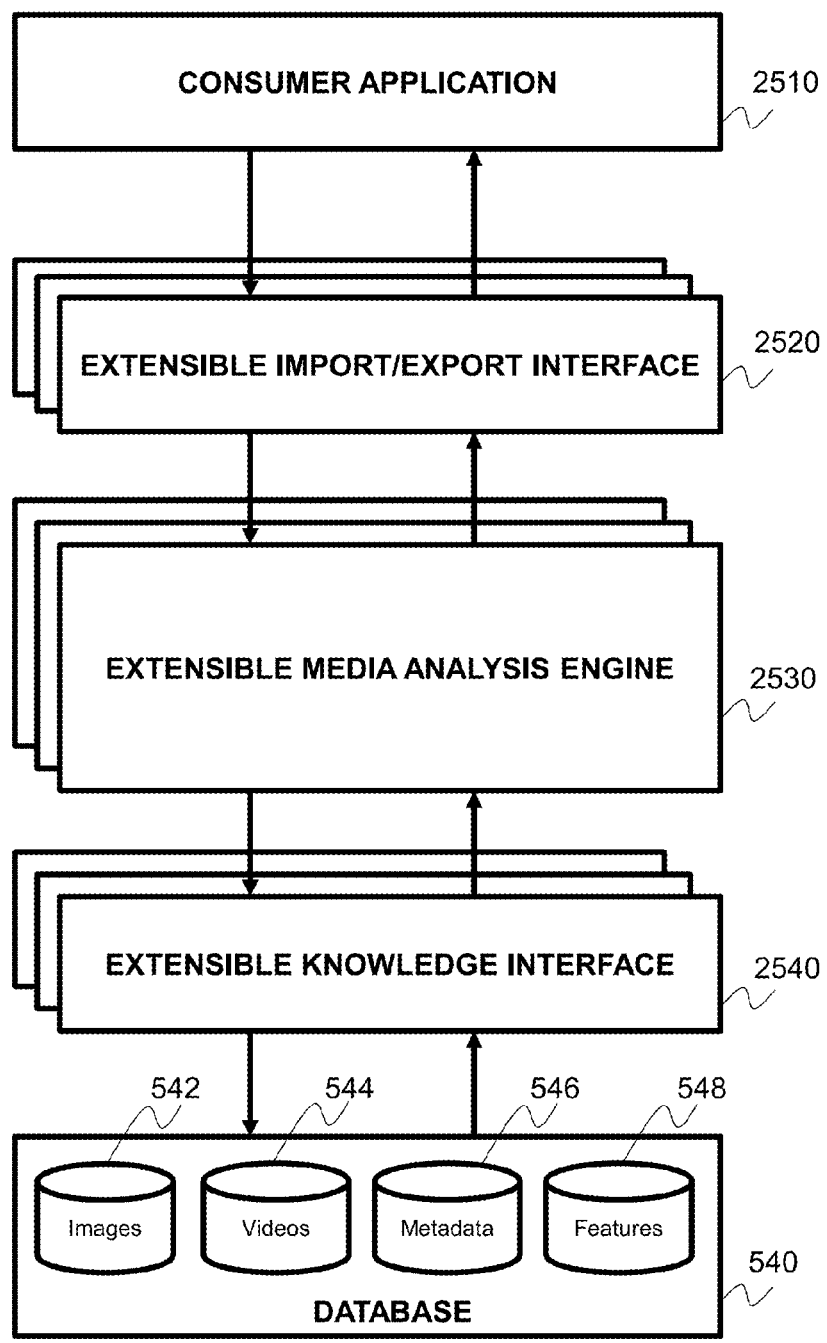
FIG. 25 is a block diagram illustrating an extensible media analysis engine, according to an embodiment.

FIG. 25 illustrates an extensible media analysis engine of media analysis server 140, according to an embodiment. In an embodiment, media analysis engine 2530 provides two interfaces. The first interface is extensible import/export interface 2520, which is used by consumer application 2510 to communicate with media analysis engine 2530. The second interface is extensible knowledge interface 2540, which allows media analysis engine 2530 to communicate with database 540 to retrieve images 542, videos 544, metadata 546 for objects stored in database 540, and/or reference features 548 for object matching.

Figure 26:
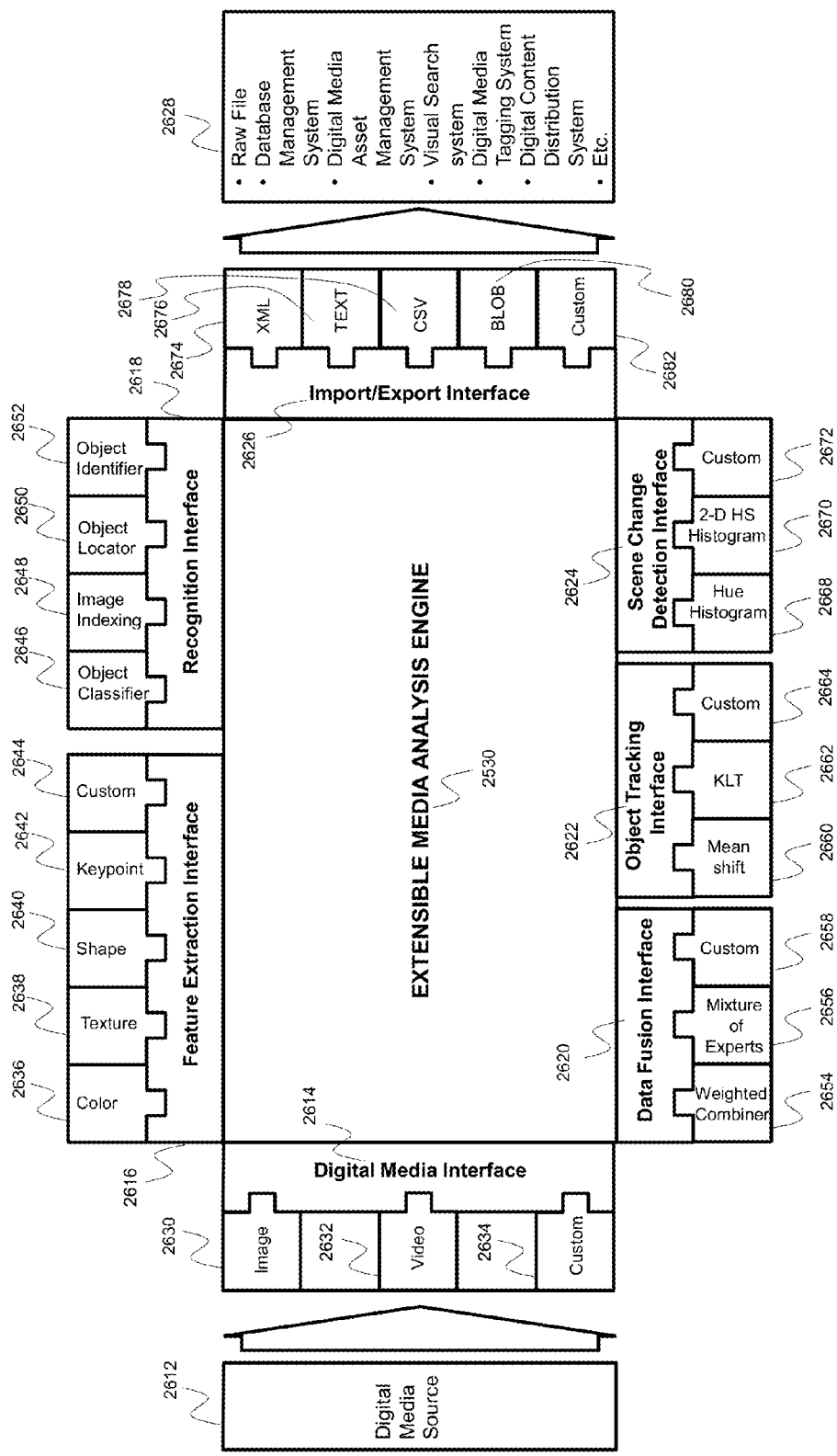
FIG. 26 is a block diagram illustrating components of an extensible media analysis engine, according to an embodiment.

FIG. 26 depicts the architecture of media analysis engine 2530, according to an embodiment. As illustrated extensible media analysis engine 2530 comprises a digital media interface 2614, a feature extraction interface 2616, a recognition interface 2618, a data fusion interface 2620, an object tracking interface 2622, a scene change detection interface 2624, and/or an import/export interface 2626.

In an embodiment, digital media interface 2614 enables extensible media analysis engine 2530 to receive digital media assets from digital media source(s) 2612. In an embodiment, digital media interface 2614 may comprise a separate interface for each type of digital media asset, including an interface 2630 for images, an interface 2632 for videos, and an interface 2634 for custom digital media asset types.

Digital media assets can be represented by different visual characteristics. Feature extraction interface 2616 supports basic visual characteristics through pluggable dedicated modules, such as module 2636 for color, module 2638 for texture, module 2640 for shape, and module 2642 for keypoints. These modules may correspond to color feature extraction module 1310, texture feature extraction module 1320, shape feature extraction module 1330, and keypoint feature extraction module 1340, respectively, in FIG. 13. Collectively, the modules may form at least a portion of feature extraction module 326. In an embodiment, extensibility may be provided by an application programming interface (API) that makes it possible to create new types of features (e.g., by adding new modules) or programmatically extend existing features (e.g., for existing modules) through, for example, object-oriented programming.

In an embodiment, recognition interface 2618 comprises pluggable modules that define how feature matching is performed (e.g., by feature matching module 328). These pluggable modules may include, without limitation, an object classifier module 2646 that defines how the category of a given object is determined, an image indexing module 2648 that defines how features are matched in a high-dimensional feature space, an object locator module 2650 that defines how objects are detected in images, and/or an object identifier module 2652 that defines how a given object is matched to a reference object in a database (e.g., database 540) of enrolled object models using image indexing module 2648.

In an embodiment, data fusion interface 2620 comprises pluggable modules that define how feature-specific confidence values and weights are combined (e.g., by data fusion module 330). As discussed elsewhere herein, object identifier module 2652, which may form a part of feature matching module 328, returns a weight and a confidence level for each matching feature. Data fusion interface 2620 allows different algorithms for fusing these weights and confidence levels to be integrated into extensible media analysis engine 2530. For instance, weight combiner module 2654 may define how the confidence levels are combined, using the weights (e.g., a weighted linear combination of the confidence level values), to derive a combined matching score for a given detected object and reference object. Mixture of experts module 2656 may define a meta classifier that provides the weights that are used for the fusion of different scores (e.g., the confidence values). In addition, a custom module 2658 may be provided for a custom scheme for combining confidence level values and/or using weights.

In an embodiment, object tracking interface 2622 enables different object-tracking algorithms to be interfaced with extensible media analysis engine 2530 (e.g., to be utilized by object tracking module 316). For example, module 2660 may define the mean-shift algorithm for object tracking, and module 2662 may define the Kanada-Lucas-Tomasi (KLT) tracker algorithm. In addition, a custom module 2664 may define a custom object-tracking algorithm.

In an embodiment, scene change detection interface 2624 enables different scene-change-detection algorithms to be interfaced with extensible media analysis engine 2530 (e.g., to be utilized by scene change detection module 318). As discussed elsewhere herein, scene change detection is used to trigger the object matching process to improve efficiency. As an example, module 2668 may define a scene-change-detection algorithm based on a hue histogram, and module 2670 may define a scene-change-detection algorithm based on a two-dimensional hue/saturation histogram. In addition, a custom module 2672 may define a custom scene-change-detection algorithm.

In an embodiment, extensible media analysis engine 2530 communicates with external systems via import/export interface 2626. Import/export interface 2626 may enable input and output through several different formats, including, without limitation, XML files 2674, text files 2676, comma separated value (CSV) files 2678, binary large objects (BLOBs) 2680, and/or custom file types 2682, for example, for interfacing with a database (e.g., Oracle™ Sybase™, Microsoft SQL Server™, IBM DB2™, etc.). Import/export interface 2626 may enable extensible media analysis engine 2530 to be used alongside a wide variety of applications, including, without limitation, raw files, database management systems, digital media asset management systems, visual search systems, digital media asset tagging systems, digital content distribution systems, etc.

The described architecture of extensible media analysis engine 2530 and the underlying processes, in an embodiment, provide a set of interchangeable, extensible, and autonomous modules and algorithms that operate independently or collaboratively to produce results in the analysis process (e.g., performed by media analysis server 140).

In an embodiment, extensible media analysis engine 2530 provides functionalities for application developers in specialized domains to incorporate their own domain-specific modules (e.g., feature extraction module 2644, object classifier module 2646, image indexing module 2648, object locator module 2650, object identifier module 2652, etc.) into extensible media analysis engine 2530, thereby customizing extensible media analysis engine 2530 (e.g., implemented by media analysis server 140) for the specialized domain. For example, if the specialized domain involves fingerprint matching, an application developer may plug module(s) designed to extract fingerprint features into feature extraction interface 2616 (e.g., as custom module 2644), and plug module(s) designed to match extracted fingerprint features to reference features into recognition interface 2618 (e.g., as object identifier module 2652). Alternatively, the application developer may program existing modules to do the required fingerprint extraction and matching via an API of extensible media analysis engine 2530.

In an embodiment, one or more (including optionally all) interfaces of extensible media analysis engine 2530 may be defined through an API, using, for example, object-oriented programming techniques support by object-oriented programming languages (e.g., C++, Java, etc.). Extensibility may be achieved by deriving classes from an interface class for the module to be extended. For example, to add functionalities for a new set of features to be used for feature extraction (e.g., by feature extraction module 326) in a specialized domain, a new feature extraction class may be derived from the interface class for feature extraction, and the basic and specific definitions and processing methods of this domain-specific feature extraction module may be expanded using the same interface as the existing feature extraction modules (e.g., modules 1310-1340 in FIG. 13).

Extensible media analysis engine 2530, with its API and associated static libraries and dynamically-linked libraries (DLLs), may provide application developers with a wide range of possibilities for developing applications directed to different domains.

16. Example Processing Device

Figure 27:
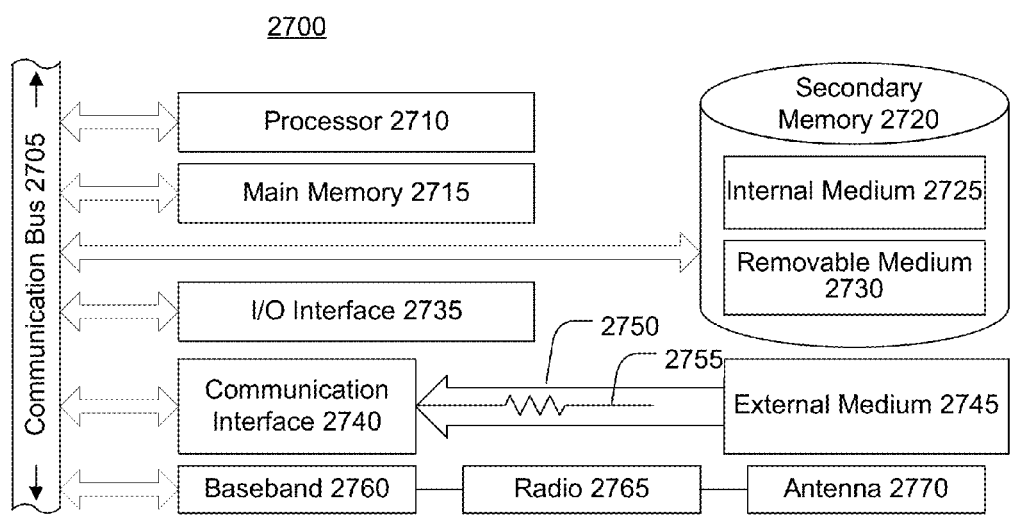
FIG. 27 illustrates a processing system on which one or more of the modules described herein may be executed, according to an embodiment.

FIG. 27 is a block diagram illustrating an example wired or wireless system 2700 that may be used in connection with various embodiments described herein. For example the system 2700 may be used as or in conjunction with network device 120, content server 130, and/or media analysis server 140 to execute one or more of the modules described herein. The system 2700 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 2700 preferably includes one or more processors, such as processor 2710. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, a graphics processor or a coprocessor. Such auxiliary processors may be discrete processors or may be integrated with the processor 2710.

The processor 2710 is preferably connected to a communication bus 2705. The communication bus 3055 may include a data channel for facilitating information transfer between storage and other peripheral components of the system 2700. The communication bus 2705 further may provide a set of signals used for communication with the processor 2710, including a data bus, address bus, and control bus (not shown). The communication bus 2705 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 2700 preferably includes a main memory 2715 and may also include a secondary memory 2720. The main memory 2715 provides storage of instructions and data for programs executing on the processor 2710. The main memory 2715 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 2720 may optionally include an internal memory 2725 and/or a removable medium 2730, for example a floppy disk drive, a magnetic tape drive, a compact disc ("CD") drive, a digital versatile disc ("DVD") drive, etc. The removable medium 2730 is read from and/or written to in a well-known manner. Removable storage medium 2730 may be, for example, a floppy disk, magnetic tape, CD, DVD, SD card, etc.

The removable storage medium 2730 is a non-transitory computer readable medium having stored thereon computer executable code (i.e., software) and/or data. The computer software or data stored on the removable storage medium 2730 is read into the system 2700 for execution by the processor 2710.

In alternative embodiments, secondary memory 2720 may include other similar means for allowing computer programs or other data or instructions to be loaded into the system 2700. Such means may include, for example, an external storage medium 2745 and an interface 2740. Examples of external storage medium 2745 may include an external hard disk drive or an external optical drive, or and external magneto-optical drive.

Other examples of secondary memory 2720 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 2730 and communication interface 2740, which allow software and data to be transferred from an external medium 2745 to the system 2700.

System 2700 may also include an input/output ("I/O") interface 2735. The I/O interface 2735 facilitates input from and output to external devices. For example the I/O interface 2735 may receive input from a keyboard or mouse and may provide output to a display. The I/O interface 2735 is capable of facilitating input from and output to various alternative types of human interface and machine interface devices alike.

System 2700 may also include a communication interface 2740. The communication interface 2740 allows software and data to be transferred between system 2700 and external devices (e.g. printers), networks, or information sources. For example, computer software or executable code may be transferred to system 2700 from a network server via communication interface 2740. Examples of communication interface 2740 include a modem, a network interface card ("NIC"), a wireless data card, a communications port, a PCMCIA slot and card, an infrared interface, and an IEEE 1394 fire-wire, just to name a few.

Communication interface 2740 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 2740 are generally in the form of electrical communication signals 2755. These signals 2755 are preferably provided to communication interface 2740 via a communication channel 2750. In one embodiment, the communication channel 2750 may be a wired or wireless network, or any variety of other communication links. Communication channel 2750 carries signals 2755 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 2715 and/or the secondary memory 2720. Computer programs can also be received via communication interface 2740 and stored in the main memory 2715 and/or the secondary memory 2720. Such computer programs, when executed, enable the system 2700 to perform the various functions of the present application as previously described.

In this description, the term "computer readable medium" is used to refer to any non-transitory computer readable storage media used to provide computer executable code (e.g., software and computer programs) to the system 2700. Examples of these media include main memory 2715, secondary memory 2720 (including internal memory 2725, removable medium 2730, and external storage medium 2745), and any peripheral device communicatively coupled with communication interface 2740 (including a network information server or other network device). These non-transitory computer readable mediums are means for providing executable code, programming instructions, and software to the system 2700.

In an embodiment that is implemented using software, the software may be stored on a computer readable medium and loaded into the system 2700 by way of removable medium 2730, I/O interface 2735, or communication interface 2740. In such an embodiment, the software is loaded into the system 2700 in the form of electrical communication signals 2755. The software, when executed by the processor 2710, preferably causes the processor 2710 to perform the inventive features and functions previously described herein.

The system 2700 also includes optional wireless communication components that facilitate wireless communication over a voice and over a data network. The wireless communication components comprise an antenna system 2770, a radio system 2765 and a baseband system 2760. In the system 2700, radio frequency ("RF") signals are transmitted and received over the air by the antenna system 2770 under the management of the radio system 2765.

In one embodiment, the antenna system 2770 may comprise one or more antennae and one or more multiplexors (not shown) that perform a switching function to provide the antenna system 2770 with transmit and receive signal paths. In the receive path, received RF signals can be coupled from a multiplexor to a low noise amplifier (not shown) that amplifies the received RF signal and sends the amplified signal to the radio system 2765.

In alternative embodiments, the radio system 2765 may comprise one or more radios that are configured to communicate over various frequencies. In one embodiment, the radio system 2765 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 2765 to the baseband system 2760.

If the received signal contains audio information, then baseband system 2760 decodes the signal and converts it to an analog signal. Then the signal is amplified and sent to a speaker. The baseband system 2760 also receives analog audio signals from a microphone. These analog audio signals are converted to digital signals and encoded by the baseband system 2760. The baseband system 2760 also codes the digital signals for transmission and generates a baseband transmit audio signal that is routed to the modulator portion of the radio system 2765. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 2770 where the signal is switched to the antenna port for transmission.

The baseband system 2760 is also communicatively coupled with the processor 2710. The central processing unit 2710 has access to data storage areas 2715 and 2720. The central processing unit 2710 is preferably configured to execute instructions (i.e., computer programs or software) that can be stored in the memory 2715 or the secondary memory 2720. Computer programs can also be received from the baseband processor 2770 and stored in the data storage area 2715 or in secondary memory 2720, or executed upon receipt. Such computer programs, when executed, enable the system 2700 to perform the various functions of the present application as previously described. For example, data storage areas 2715 may include various software modules (not shown) that are executable by processor 2710.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the application. In addition, the grouping of functions within a module, block, circuit or step is for ease of description. Specific functions or steps can be moved from one module, block or circuit to another without departing from the application.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the application. Various modifications to these embodiments will be readily apparent to those skilled in the art, and the generic principles described herein can be applied to other embodiments without departing from the spirit or scope of the application. Thus, it is to be understood that the description and drawings presented herein represent a presently preferred embodiment of the application and are therefore representative of the subject matter which is broadly contemplated by the present application. It is further understood that the scope of the present application fully encompasses other embodiments that may become obvious to those skilled in the art and that the scope of the present application is accordingly not limited.

What is claimed is:

1. A computer-implemented method that comprises using at least one hardware processor to:
   receive a representation of one or more candidate objects in content of a digital media asset;
   for each of the one or more candidate objects, compare one or more features of the candidate object to one or more corresponding features of a plurality of reference objects, according to a first feature-matching algorithm defined by a first feature-matching software module, to identify one or more reference objects that match the candidate object;
   for each of the one or more candidate objects that is matched to one or more reference objects, generate a hotspot package, wherein the hotspot package comprises a visual overlay, and wherein the visual overlay comprises information associated with the one or more reference objects matched to the candidate object;
   receive a second feature-matching software module, defining a second feature-matching algorithm, via an interface; and,
   subsequently, compare one or more features of one or more other candidate objects to one or more corresponding features of a plurality of reference objects, according to the second feature-matching algorithm defined by the second feature-matching software module, instead of the first feature-matching algorithm defined by the first feature-matching software module.

2. The method of claim 1, wherein the representation of one or more candidate objects is received in a visual query that is received from a network device via at least one network.

3. The method of claim 2, further comprising using the at least one hardware processor of the network device to generate the visual query, wherein generating the visual query comprises:
   displaying the content of the digital media asset;
   receiving a selection of a portion of the displayed content via a user operation; and
   generating the visual query based on the selected portion of the displayed content.

4. The method of claim 1, wherein the representation of one or more candidate objects comprises, for each of the one or more candidate objects, an image of the candidate object.

5. The method of claim 4, wherein the digital media asset is a digital image, and wherein each of the one or more images, in the representation of one or more candidate objects, is a portion of the digital image.

6. The method of claim 4, wherein comparing one or more features of the candidate object to one or more corresponding features of a plurality of reference objects comprises deriving the one or more features of the candidate object from visual attributes in the image of the candidate object.

7. The method of claim 6, wherein deriving the one or more features of the candidate object from visual attributes in the image of the candidate object is performed according to a first feature-extraction algorithm defined by a first feature-extraction software module, and wherein the method further comprises using the at least one hardware processor to:
   receive a second feature-extraction software module, defining a second feature-extraction algorithm, via an interface; and,
   subsequently, derive one or more features of a candidate object from visual attributes in the image of a candidate object, according to the second feature-extraction algorithm defined by the second feature-extraction software module, instead of the first feature-extraction algorithm defined by the first feature-extraction software module.

8. The method of claim 6, wherein deriving the one or more features of the candidate object from visual attributes in the image of the candidate object comprises detecting the candidate object in the image of the candidate object prior to deriving the one or more features of the candidate object.

9. The method of claim 8, wherein detecting the candidate object in the image of the candidate object comprises:
   normalizing the image of the candidate object; and
   determining a boundary that surrounds the candidate object within the image of the candidate object.

10. The method of claim 9, wherein normalizing the image of the candidate object comprises:
    removing image noise from the image of the candidate object;
    converting the image of the candidate object to a photometric invariant color space; and
    converting the image of the candidate object to one or both of a predefined size and a predefined aspect ratio.

11. The method of claim 9, wherein determining a boundary that surrounds the candidate object within the image of the candidate object comprises:
    segmenting the image of the candidate object into regions;
    merging similar neighboring regions until no similar neighboring regions remain; and
    determining a boundary around one or more remaining regions as the boundary that surrounds the candidate object.

12. The method of claim 1, wherein the digital media asset is a video, and wherein the representation of one or more candidate objects comprises a frame of the video.

13. The method of claim 11, wherein merging similar neighboring regions comprises, for a pair of neighboring regions:
calculating a variation between the pair of neighboring regions;
merging the pair of neighboring regions when the variation is less than a threshold; and
not merging the pair of neighboring regions when the variation is greater than the threshold.

14. The method of claim 9, wherein determining a boundary that surrounds the candidate object within the image of the candidate object is performed according to a first object-recognition algorithm defined by a first object-recognition software module, and wherein the method further comprises using the at least one hardware processor to:
receive a second object-recognition software module, defining a second object-recognition algorithm, via an interface; and,
subsequently, determining a boundary that surrounds a candidate object within an image of the candidate object, according to the second object-recognition algorithm defined by the second object-recognition software module, instead of the first object-recognition algorithm defined by the first object-recognition software module.

15. The method of claim 1, wherein comparing one or more features of the candidate object to one or more corresponding features of a plurality of reference objects to identify one or more reference objects that match the candidate object comprises, for each of the plurality of reference objects:
for each of the one or more features of the candidate object, comparing the feature of the candidate object to a corresponding feature of the reference object, and generating a feature score based on the comparison of the feature of the candidate object to the corresponding feature of the reference object; and
generating a matching score based on each feature score.

16. The method of claim 15, wherein generating a matching score based on each feature score is performed according to a first data-fusion algorithm defined by a first data-fusion software module, and wherein the method further comprises using the at least one hardware processor to:
receive a second data-fusion software module, defining a second data-fusion algorithm, via an interface; and,
subsequently, generate a matching score based on each feature score, according to the second data-fusion algorithm defined by the second data-fusion software module, instead of the first data-fusion algorithm defined by the first data-fusion software module.

17. The method of claim 1, wherein the one or more features comprise two or more of a color feature, a texture feature, a shape feature, and a keypoints feature.

18. The method of claim 1, wherein, for each of the one or more candidate objects that is matched to one or more reference objects, the matched one or more reference objects comprise an object that is identified as the candidate object.

19. The method of claim 18, wherein the visual overlay of each hotspot package comprises one or more of an image, title, description, and price associated with the object that is identified as the candidate object.

20. The method of claim 1, wherein, for each of the one or more candidate objects that is matched to one or more reference objects, the matched one or more reference objects comprise an object that is visually similar to the candidate object.

21. The method of claim 20, wherein the visual overlay of each hotspot package comprises a representation of each object, from the matched one or more reference objects, that is visually similar to the candidate object.

22. The method of claim 1, wherein generating a hotspot package for each of the one or more candidate objects that is matched to one or more reference objects comprises, for each of the one or more reference objects matched to the candidate object:
retrieving information associated with the reference object using an identifier of the reference object; and
incorporating the information into the hotspot package.

23. The method of claim 1, further comprising using the at least one hardware processor to generate a navigation hotspot package, wherein the navigation hotspot package comprises a visual overlay, and wherein the visual overlay comprises one or more inputs for one or both of searching and selecting each of the hotspot packages for the one or more candidate objects that were matched to one or more reference objects.

24. The method of claim 1, further comprising using the at least one hardware processor to embed each hotspot package with the digital media asset, wherein embedding each hotspot package with the digital media asset comprises:
generating an asset template;
embedding a viewer for the digital media asset into the asset template; and,
for each hotspot package,
generating a hotspot package template, and
embedding the hotspot package template into the asset template.

25. The method of claim 24, wherein the asset template and each hotspot package template are generated in a markup language.

26. The method of claim 1, wherein the visual overlay of each hotspot package for the one or more candidate objects that were matched to one or more reference objects comprises one or more inputs for initiating a purchase for at least one of the matched one or more reference objects.

27. The method of claim 1, further comprising using the at least one hardware processor to, for each of the one or more candidate objects that is matched to one or more reference objects:
determine a position of the candidate object in the content of the digital media asset; and
generate a hotspot, wherein the hotspot comprises a visual indication to be overlaid at a hotspot position in the content of the digital media asset corresponding to the determined position of the candidate object, and wherein the hotpot is associated with the hotspot package generated for the candidate object.

28. The method of claim 27, wherein the visual indication of each hotspot is selectable via a user operation so as toggle the associated hotspot package between a visible and invisible state.

29. A system comprising:
at least one hardware processor; and
one or more software modules that are configured to, when executed by the at least on hardware processor,
receive a representation of one or more candidate objects in content of a digital media asset,
for each of the one or more candidate objects, compare one or more features of the candidate object to one or more corresponding features of a plurality of reference objects, according to a first feature-matching algorithm defined by a first feature-matching software module, to identify one or more reference objects that match the candidate object, for each of the one or more candidate objects that is matched to one or more reference objects, generate a hotspot package, wherein the hotspot package comprises a visual overlay, and wherein the visual overlay comprises information associated with the one or more reference objects matched to the candidate object, receive a second feature-matching software module, defining a second feature-matching algorithm, via an interface, and, subsequently, compare one or more features of one or more other candidate objects to one or more corresponding features of a plurality of reference objects, according to the second feature-matching algorithm defined by the second feature-matching software module, instead of the first feature-matching algorithm defined by the first feature-matching software module.

30. A non-transitory computer-readable medium having instructions stored thereon, wherein the instructions, when executed by a processor, cause the processor to:

receive a representation of one or more candidate objects in content of a digital media asset;

for each of the one or more candidate objects, compare one or more features of the candidate object to one or more corresponding features of a plurality of reference objects, according to a first feature-matching algorithm defined by a first feature-matching software module, to identify one or more reference objects that match the candidate object;

for each of the one or more candidate objects that is matched to one or more reference objects, generate a hotspot package, wherein the hotspot package comprises a visual overlay, and wherein the visual overlay comprises information associated with the one or more reference objects matched to the candidate object;

receive a second feature-matching software module, defining a second feature-matching algorithm, via an interface; and, subsequently, compare one or more features of one or more other candidate objects to one or more corresponding features of a plurality of reference objects, according to the second feature-matching algorithm defined by the second feature-matching software module, instead of the first feature-matching algorithm defined by the first feature-matching software module.

\* \* \* \* \*